United States Patent
Li et al.

(10) Patent No.: US 11,242,362 B2
(45) Date of Patent: Feb. 8, 2022

(54) PHOSPHAZENE COMPOUND, PREPARATION METHOD AND USE THEREOF

(71) Applicant: QINGDAO UNIVERSITY OF SCIENCE AND TECHNOLOGY, Shandong (CN)

(72) Inventors: Zhibo Li, Shandong (CN); Na Zhao, Shandong (CN); Chuanli Ren, Shandong (CN); Xiaohui Fu, Shandong (CN); Shaofeng Liu, Shandong (CN)

(73) Assignee: QINGDAO UNIVERSITY OF SCIENCE AND TECHNOLOGY, Shandong (CN)

( * ) Notice: Subject to any disclaimer, the term of this patent is extended or adjusted under 35 U.S.C. 154(b) by 253 days.

(21) Appl. No.: 16/446,466

(22) Filed: Jun. 19, 2019

(65) Prior Publication Data

US 2019/0315786 A1    Oct. 17, 2019

Related U.S. Application Data

(63) Continuation of application No. PCT/CN2017/106571, filed on Oct. 17, 2017.

(30) Foreign Application Priority Data

Dec. 26, 2016 (CN) .......... 201611218507.X
Dec. 26, 2016 (CN) .......... 201611219031.1

(51) Int. Cl.
  *C09K 11/06* (2006.01)
  *C07F 9/6581* (2006.01)
  (Continued)

(52) U.S. Cl.
  CPC ....... *C07F 9/65817* (2013.01); *B01J 31/0265* (2013.01); *C07F 9/65815* (2013.01)

(58) Field of Classification Search
  None
  See application file for complete search history.

(56) References Cited

U.S. PATENT DOCUMENTS

| 3,475,394 A | 10/1969 | Matsumura et al. |
| 3,711,542 A | 1/1973 | Hook et al. |

FOREIGN PATENT DOCUMENTS

| CN | 104650147 | 5/2015 |
| CN | 105027314 | 11/2015 |

(Continued)

OTHER PUBLICATIONS

Dahmann et al. Z. Naturforsch. 32b. 236-237 (Year: 1977).*
Zhao et al. (Angew. Chem. Int. Ed., 56, 12987-12990). (Year: 2017).*

(Continued)

*Primary Examiner* — Yun Qian
(74) *Attorney, Agent, or Firm* — Hodgson Russ LLP

(57) ABSTRACT

Provided are a phosphazene compound, a method for preparing a phosphazene compound and a method for producing a polymer with a phosphazene compound as a catalyst. The compound of formula (I) or a solvate thereof, where A is a six- or eight-membered ring consisting of repeated $-(P=N-)$, and B is at least one of unsubstituted or substituted $C_{1-6}$ alkylamino, unsubstituted or substituted $C_{1-6}$ cycloalkylamino, unsubstituted or substituted arylamino, (Continued)

or halogen, and B is attached to A at phosphorus in $-(-P=N-)-$, where R is unsubstituted or substituted $C_{1-6}$ alkyl, unsubstituted or substituted $C_{1-6}$ cycloalkyl, unsubstituted or substituted aryl, or unsubstituted or substituted benzyl, or R forms $C_{1-6}$ heterocycloalkyl together with N attached thereto.

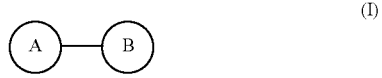

(I)

20 Claims, 8 Drawing Sheets

(51) Int. Cl.
*B01J 31/02* (2006.01)
*C07F 9/6593* (2006.01)

(56) References Cited

FOREIGN PATENT DOCUMENTS

| | | |
|---|---|---|
| JP | S60500715 | 5/1985 |
| JP | 2002265614 | 9/2002 |
| WO | 8403284 | 8/1984 |
| WO | 2014136758 | 9/2014 |
| WO | 2016116202 | 7/2016 |

OTHER PUBLICATIONS

Biddleston et al., "Phosphorus-Nitrogen Compounds. Part 47 1. Conformations and Phosphorus-Phosphorus Spin-Spin Coupling Constants in Phosphazenylcyclophosphazenes," Phosphorus and Sulfur, 1985, vol. 25, pp. 25-31.
STN on the web, "RN: 75758-33-7, 75746-52-0, 62824-78-6, 62824-77-5," Accessed 2019, 3 pages.
SIPO, First Office Action for CN Application No. 201611218507.X, dated Aug. 1, 2019.
SIPO, First Office Action for CN Application No. 201611219031.1, dated Aug. 1, 2019.
Becke-Goehring et al., "Reactions of nucleophilic reagents with trimeric phosphonitrilic chloride," Zeitschrift fuer Anorganische und Allgemeine Chemie, 1959, vol. 302, pp. 103-120.
Dahmann et al., "Phosphazenylcyclophosphazene Syntheses Using Silylmonophosphazenes," Zeitschrift fur Naturforschung, Teil B: Anorganische Chemie, Organische Chemie, 1977, vol. 32B, No. 2, pp. 236-237.
Dahmann et al., "Synthesis and Structure of Phosphazenylcyclophosphazenes," Zeitschrift fur Naturforschung, Teil B: Anorganische Chemie, Organische Chemie, 1980, vol. 35B, No. 8, pp. 964-969.
Veldboer et al., "Cyclic Phosphazenes for the Surface Modification of Lanthanide Phosphate-based Nanoparticles," Zeitschrift fuer Anorganische und Allgemeine Chemie, 2008, vol. 634, pp. 2175-2180.
JPO, Office Action for JP Application No. 2019-555531, dated Jul. 14, 2020.
WIPO, ISR for PCT/CN2017/106571, Jan. 24, 2018.

* cited by examiner

PHOSPHAZENE COMPOUND, PREPARATION METHOD AND USE THEREOF

CROSS-REFERENCE TO RELATED APPLICATIONS

This application is a continuation of International Application PCT/CN2017/106571, filed Oct. 17, 2017, which claims priority to Chinese Patent Application Serial Nos. 201611219031.1 and 201611218507.X, each filed Dec. 26, 2016. The entire disclosures of the aforementioned applications are incorporated herein by reference.

FIELD

The present disclosure relates to an organic chemistry field, and more particularly to a phosphazene compound, a method for preparing a phosphazene compound, and a method for producing a polymer with a phosphazene compound as a catalyst.

BACKGROUND

Phosphazene compound is a non-polar compound containing a phosphorus-nitrogen double bond (P=N), exhibiting a strong basicity, which is widely used in organic catalytic reactions. Although the phosphazene compounds have been studied for years, only a few types of the compounds are discovered to be used as catalysts, and complex synthesis process and high cost are requested in preparing these phosphazene compounds, thus limiting applications in large scale.

Therefore, there is still a need for a new, cheap and readily available phosphazene catalyst in the field.

SUMMARY

Embodiments of the present disclosure seek to solve at least one of the problems existing in the related art to at least some extents. Accordingly, an object of the present disclosure is to provide a phosphazene compound, a method for preparing a phosphazene compound, and a method for producing a polymer with a phosphazene compound as a catalyst.

In embodiments of a first aspect of the present disclosure, a compound of formula (I) or a solvate thereof is provided,

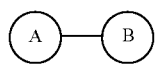

(I)

in which A is a six- or eight-membered ring consisting of repeated $-(P=N)-$, and B is at least one of unsubstituted or substituted $C_{1-6}$ alkylamino, unsubstituted or substituted $C_{1-6}$ cycloalkylamino, unsubstituted or substituted arylamino,

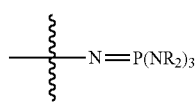

or halogen, and B is attached to A at phosphorus in $-(P=N)-$, in which R is unsubstituted or substituted $C_{1-6}$ alkyl, unsubstituted or substituted $C_{1-6}$ cycloalkyl, unsubstituted or substituted aryl, or unsubstituted or substituted benzyl, or R forms $C_{1-6}$ heterocycloalkyl together with N attached thereto.

In embodiments of a second aspect of the present disclosure, a method for preparing a compound of formula (I) is provided, including:

allowing phosphorus pentachloride to be in contact with a compound of formula X and ammonia gas, thereby obtaining a compound of formula 1;

allowing the compound of formula 1 to be in contact with a base, thereby obtaining a compound of formula 2; and allowing the compound of formula X or the compound of formula 2 to be in contact with hexachloro-cyclotriphosphazene or octachloro-cyclotetraphosphazene, thereby obtaining the compound of formula (I), in which the formula X is $NHR_2$, the formula 1 is

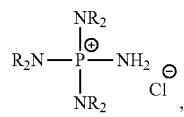

and the formula 2 is

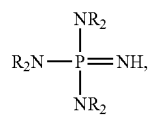

in which R is defined as above.

In embodiments of a third aspect of the present disclosure, a method for producing a polymer with a compound of formula (I) or a solvate thereof as a catalyst is provided, including: allowing the catalyst to be in contact with at least one monomer, thereby obtaining the polymer.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
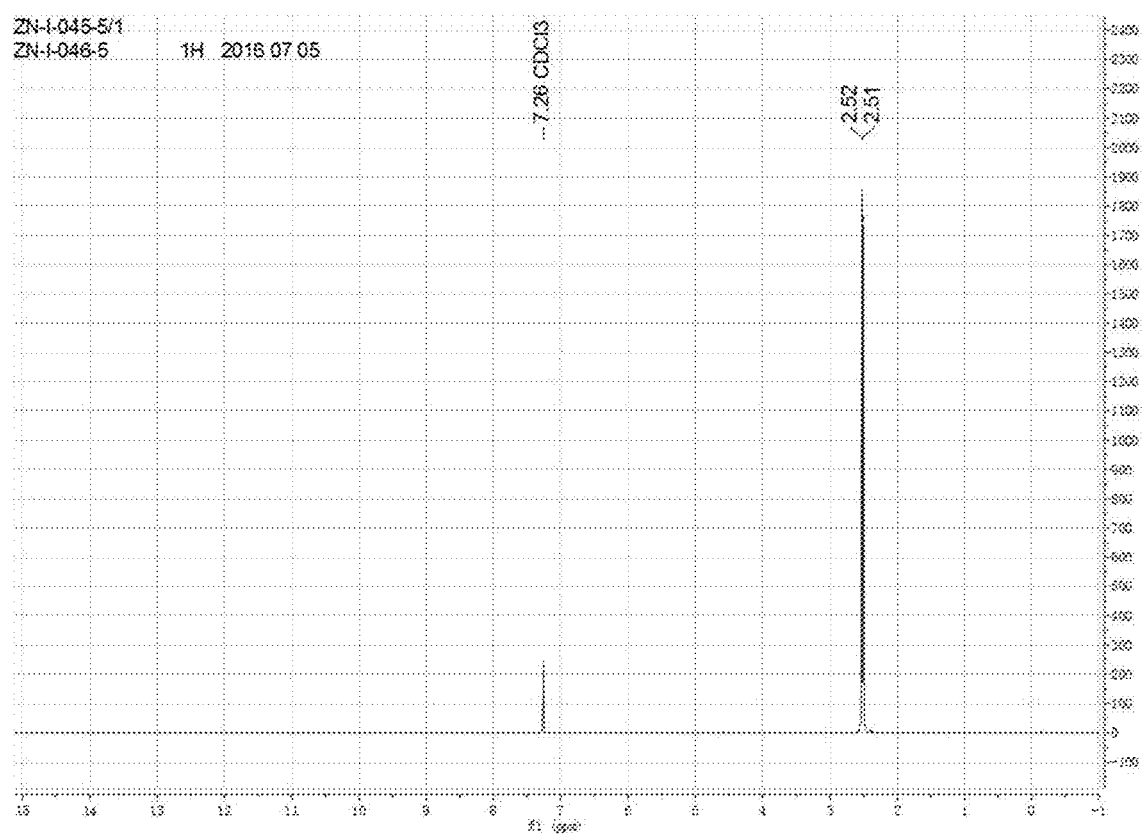
FIG. 1 is a graph showing a $^1H$ nuclear-magnetic resonance (NMR) spectroscopy of tri(dimethylamino)-phosphazene according to an embodiment of the present disclosure.
Figure 2:
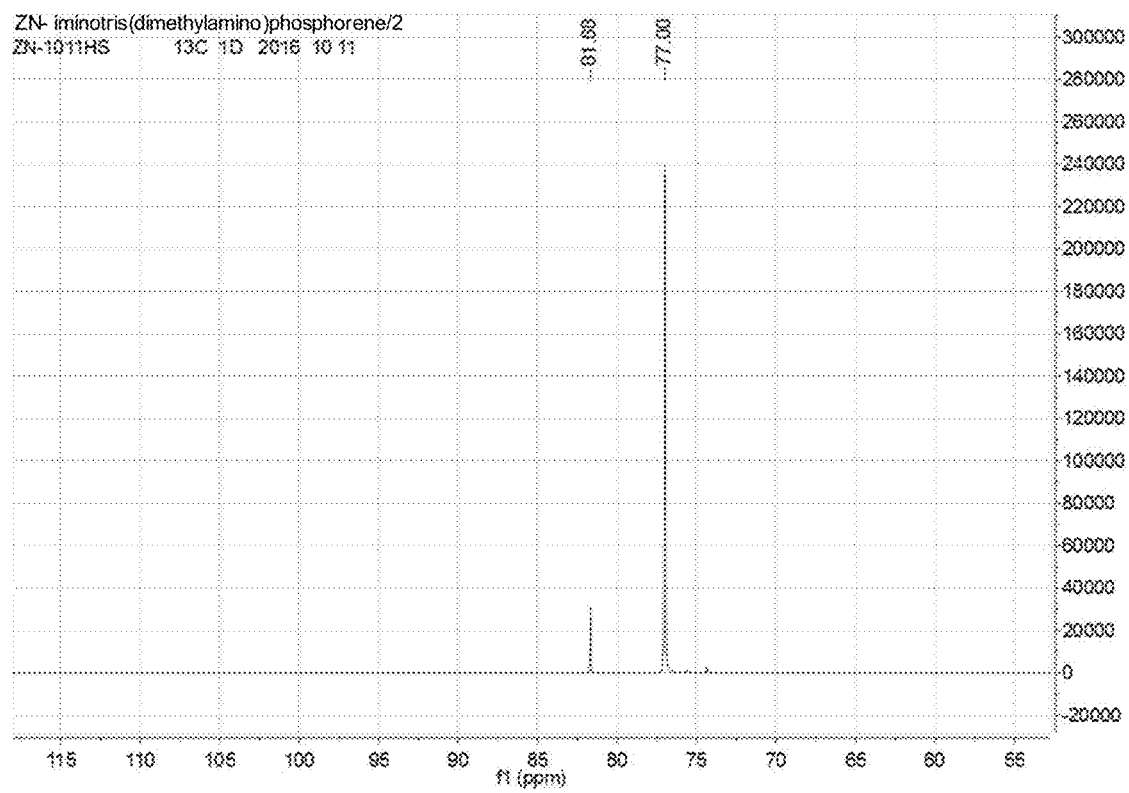
FIG. 2 is a graph showing a $^{13}C$ NMR spectroscopy of tri(dimethylamino)-phosphazene according to an embodiment of the present disclosure.
Figure 3:
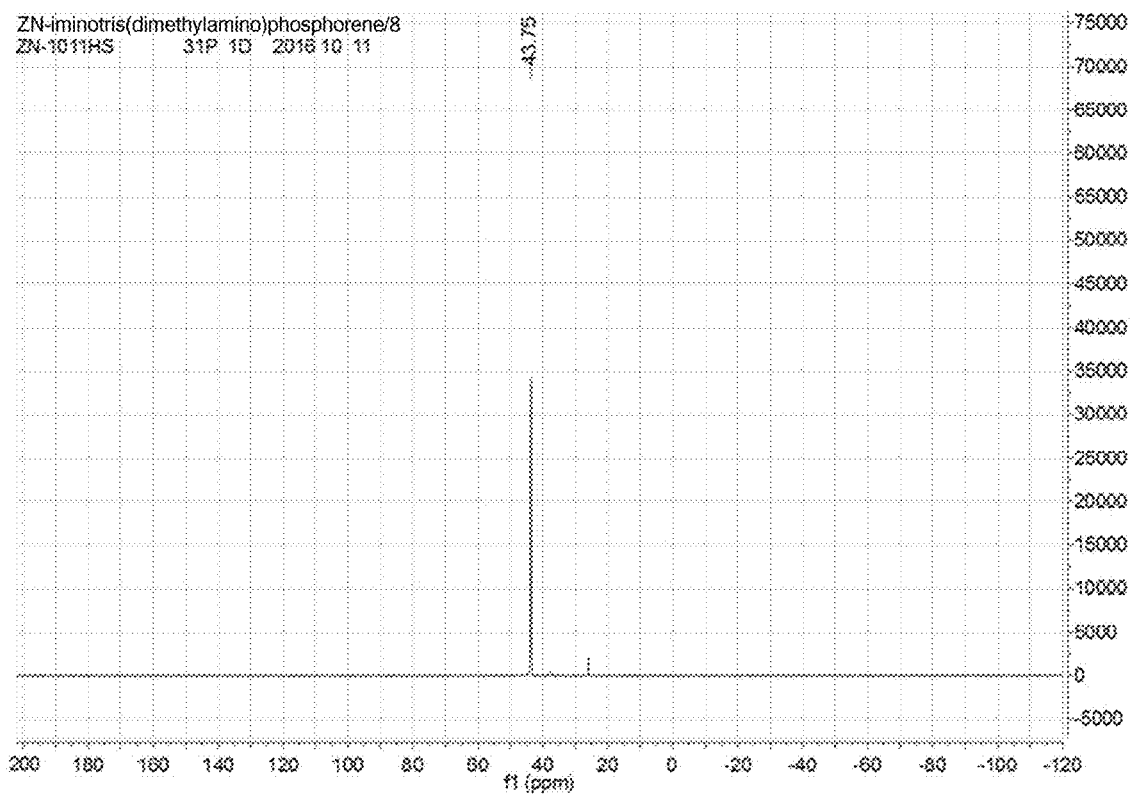
FIG. 3 is a graph showing a $^{31}P$ NMR spectroscopy of tri(dimethylamino)-phosphazene according to an embodiment of the present disclosure.
Figure 4:
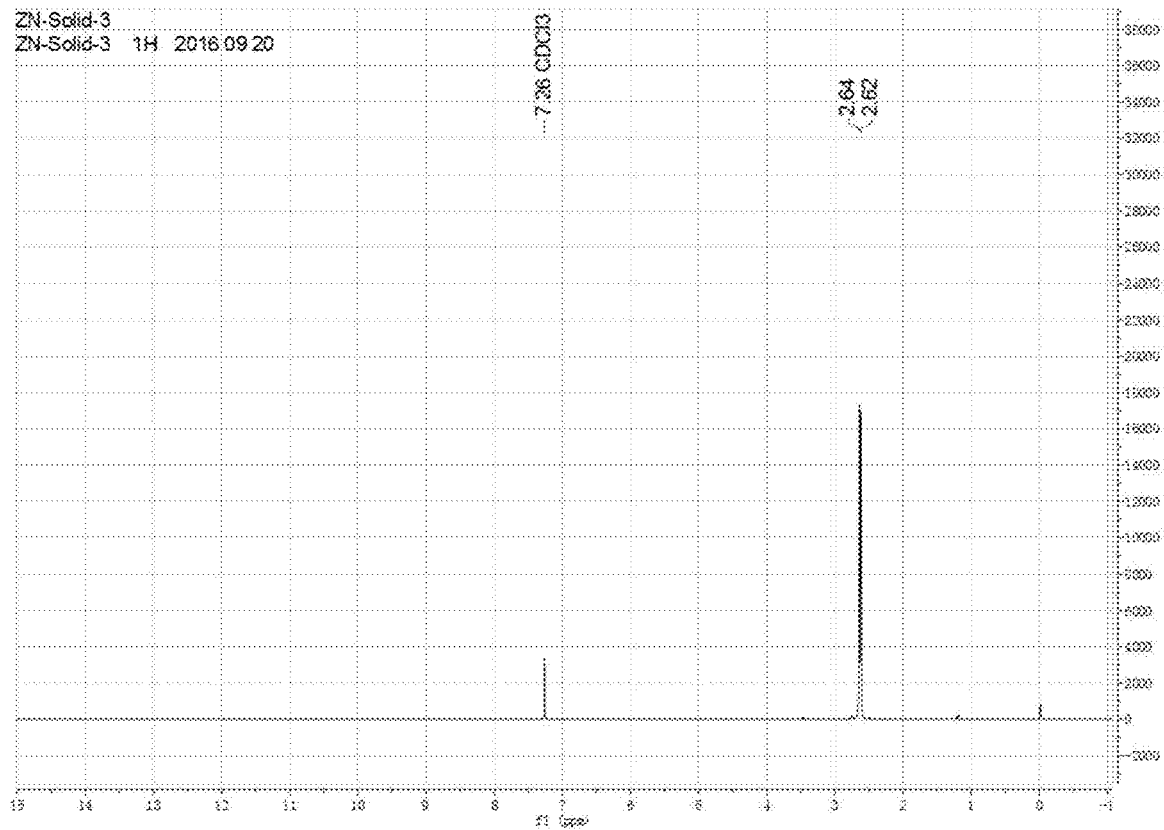
FIG. 4 is a graph showing a $^1H$ NMR spectroscopy of hexa[tri(dimethylamino)-phosphazene]-cyclotriphosphazene according to an embodiment of the present disclosure.
Figure 5:
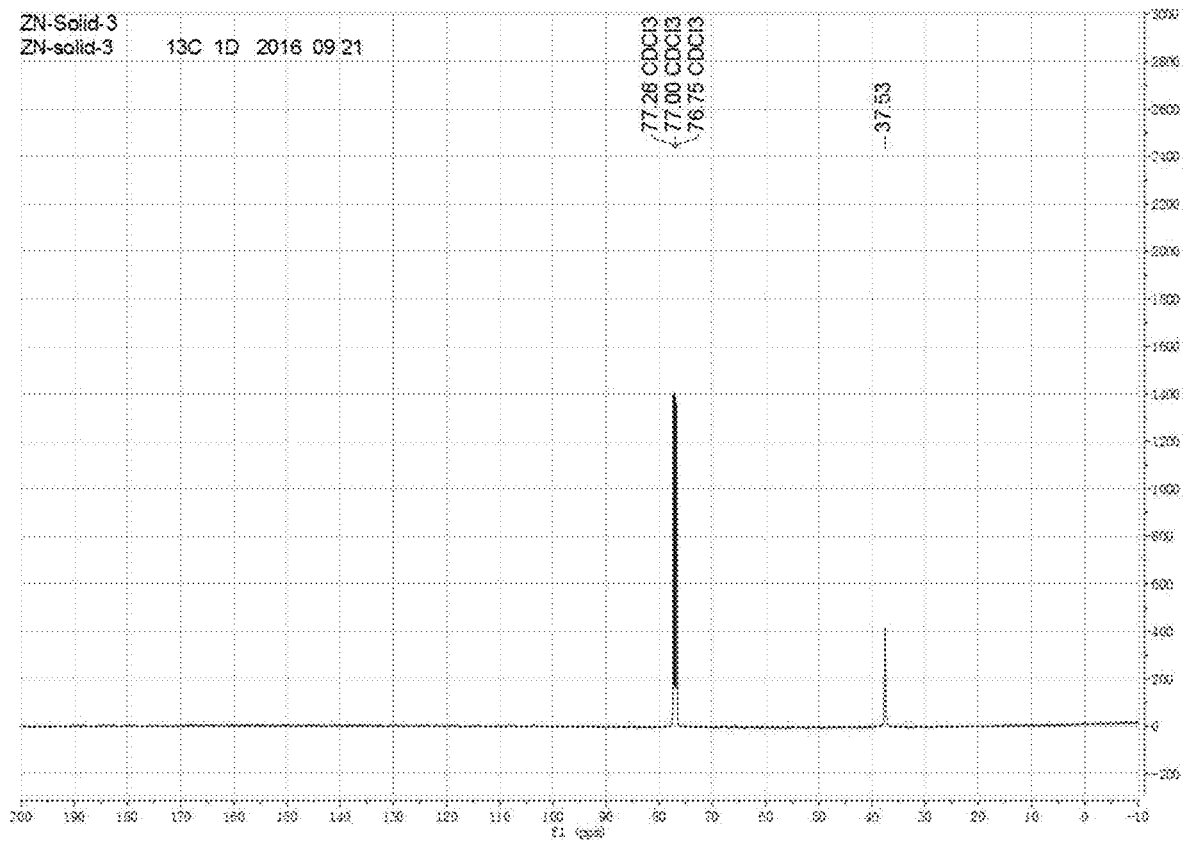
FIG. 5 is a graph showing a $^{13}$C NMR spectroscopy of hexa[tri(dimethylamino)-phosphazene]-cyclotriphosphazene according to an embodiment of the present disclosure.
Figure 6:
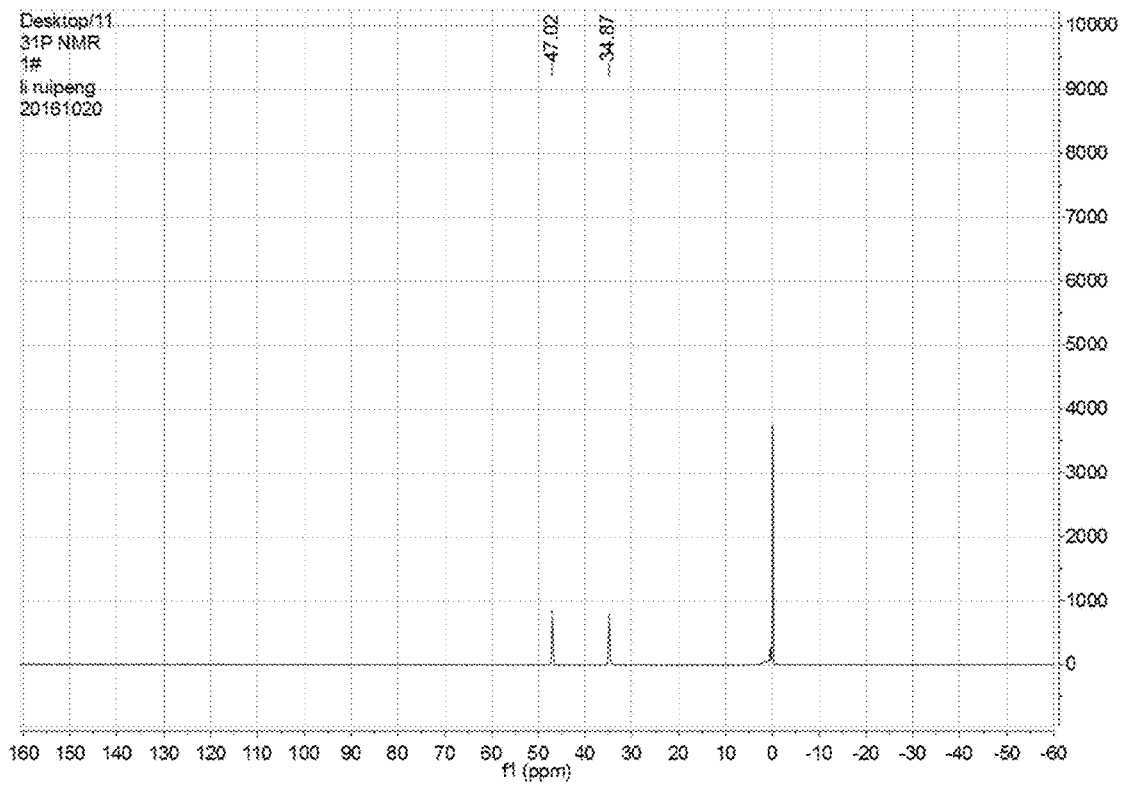
FIG. 6 is a graph showing a $^{31}$P NMR spectroscopy of hexa[tri(dimethylamino)-phosphazene]-cyclotriphosphazene according to an embodiment of the present disclosure.
Figure 7:
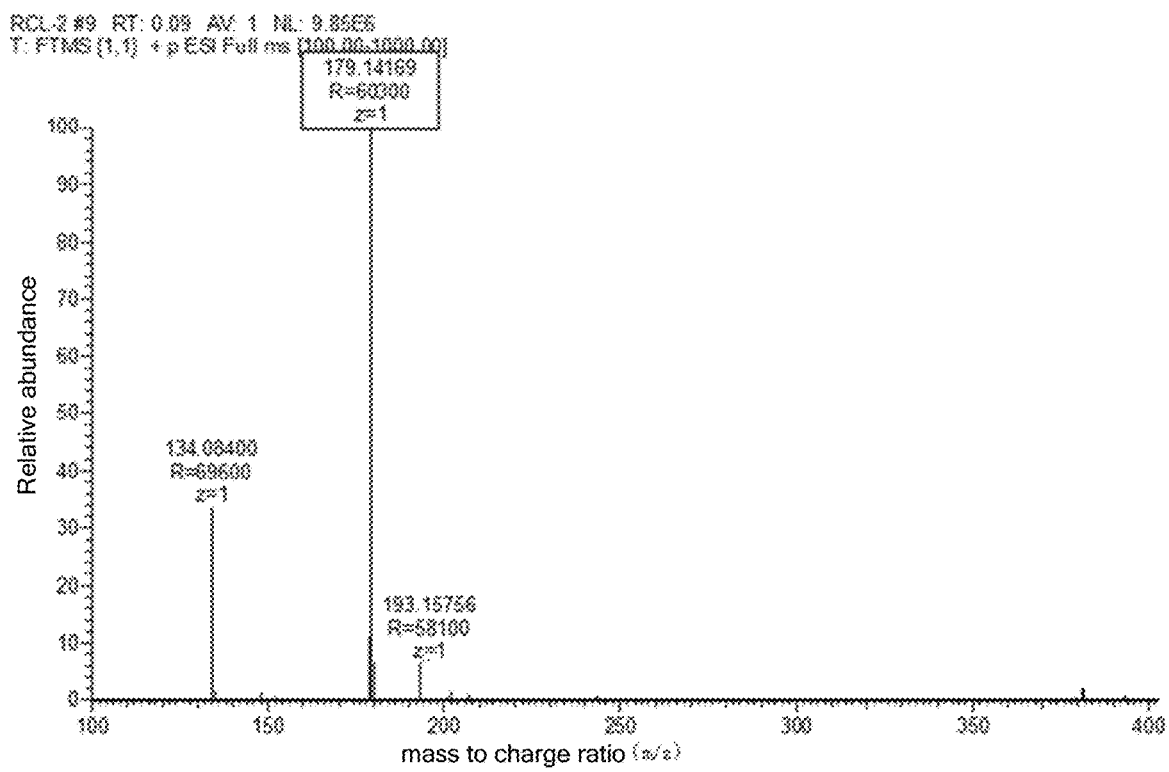
FIG. 7 is a graph showing a high resolution mass spectrogram of tri(dimethylamino)-phosphazene according to an embodiment of the present disclosure.
Figure 8:
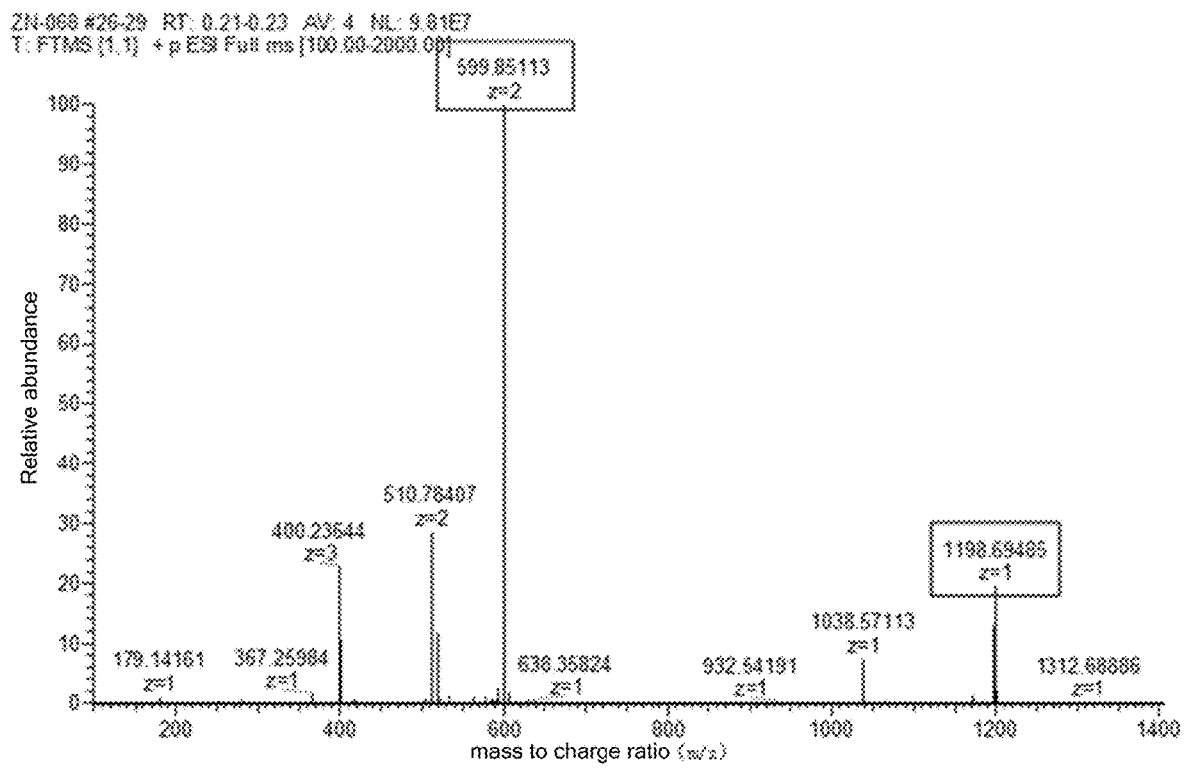
FIG. 8 is a graph showing a high resolution mass spectrogram of hexa[tri(dimethylamino)-phosphazene]-cyclotriphosphazene according to an embodiment of the present disclosure.
Figure 9:
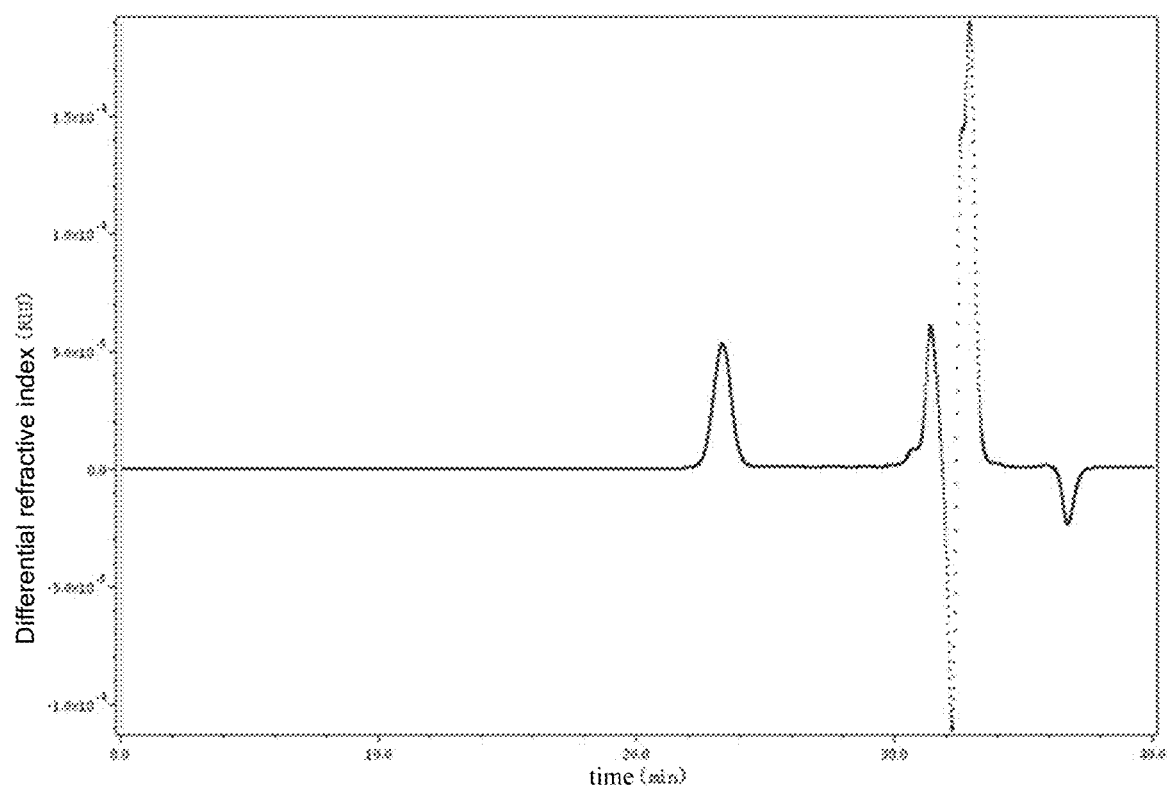
FIG. 9 is a graph showing a gel permeation chromatography (GPC) of poly(propylene oxide) prepared according to Embodiment 20 of the present disclosure.
Figure 10:
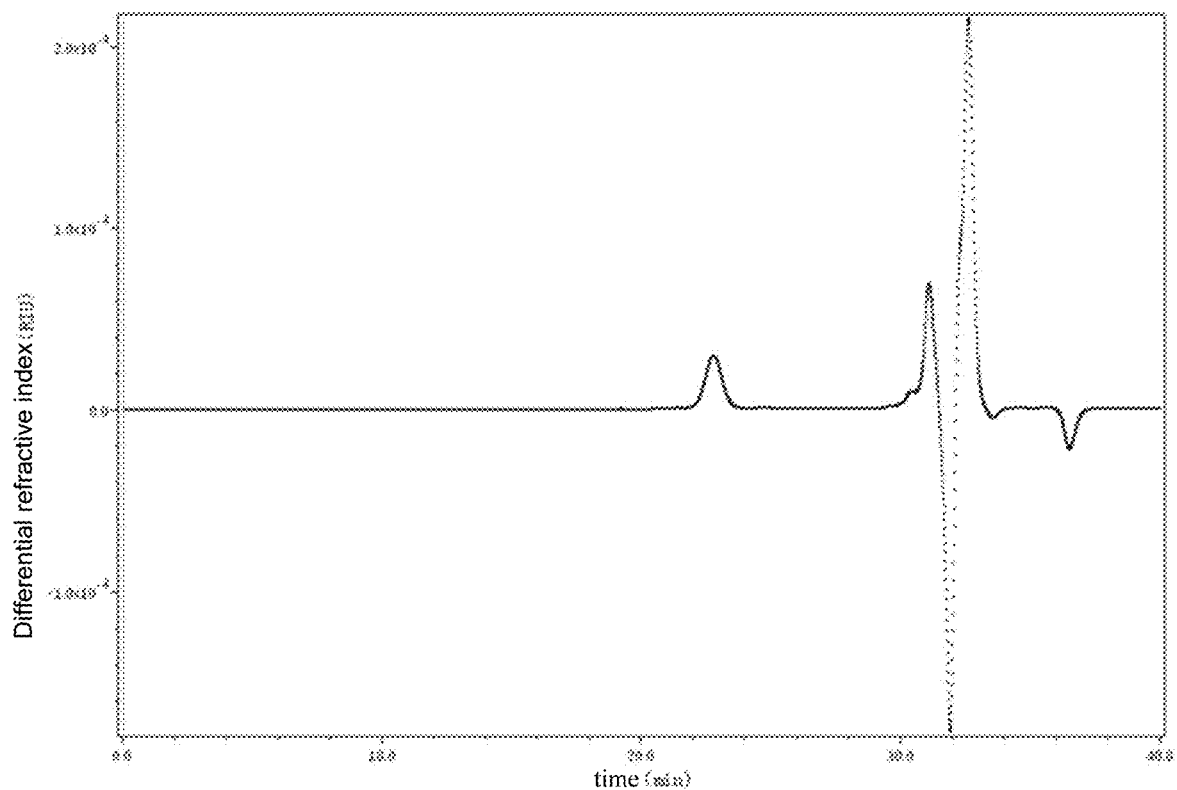
FIG. 10 is a graph showing a GPC of polycaprolactone prepared according to Embodiment 26 of the present disclosure.
Figure 11:
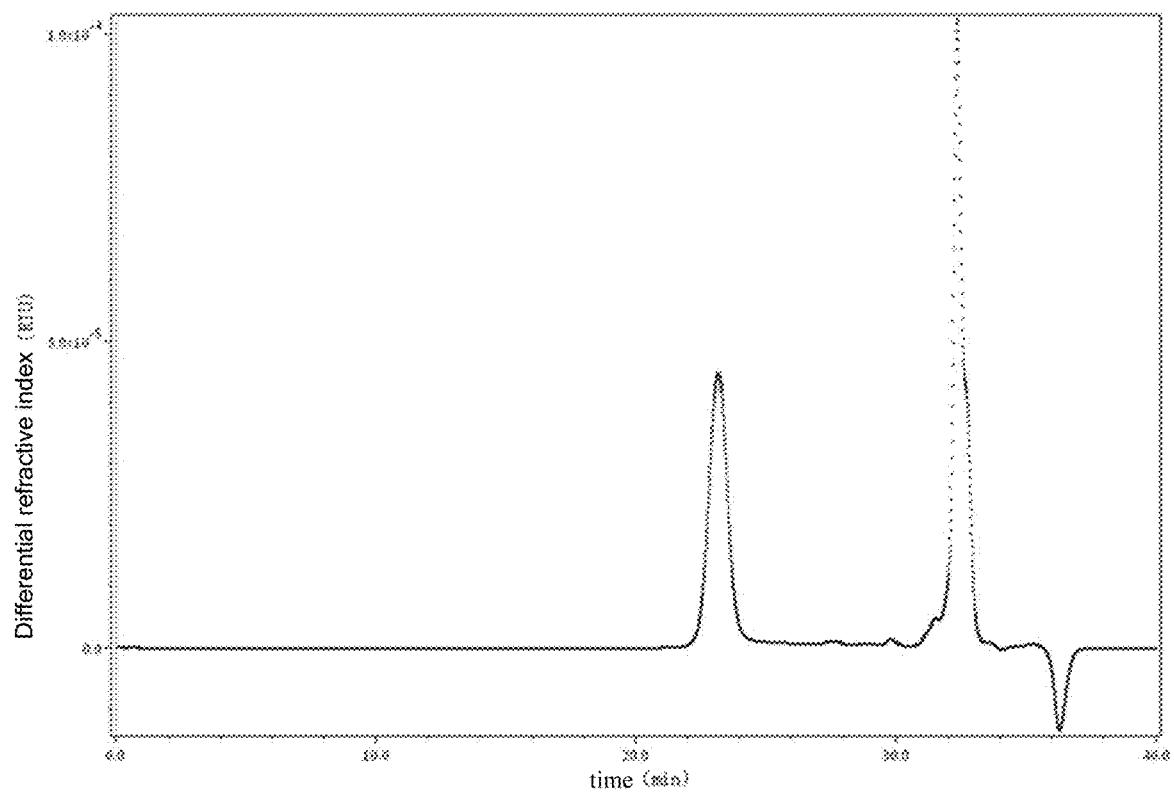
FIG. 11 is a graph showing a GPC of polydimethylsiloxane prepared according to Embodiment 28 of the present disclosure.
Figure 12:
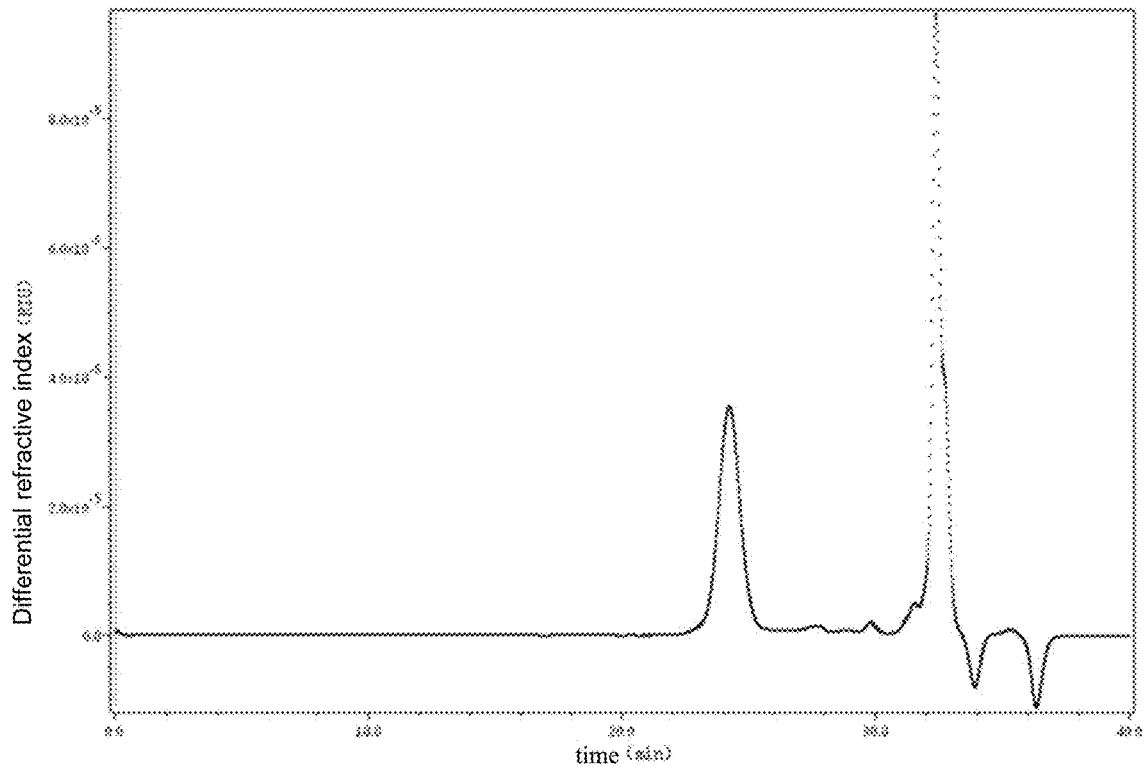
FIG. 12 is a graph showing a GPC of propylene oxide-caprolactone copolymer prepared according to Embodiment 30 of the present disclosure.
Figure 13:
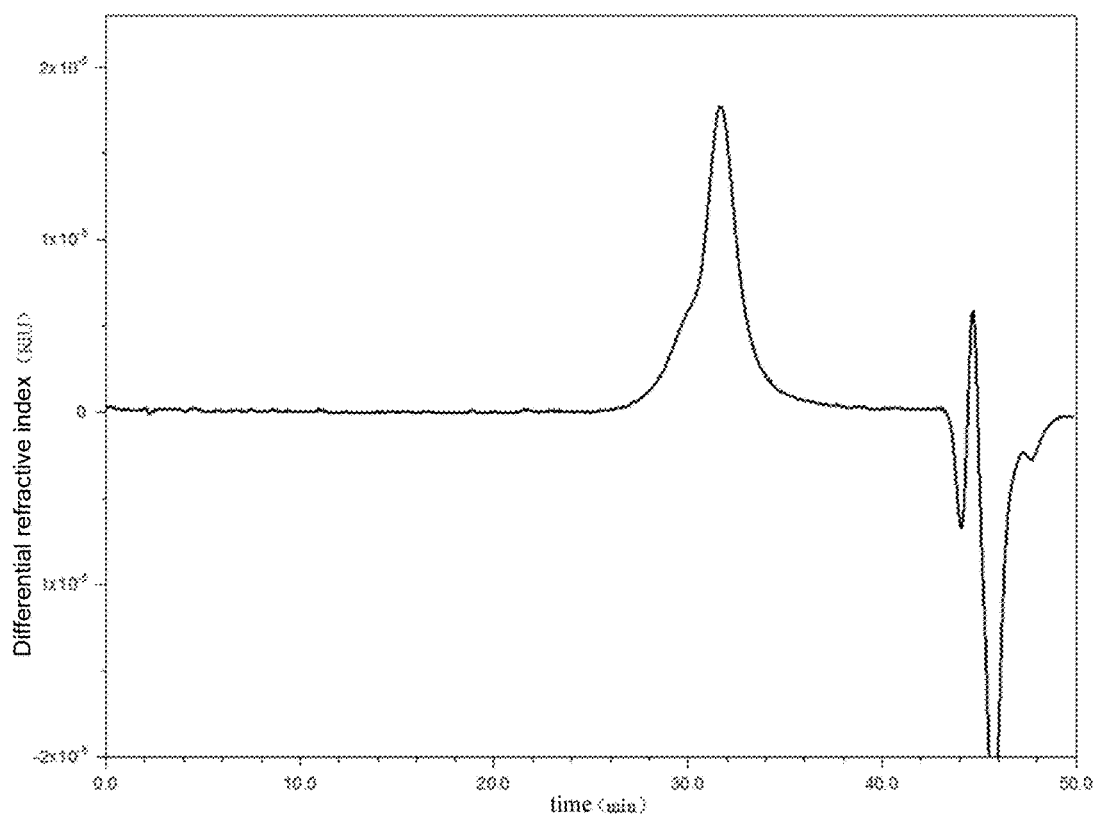
FIG. 13 is a graph showing a GPC of poly(γ-benzyl-L-glutamate) prepared according to Embodiment 62 of the present disclosure.
Figure 14:
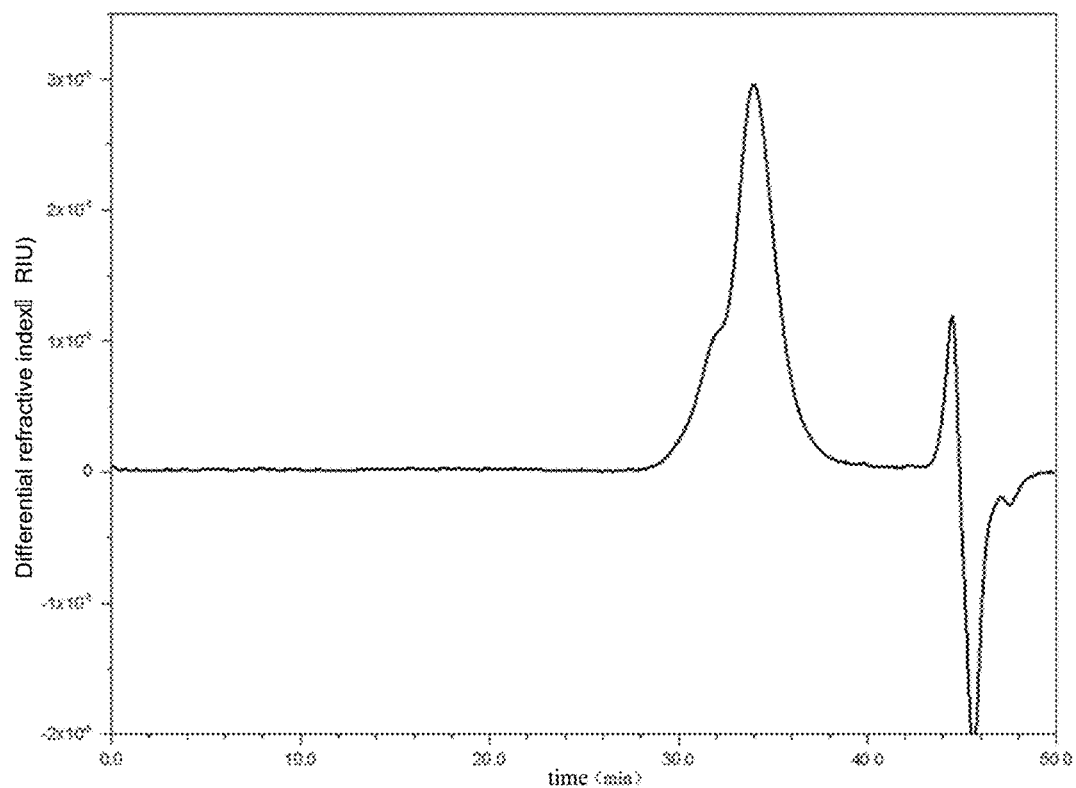
FIG. 14 is a graph showing a GPC of poly(ε-benzyloxycarbonyl)-lysine) prepared according to Embodiment 66 of the present disclosure.
Figure 15:
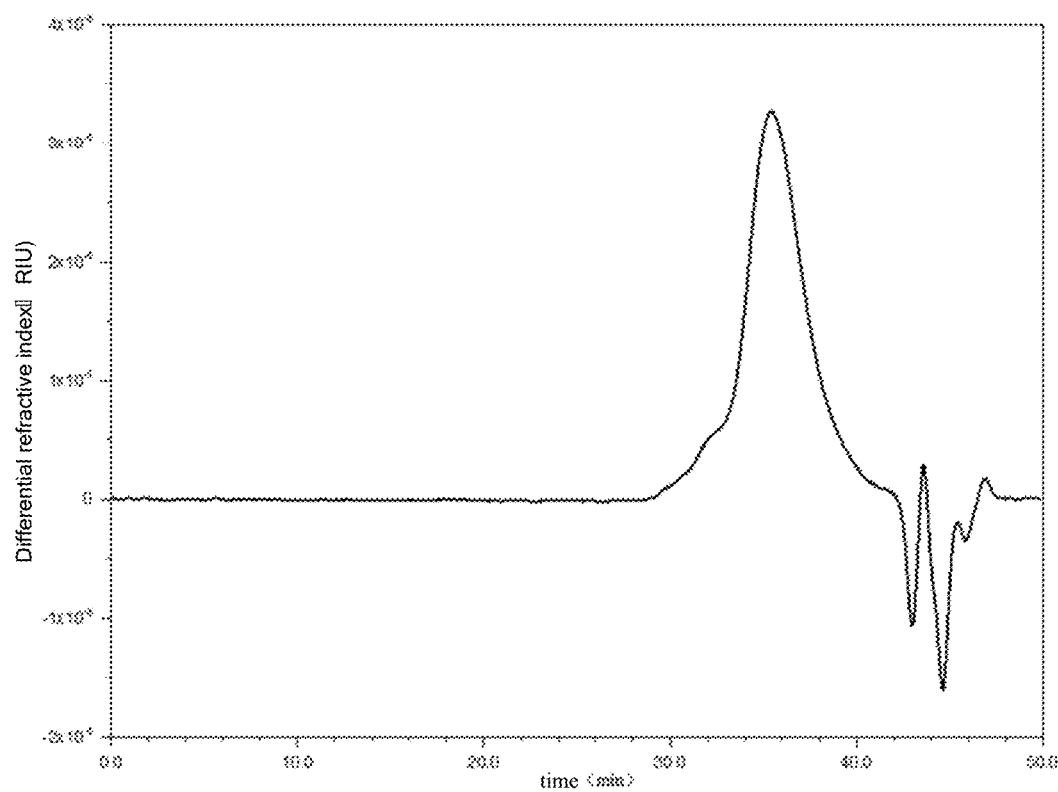
FIG. 15 is a graph showing a GPC of poly(γ-benzyl-L-glutamate) prepared according to Embodiment 68 of the present disclosure.
Figure 16:
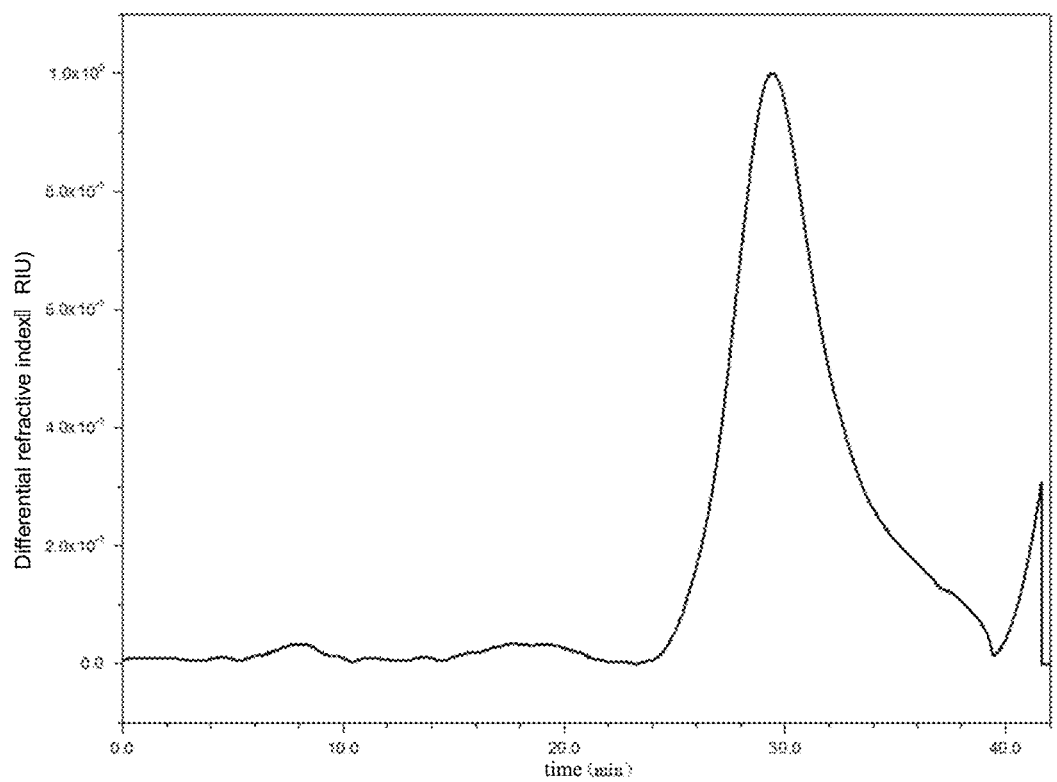
FIG. 16 is a graph showing a GPC of a copolymer of glutamic acid and sarcosine prepared according to Embodiment 73 of the present disclosure.

Embodiments of the present disclosure are described in detail below. The embodiments described below are illustrative only and shall not be construed to limit the present disclosure. Unspecified techniques or conditions in embodiments or examples may be carried out in accordance with product specifications or according to common techniques or conditions in the art. Reagents or instruments used but not identified with manufacturers are common products commercially available.

In the description of the present disclosure, it should be understood that terms such as "first" and "second" are used herein for purposes of description and are not intended to indicate or imply relative importance or significance or to imply the number of indicated technical features. Therefore, the feature defined with "first" and "second" may include one or more of this feature. In the description of the present disclosure, unless specified otherwise, "a plurality of" means two or more than two, such as two or three.

Definitions and General Terms

Embodiments of the present disclosure are now described in detail with accompanying structural formulas or chemical formulas. It would be appreciated by those skilled in the art that changes, amendments, alternatives and modifications can be made without departing from principles and spirit of the present disclosure. The scope of the present disclosure is defined by the claims and the like. In the case that definitions, technical terms, techniques and applications described in the present disclosure have different scopes from those in one or more papers or patents, they should be understood as defined in the present disclosure.

It would be appreciated by those skilled in the art that different features of the present disclosure may be provided in separated embodiments respectively for clarity, and may also be provided in combination in a single embodiment. On the contrary, some features may be provided in a single embodiment for brevity, and may also be provided separately or in any suitable sub-combination thereof.

Terms "a", "an" and "the" used herein are used to refer to one or more (i.e., at least one) feature(s). For example, "a component" refers to one or more components, that is, there may be more than one component contemplated for use or used in embodiments of the present disclosure.

The terms "include", "include" and "contain" are an open-ended expression which includes the materials defined in the present disclosure, but does not exclude other materials.

As described herein, the compounds of the present disclosure, such as compounds of above formulas, of specific examples, of subclasses and inclusions of the present disclosure, may be optionally substituted with one or more substituents.

In general, the term "substituted" means that one or more hydrogen atoms in a given structure are replaced by a particular substituent. Unless otherwise indicated, a substituted group may have a substituent at any substitutable position of the group. There may be several positons of the group where can bear one or more, same or different, substituents.

In the specification of the present disclosure, substituents of the compounds are disclosed herein in terms of type or range of the groups. In particular, a general combination term may include individuals and subclasses thereof. For example, the term "$C_{1-6}$ alkyl" specifically refers to the independently disclosed methyl, ethyl, $C_3$-alkyl, $C_4$-alkyl, $C_5$-alkyl and $C_6$-alkyl groups.

The term "alkyl" or "alkyl group" as used herein refers to a saturated straight or branched chain monovalent hydrocarbon group. Specifically, the alkyl group may be substituted by one or more substituents described in the present disclosure. Unless otherwise specified, an alkyl group contains 1 to 20 carbon atoms. In one embodiment, the alkyl group contains 1 to 12 carbon atoms. In another embodiment, the alkyl group contains 3 to 12 carbon atoms. In a further embodiment, the alkyl group contains 1 to 6 carbon atoms. In yet another embodiment, the alkyl group contains 1 to 4 carbon atoms.

Examples of alkyl groups include, but are not limited to, methyl (Me, —CH$_3$), ethyl (Et, —CH$_2$CH$_3$), n-propyl (n-Pr, —CH$_2$CH$_2$CH$_3$), isopropyl (i-Pr, —CH(CH$_3$)$_2$), n-butyl (n-Bu, —CH$_2$CH$_2$CH$_2$CH$_3$), isobutyl (i-Bu, —CH$_2$CH (CH$_3$)$_2$), sec-butyl (s-Bu, —CH(CH$_3$)CH$_2$CH$_3$), tert-butyl (t-Bu, —C(CH$_3$)$_3$), n-pentyl (—CH$_2$CH$_2$CH$_2$CH$_2$CH$_3$), 2-pentyl (—CH(CH$_3$)CH$_2$CH$_2$CH$_3$), 3-pentyl (—CH (CH$_2$CH$_3$)$_2$), 2-methyl-2-butyl (—C(CH$_3$)$_2$CH$_2$CH$_3$), 3-methyl-2-butyl (—CH(CH$_3$)CH(CH$_3$)$_2$), 3-methyl-1-butyl (—CH$_2$CH$_2$CH(CH$_3$)$_2$), 2-methyl-1-butyl (—CH$_2$CH (CH$_3$)CH$_2$CH$_3$), n-hexyl (—CH$_2$CH$_2$CH$_2$CH$_2$CH$_2$CH$_3$), 2-hexyl (—CH(CH$_3$)CH$_2$CH$_2$CH$_2$CH$_3$), 3-hexyl (—CH (CH$_2$CH$_3$)(CH$_2$CH$_2$CH$_3$)), 2-methyl-2-pentyl (—C- (CH$_3$)$_2$CH$_2$CH$_2$CH$_3$), 3-methyl-2-pentyl (—CH(CH$_3$)CH (CH$_3$)CH$_2$CH$_3$), 4-methyl-2-pentyl (—CH(CH$_3$)CH$_2$CH (CH$_3$)$_2$), 3-methyl-3-pentyl (—C(CH$_3$)(CH$_2$CH$_3$)$_2$), 2-methyl-3-pentyl (—CH(CH$_2$CH$_3$)CH(CH$_3$)$_2$), 2,3-dimethyl-2-butyl (—C(CH$_3$)$_2$CH(CH$_3$)$_2$), 3,3-dimethyl-2-butyl (—CH(CH$_3$)C(CH$_3$)$_3$), n-heptyl and n-octyl.

The term "halogen" refers to fluorine (F), chlorine (Cl), bromine (Br) or iodine (I).

The term "aryl" refers to a monocyclic, bicyclic or tricyclic carbocyclic system containing 6 to 14 atoms, or 6 to 12 atoms, or 6 to 10 atoms. Specifically, at least one ring is aromatic and one or more positions of the aromatic group are bonded to the rest of the group. The term "aryl" can be used interchangeably with the term "aromatic ring". In one embodiment, the aryl group is a carbocyclic system composed of 6 to 10 atoms and having at least one aromatic ring. Examples of the aryl group may include phenyl, naphthyl and anthracenyl. Specifically, the aryl group may be independently and optionally substituted by one or more substituents described herein.

The term "alkylamino" includes "N-alkylamino" and "N,N-dialkylamino", specifically, the amino is substituted by one or two alkyl groups. In a specific example of alkylamino, one or two C$_{1-6}$ or C$_{1-4}$ alkyl is attached to a nitrogen atom. The alkylamino group may be monoalkylamino or dialkylamino, examples of which include, but are not limited to, N-methylamino, N-ethylamino, N,N-dimethylamino and N,N-diethylamino.

The term "arylamino" includes "N-arylamino" and "N,N-diarylamino", specifically, the amino is substituted by one or two aryl groups. In a specific example of arylamino, one or two C$_{1-6}$ aryl is attached to a nitrogen atom. The arylamino group may be monoarylamino or diarylamino, examples of which include, but are not limited to, N-phenylamino, N,N-diphenylamino and N,N-dinaphthylamino.

The term "solvate" used herein refers to an association complex formed by one or more solvents and a compound of the present disclosure. The solvent forming the solvates includes, but is not limited to, water, isopropanol, ethanol, methanol, dimethyl sulfoxide, ethyl acetate, acetic acid and amino ethanol. The term "hydrate" refers to an association complex using water as the solvent.

When the solvent is water, the term "hydrate" can be used. In an embodiment, a compound molecule of the present disclosure may be combined with a water molecule, such as a monohydrate. In another embodiment, a compound molecule may be combined with more than one water molecules, such as a dihydrate. In a further embodiment, a compound molecule may be combined with less than one water molecule, such as a hemihydrate. It should be noted that the hydrates of the present disclosure can keep the chemical availability of the compounds in a non-hydrated form.

In embodiments of the present disclosure, a compound is provided. The compound is compound of formula (I),

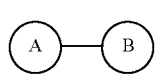
(I)

in which A is a six- or eight-membered ring consisting of repeated —(P═N)—, and

B is at least one of unsubstituted or substituted C$_{1-6}$ alkylamino, unsubstituted or substituted C$_{1-6}$ cycloalkylamino, unsubstituted or substituted arylamino,

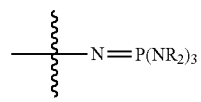

or halogen, and B is attached to A at phosphorus in —(P═N)—, in which

R is unsubstituted or substituted C$_{1-6}$ alkyl, unsubstituted or substituted C$_{1-6}$ cycloalkyl, unsubstituted or substituted aryl, or unsubstituted or substituted benzyl,
or
R forms C$_{1-6}$ heterocycloalkyl together with N attached thereto;
or a solvate thereof.

In some embodiments of the present disclosure, B is at least one selected from the group consisting of

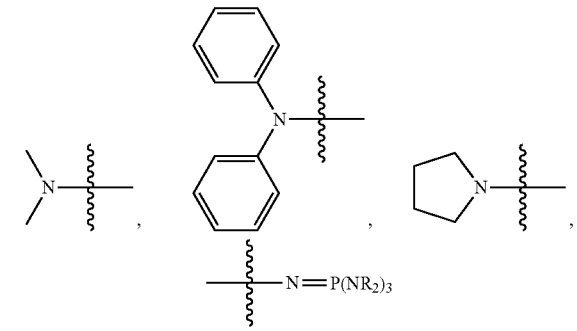

and Cl, in which R is methyl, ethyl, isopropyl, n-butyl, cyclohexyl, phenyl or benzyl, or R

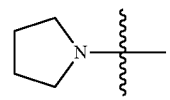

forms together with nitrogen attached thereto.

In some embodiments of the present disclosure, the compound is a compound of any one of formulas:

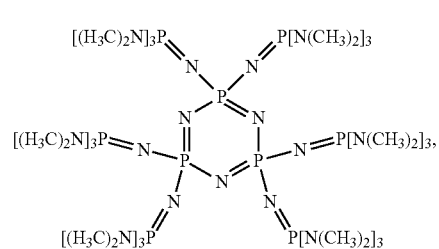
(C-1)

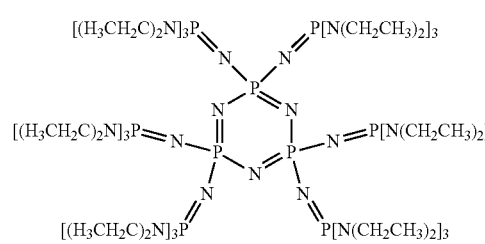
(C-2)

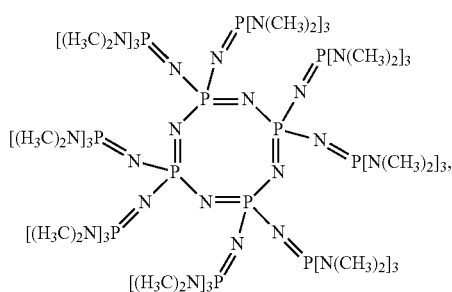
(C-3)
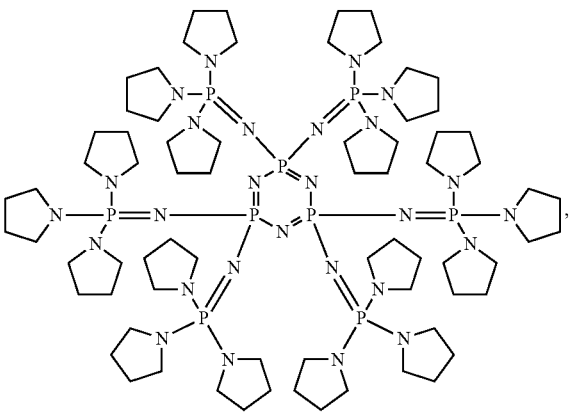
(C-6)
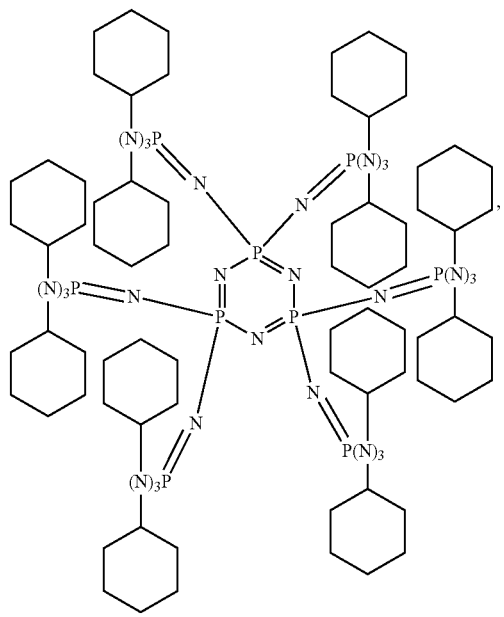
(C-4)
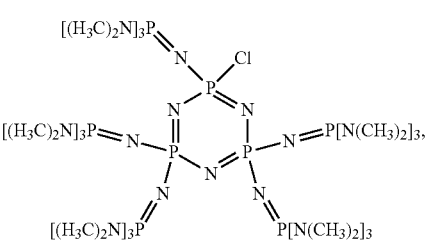
(C-7)
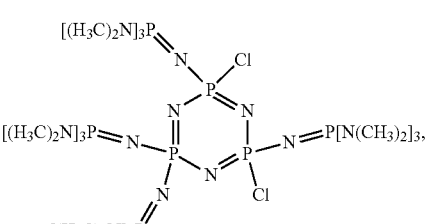
(C-8)
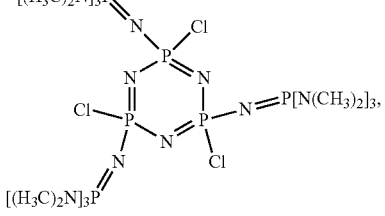
(C-9)
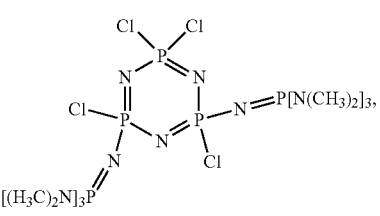
(C-10)
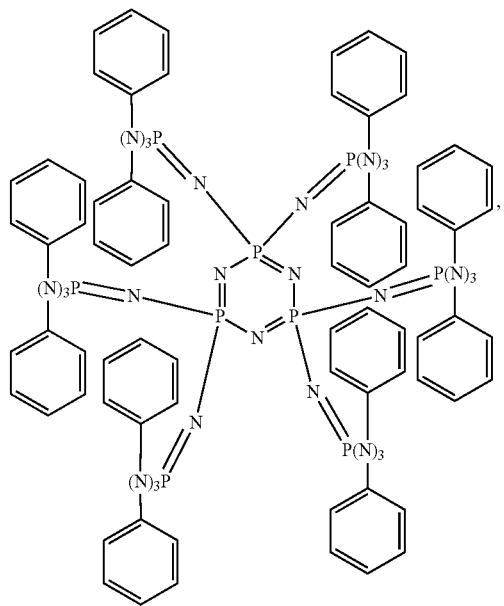
(C-5)
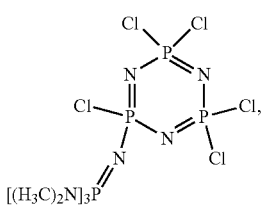
(C-11)

(C-12)

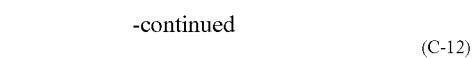

(C-13)

(C-14)

or a solvate thereof.

According to embodiments of the present disclosure, the compound has a good symmetry and an excellent stability which benefits in storage and transport. Moreover, the compound is free of heavy metal elements and is an eco-friendly product.

In embodiments of the present disclosure, a method for preparing a cyclic oligomeric phosphazene compound is provided. The method includes following steps.

In step (a), phosphorus pentachloride is in contact with a compound of formula X $NHR_2$ and ammonia gas, thereby obtaining a compound of formula 1

$$R_2N-\overset{NR_2}{\underset{NR_2}{\overset{\oplus}{P}}}-NH_2 \quad Cl^{\ominus}.$$

Phosphorus pentachloride is suspended in a first anhydrous solvent at a low temperature with vigorous stirring in a nitrogen atmosphere. The compound of formula X is added continually into the reaction system. Then, the system stands to the room temperature naturally and reactions are kept for 1 to 6 hours. The mixture is cooled to a low temperature again and ammonia gas is introduced until a saturated solution is obtained, i.e., the ammonia has the maximum solubility in the solution. Then the system stands to the room temperature naturally and ammonia gas is continuously introduced for 1 to 6 hours. Filtration is performed to remove insoluble materials or substances, and distillation is performed to remove the solvent, and thus the compound of formula 1 is obtained.

In an embodiment of the present disclosure, the first anhydrous solvent may include at least one selected from the group consisting of benzene, toluene, xylene, dichloromethane and tetrahydrofuran. In another embodiment of the present disclosure, the first anhydrous solvent is dichloromethane. It is surprising found that phosphorus pentachloride and the compound of the formula X show good solubility in anhydrous dichloromethane, and thus the anhydrous dichloromethane can dissolve the reactants sufficiently, thereby improving the reaction efficiency.

In an embodiment of the present disclosure, a molar ratio of the phosphorus pentachloride to the compound of the formula X is 1:(3 to 10). It is surprising found that if the amount of the compound represented by the formula X is too low, the chlorine atom in the phosphorus pentachloride cannot be sufficiently replaced, resulting in difficulty in obtaining the compound represented by the formula 1.

Specifically, R is unsubstituted or substituted $C_{1-6}$ alkyl, unsubstituted or substituted $C_{1-6}$ cycloalkyl, unsubstituted or substituted aryl, or unsubstituted or substituted benzyl, or R forms $C_{1-6}$ heterocycloalkyl together with N attached thereto, as described above.

In an embodiment of the present disclosure, the reaction system is in the both at a low temperature of −80 to 0° C. It is surprising found that if the temperature of the reaction system is too high, the reaction will be too intense to be controlled. On this basis, the temperature of the bath should be kept in a range of −80 to 0° C., thus controlling the reaction to proceed smoothly under this low temperature condition.

In step (b), the compound of formula 1 is reacted with a base, thereby obtaining a compound of formula 2

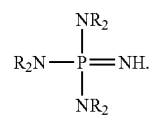

Specifically, R is defined as described above.

In an embodiment of the present disclosure, the base is sodium hydroxide.

In an embodiment of the present disclosure, the base may be an aqueous sodium hydroxide solution having a concentration of 20 to 70 wt %. In another embodiment, the base may be an aqueous sodium hydroxide solution having a concentration of 50 wt %. For example, with the 50 wt % aqueous sodium hydroxide solution, the compound of the formula 1 may be effectively reacted and the chloride ion therein may be replaced, thus obtaining the compound of the formula 2.

In step (c), the compound of formula X or the compound of formula 2 to be in contact with hexachloro-cyclotriphosphazene or octachloro-cyclotetraphosphazene, thereby obtaining the compound described in the embodiments of the first aspect.

Specifically, the compound of formula 2, hexachloro-cyclotriphosphazene or octachloro-cyclotetraphosphazene, and an acid scavenger are dissolved in a second anhydrous solvent in a nitrogen atmosphere and refluxing and reacting for 3 to 18 hours. After reaction, hydrochloride formed by chlorine atom in the phosphorus pentachloride and the acid scavenger is filtered off, and the obtained filtrate is concentrated to obtain the compound of the present disclosure.

In an embodiment of the present disclosure, the second anhydrous solvent may include at least one selected from the group consisting of benzene, toluene, xylene, chlorobenzene and tetrahydrofuran. In another embodiment of the present disclosure, the second anhydrous solvent is toluene. It is surprising found that phosphorus pentachloride and the compound of the formula X show good solubility in chlorobenzene, and thus the chlorobenzene can dissolve the reactants sufficiently, thereby improving the reaction efficiency.

In an embodiment of the present disclosure, hexachloro-cyclotriphosphazene or octachloro-cyclotetraphosphazene, the compound of the formula X or the compound of formula 2 and the acid scavenger are provided at a molar ratio ranging from 1:(1 to 8):(1 to 8). It is surprising found that by controlling the ratio of hexachloro-cyclotriphosphazene or octachloro-cyclotetraphosphazene, the compound of the formula X or the compound of formula 2 and the acid scavenger, an amount of chlorine atoms being replaced can be controlled, thus obtaining a target phosphazene compound substituted with a different number of groups.

In an embodiment of the present disclosure, the acid scavenger includes at least one selected from the group consisting of triethylamine, sodium carbonate, sodium hydrogen carbonate, sodium hydroxide and potassium hydroxide. In another embodiment of the present disclosure the acid scavenger is triethylamine. Since a small molecule of HCl is generated during the reaction between the compound of the formula 2 and hexachloro-cyclotriphosphazene or octachloro-cyclotetraphosphazene, it is necessary to add the acid scavenger to be reacted with HCl to generate a hydrochloride, thus removing HCl from the system. In an embodiment of the present disclosure, triethylamine is used as the acid scavenger, and the triethylamine salt generated by the reaction of triethylamine with HCl has a small solubility in the organic solvent and thus is easily removed by filtration.

In an embodiment of the present disclosure, the compound of the formula X or the compound of formula 2 is reacted with hexachloro-cyclotriphosphazene or octachloro-cyclotetraphosphazene at 40 to 150° C. for improving the reaction efficiency.

With the method according to the embodiments of the present disclosure, the compound of the present disclosure can be efficiently prepared. Moreover, the raw materials used are obtained easily, the cost is low, and the process is simple.

In a specific embodiment of the present disclosure, the method for preparing the compound described above may include:

placing phosphorus pentachloride in anhydrous dichloromethane and adding the compound of formula X in anhydrous dichloromethane at −80 to 0° C. in a nitrogen atmosphere for 1 to 6 hours, thereby obtaining an intermediate, continuously introducing an ammonia gas into the intermediate at −80 to 0° C. for another 1 to 6 hours, performing a filtration treatment to obtain a first filtrate, and removing remained solvent in the first filtrate by distillation, thereby obtaining a compound of formula 1, mixing the compound of formula 1 with a 50 wt % aqueous sodium hydroxide solution for 1 to 5 hours, performing a filtration treatment to obtain a second filtrate, and removing remained solvent in the second filtrate by distillation, thereby obtaining a compound of formula 2, mixing hexachloro-cyclotriphosphazene or octachloro-cyclotetraphosphazene, the compound of formula X or the compound of formula 2, and triethylamine in a nitrogen atmosphere in anhydrous toluene to obtain a mixture, refluxing the mixture for 3 to 18 hours, performing a filtration treatment to obtain a third filtrate, and removing remained solvent in the third filtrate by distillation, thereby obtaining the compound of the present disclosure as described above, where the formula X is $NHR_2$ the formula 1 is

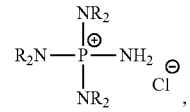

and the formula 2 is

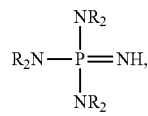

R is defined as described above.

With the method according to the embodiments of the present disclosure, the compound of the present disclosure can be efficiently prepared. Moreover, the raw materials used are obtained easily, the cost is low, and the process is simple.

In embodiments the present disclosure, use of the compound of the present disclosure for a catalyst in a polymerization reaction is provided. According to an embodiment of the present disclosure, the compound of the above embodiments of the present disclosure can be used as a catalyst for preparing different kinds of polyester, polyether, ester copolymer, ether copolymer and polycarbonate copolymer. The structure of the prepared polymer product is controllable. Moreover, the product is free of heavy metal elements, has a low content of catalysts remained and a good biocompatibility, and thus has a high additional value and can be widely used in this art.

In embodiments the present disclosure, a method for producing a polymer with a compound as a catalyst is provided. The method includes: allowing the catalyst to be in contact with at least one monomer, thereby obtaining the polymer, in which the catalyst is the compound provided by the present disclosure.

In an embodiment of the present disclosure, the catalyst is in contact with at least one monomer, thereby obtaining the polymer. Specifically, the catalyst is the compound provided according the embodiments of the present disclosure.

In an embodiment of the present disclosure, the monomer includes at least one selected from the group consisting of epoxy ethane, epoxy propane, epoxy chloropropane, 1,2-epoxy butane, glycolide, lactide, γ-butyrolactone, δ-valerolactone, ε-caprolactone, β-lactam, methyl-substituted β-lactam, butyrolactam, caprolactam, trimethylene carbonate, 2,2-dimethyltrimethylene carbonate, 1,3-dioxan-2-one, trioxane, five-membered cyclic phosphate, six-membered cyclic phosphate, octamethyl-cyclotetrasiloxane, hexamethyl-cyclotrisiloxane, acrylamide, methyl-substituted acrylamide, methyl acrylate, methyl methacrylate and N-carboxy-α-amino-anhydride.

In an embodiment of the present disclosure, the contact is performed in an anhydrous solvent in the presence of an initiator, thus further improving the yield of the polymer.

In an embodiment of the present disclosure, the initiator includes at least one selected from methanol, ethanol, isopropanol, n-butanol, tert-butanol, glycol, glycerol, cholesterol, phenol, benzyl alcohol, n-butyric acid, n-pentanoic acid, n-hexanoic acid, n-heptanoic acid, n-octanoic acid, n-decanoic acid, dodecanoic acid, tetradecanoic acid, palmitic acid, triethylamine, tri-n-butylamine, trihexylamine, benzamide, polyethylene glycol, polyoxypropylene glycol and polytetramethylene ether glycol.

In an embodiment of the present disclosure, the anhydrous solvent includes at least one selected from the group consisting of benzene, toluene, n-hexane, tetrahydrofuran and dichloromethane. In another embodiment of the present disclosure, the anhydrous solvent is toluene. Therefore, the yield of the polymer may be further improved.

In an embodiment of the present disclosure, the catalyst, the initiator and the monomer are provided at a molar ratio of 1:(0 to 200):(50 to 100000). In another embodiment of the present disclosure, the catalyst, the initiator and the monomer are provided at a molar ratio of 1:(1 to 10):(100 to 2000). Therefore, the yield of the polymer may be further improved.

In an embodiment of the present disclosure, the contact is performed at −40 to 150° C. for 0.1 to 72 hour(s). In another embodiment of the present disclosure, the contact is performed at 20 to 100° C. for 0.5 to 48 hour(s). Therefore, the yield of the polymer may be further improved.

In an embodiment of the present disclosure, when the monomer is at least one selected from the group consisting of epoxy ethane, epoxy propane, epoxy chloropropane, 1,2-epoxy butane, β-lactam, methyl-substituted β-lactam, butyrolactam and caprolactam, polymers made from the monomers may be prepared as follows. In a nitrogen atmosphere, a compound of the present disclosure is dissolved in anhydrous toluene and added into a reactor. Anhydrous toluene is then removed by decompression. Monomers and initiators are added into the reactor and then the reactor is sealed for 0.5 to 48 hour(s), thereby obtaining the polymer.

In an embodiment of the present disclosure, when the monomer is at least one selected from the group consisting of glycolide, lactide, γ-butyrolactone, δ-valerolactone, ε-caprolactone, trimethylene carbonate, 2,2-dimethyltrimethylene carbonate, 1,3-dioxan-2-one, trioxane, five-membered cyclic phosphate, six-membered cyclic phosphate, octamethyl-cyclotetrasiloxane, hexamethyl-cyclotrisiloxane, acrylamide, methyl-substituted acrylamide, methyl acrylate, methyl methacrylate and N-carboxy-α-amino-anhydride, polymers made from the monomers may be prepared as follows. In a nitrogen atmosphere, a compound of the present disclosure is dissolved in anhydrous solvent and added into a reaction tube. Monomers and initiators are added into the tube and then the tube is sealed for 0.5 to 48 hour(s), thereby obtaining the polymer.

In an embodiment of the present disclosure, the compound of the embodiments of the present disclosure can also be used as a catalyst for a ring-opening polymerization reaction of cyclic monomers, such as N-carboxylic anhydride (NCA, having a structure of formula D-1 as shown below, where Rx represents a substituent), N-substituted glycine-N-carboxylic anhydride ($^N$Rx-NCA, having a structure of formula D-2 as shown below, where Rx represents a substituent), N-substituted glycine-N-thiocarboxylic anhydride ($^N$Rx-NTA, having a structure of formula D-3 as shown below, where Rx represents a substituent), thereby obtaining a polymer product.

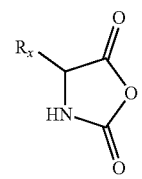

D-1

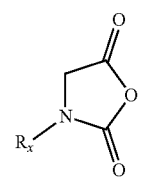

D-2

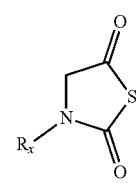

D-3

In an embodiment of the present disclosure, Rx in D-1 may be a side group of amino acid with or without a protecting group, i.e., a substituted group, in which the amino acid may be glycine, alanine, leucine, valine, Isoleucine, phenylalanine, γ-benzyl-glutamate, β-benzyl-aspartate, ε-benzyloxycarbonyl-lysine or other amino acids modified with a side chain. In D-2 and D-3, Rx may be a substituted or unsubstituted alkyl, phenyl, alkenyl, alkynyl or oligoethylene glycol. Moreover, alkyl may be further substituted with vinyl, phenyl, or halogen. The repeating number of oligoethylene glycol is less than 9.

In an embodiment of the present disclosure, when the NCA, $^N$Rx-NCA or $^N$Rx-NTA is polymerized with the compound of the present disclosure as the catalyst, anhydrous solvent may be at least one selected from the group consisting of tetrahydrofuran, N,N-dimethylformamide, N,N-dimethylacetamide, dimethyl sulfoxide, acetonitrile, benzonitrile, N-methylpyrrolidone, toluene, dichloromethane and trichloromethane, and besides the initiators described above, the initiator used may also be an amine compound, such as alkylamine, benzylamine, terminal amino-modified polyethylene glycol or hexamethyldisilazane (HMDS).

In an embodiment of the present disclosure, the compound provided in the present disclosure can be used as the catalyst for the preparation of a block copolymer with different kinds of monomers. The block copolymer may be prepared as follows. In a nitrogen atmosphere, a compound of the present disclosure is dissolved in anhydrous solvent and added into a reactor or a reaction tube. Monomers (first monomers) and the initiator are added into the reactor or the tube and then the reactor or the tube is sealed until all the first monomers are conversed, and then monomers (second monomers) of another kind are added. Once the second monomers are conversed completely, monomers (third monomers) of a further kind are added, thereby obtaining the block copolymer. The first, second and third monomers may be selected from the monomers described above.

In an embodiment of the present disclosure, the compound provided in the present disclosure can be used as the catalyst for the preparation of a random copolymer with different kinds of monomers. The random copolymer may be prepared as follows. In a nitrogen atmosphere, a compound of the present disclosure is dissolved in anhydrous solvent and added into a reactor or a reaction tube, and the initiator is added subsequently. Two kinds of monomers (a) and monomers (b) are mixed uniformly in the anhydrous solvent and further added into the reactor or the reaction tube, and then the reactor or the tube is sealed for 0.5 to 48 hour(s), thereby obtaining the random copolymer. Monomers (a) and monomers (b) may be selected from the monomers described above.

With the process for preparing a polymer with the compound according to the embodiments of the present disclosure as a catalyst, different kinds of polymers having controllable structure and exhibiting good stability can be obtained. Moreover, the product is free of heavy metal elements, has a low content of catalysts remained and a good biocompatibility, and thus has a high additional value and can be widely used in this art. At the same time, the process has mild conditions and good universality, and is suitable for large-scale production.

Additional aspects and advantages of the present disclosure will be set forth in the following description.

The present disclosure will be described in detail with reference to the embodiments which are explanatory, illustrative, and used to generally understand the present disclosure. The embodiments shall not be construed to limit the present disclosure.

Embodiment 1

Preparation of tri(dimethylamino)-phosphazene

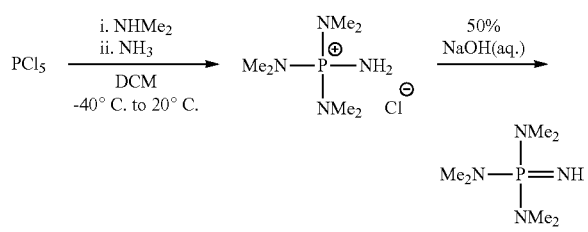

Phosphorus pentachloride (41.7 g, 0.2 mol, 1.0 equiv.) was added into a 1 L three-necked flask equipped with mechanical stirring. 150 mL anhydrous dichloromethane was added into the flask in a low temperature bath at −40° C. with vigorous stirring in a nitrogen atmosphere. Dimethylamine gas (54 g, 1.2 mol, 6.0 equiv.) was introduced into the reaction system in a continuous manner at a solution temperature maintained below −30° C. After the introduction, the temperature of the system was naturally raised to 20° C., and the reaction was continued for 1 hour. The system temperature was again lowered to −20° C., and ammonia gas was introduced to make the system saturated.

Then, the temperature of the system was raised to 20° C. and the ammonia gas was continuously to introduced for 3 hours until no precipitation generated on the surface of the system with no stirring.

Further, insoluble materials were filtered off and the solvent was removed by distillation under reduced pressure, and the obtained solid was added into 400 mL of aqueous sodium hydroxide (50 wt %) and allowed to react at room temperature for 1 hour. After the reaction, the insoluble materials were filtered off, the solvent was removed by organic phase distillation under reduced pressure (20° C., 300 mmHg), thereby obtaining a colourless liquid of 33 g with a yield of 93%.

$^1$H NMR (500 MHz, CDCl$_3$) δ: 2.52 (d, 18H). $^{13}$C NMR (125 MHz, CDCl$_3$) δ: 81.68. $^{31}$P NMR (500 MHz, CDCl$_3$) δ: 43.75. HRMS (ESI) calcd for C$_6$H$_{19}$N$_4$P [M+H]$^+$, 179.1426, found 179.1417.

Embodiment 2

Preparation of tri(diethylamino)-phosphazene

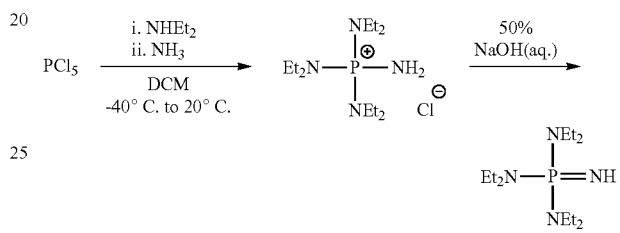

Phosphorus pentachloride (41.7 g, 0.2 mol, 1.0 equiv.) was added into a 1 L three-necked flask equipped with mechanical stirring. 150 mL anhydrous dichloromethane was added into the flask in a low temperature bath at −40° C. with vigorous stirring in a nitrogen atmosphere. Diethylamine (124 mL, 1.2 mol, 6.0 equiv.) was added dropwise into the reaction system at a solution temperature maintained below −30° C. After the addition, the temperature of the system was naturally raised to 20° C., and the reaction was continued for 2 hours. The system temperature was again lowered to 0° C., and ammonia gas was introduced to make the system saturated. Then, the temperature of the system was raised to 20° C. and the ammonia gas was continuously introduced for 3 hours until no precipitation generated on the surface of the system with no stirring. Further, insoluble materials were filtered off and the solvent was removed by distillation under reduced pressure, and thus obtained solid was added into 400 mL of aqueous sodium hydroxide (50 wt %) and allowed to react at room temperature for 1 hour. After the reaction, insoluble materials were filtered off, the solvent was removed by organic phase distillation under reduced pressure (20° C., 300 mmHg), thereby obtaining colourless liquid of 52.0 g with a yield of 99%.

$^1$H NMR (500 MHz, CDCl$_3$) δ: 2.58 (t, 12H), 1.08 (q, 18H). HRMS (ESI) calcd for C$_{12}$H$_{31}$N$_4$P [M+H]$^+$, 263.2365, found 263.2359.

Embodiment 3

Preparation of tri(dicyclohexylamino)-phosphazene

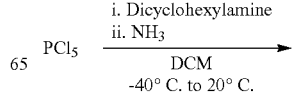

-continued

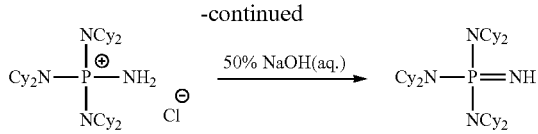

Phosphorus pentachloride (41.7 g, 0.2 mol, 1.0 equiv.) was added into a 1 L three-necked flask equipped with mechanical stirring. 150 mL anhydrous dichloromethane was added into the flask in a low temperature bath at −40° C. with vigorous stirring in a nitrogen atmosphere. Dicyclohexylamine (239 mL, 1.2 mol, 6.0 equiv.) was added dropwise into the reaction system at a solution temperature maintained below −30° C. After the addition, the temperature of the system was naturally raised to 20° C., and the reaction was continued for 1 hour. The system temperature was again lowered to 0° C., and ammonia gas was introduced to make the system saturated. Then, the temperature of the system was raised to 20° C. and the ammonia gas was continuously introduced for 3 hours until no precipitation generated on the surface of the system with no stirring. Further, insoluble materials were filtered off and the solvent was removed by distillation under reduced pressure, and thus obtained solid was added into 400 mL of aqueous sodium hydroxide (50 wt %) and allowed to react at room temperature for 1 hour. After the reaction, insoluble materials were filtered off, the solvent was removed by organic phase distillation under reduced pressure (20° C., 300 mmHg), thereby obtaining colourless liquid of 88 g with a yield of 75%.

$^1$H NMR (500 MHz, CDCl$_3$) δ: 2.57 (m, 6H), 1.68-1.07 (m, 60H). HRMS (ESI) calcd for C$_{36}$H$_{67}$N$_4$P [M+H]$^+$, 587.5182, found 587.5173.

Embodiment 4

Preparation of tri(diphenylamino)-phosphazene

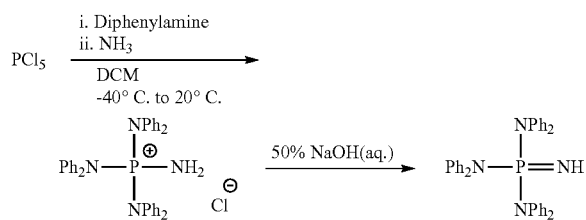

Phosphorus pentachloride (41.7 g, 0.2 mol, 1.0 equiv.) was added into a 1 L three-necked flask equipped with mechanical stirring. 150 mL anhydrous dichloromethane was added into the flask in a low temperature bath at −40° C. with vigorous stirring in a nitrogen atmosphere. A Diphenylamine-containing dichloromethane solution (the contained diphenylamine is of 203 g, 1.2 mol, 6.0 equiv.) was added dropwise into the reaction system at a solution temperature maintained below −30° C. After the addition, the temperature of the system was naturally raised to 20° C., and the reaction was continued for 1 hour. The system temperature was again lowered to −20° C., and ammonia gas was introduced to make the system saturated. Then, the temperature of the system was raised to 20° C. and the ammonia gas was continuously introduced for 3 hours until no precipitation generated on the surface of the system with no stirring. Further, insoluble materials were filtered off and the solvent was removed by distillation under reduced pressure, and thus obtained solid was added into 400 mL of aqueous sodium hydroxide (50 wt %) and allowed to react at room temperature for 1 hour. After the reaction, insoluble materials were filtered off, the solvent was removed by organic phase distillation under reduced pressure (20° C., 300 mmHg), thereby obtaining white solid of 79 g with a yield of 72%.

$^1$H NMR (500 MHz, CDCl$_3$) δ: 7.45 (m, 12H), 6.98 (m, 6H), 6.77 (m, 12H). HRMS (ESI) calcd for C$_{36}$H$_{31}$N$_4$P [M+H]$^+$, 551.2365, found 551.2352.

Embodiment 5

Preparation of tripyrrolidine-phosphazene

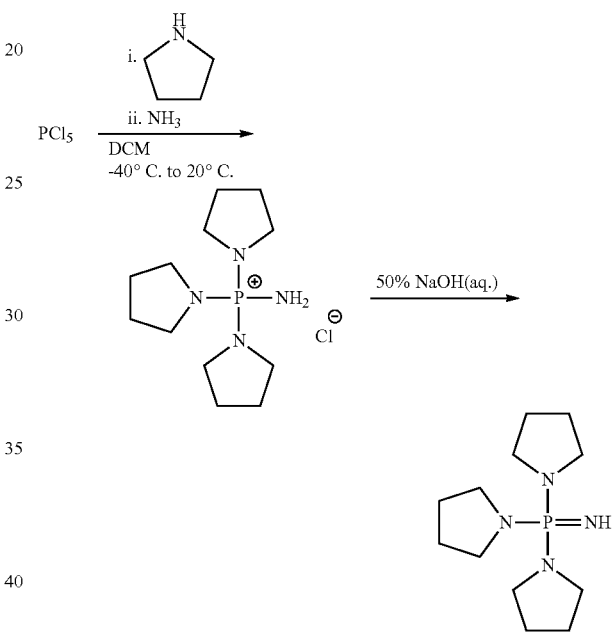

Phosphorus pentachloride (41.7 g, 0.2 mol, 1.0 equiv.) was added into a 1 L three-necked flask equipped with mechanical stirring. 150 mL anhydrous dichloromethane was added into the flask in a low temperature bath at −40° C. with vigorous stirring in a nitrogen atmosphere. Pyrrolidine (99 mL, 1.2 mol, 6.0 equiv.) was added dropwise into the reaction system at a solution temperature maintained below −30° C. After the addition, the temperature of the system was naturally raised to 20° C., and the reaction was continued for 2 hours. The system temperature was again lowered to −20° C., and ammonia gas was introduced to make the system saturated. Then, the temperature of the system was raised to 20° C. and the ammonia gas was continuously introduced for 3 hours until no precipitation generated on the surface of the system with no stirring. Further, insoluble materials were filtered off and the solvent was removed by distillation under reduced pressure, and thus obtained solid was added into 400 mL of aqueous sodium hydroxide (50 wt %) and allowed to react at room temperature for 1 hour. After the reaction, insoluble materials were filtered off, the solvent was removed by organic phase distillation under reduced pressure (20° C., 300 mmHg), thereby obtaining colorless liquid of 44 g with a yield of 85%.

¹H NMR (500 MHz, CDCl₃) δ: 3.17 (m, 12H), 1.68 (m, 12H). HRMS (ESI) calcd for $C_{12}H_{25}N_4P$ $[M+H]^+$, 257.1895, found 257.1888.

Embodiment 6

Preparation of hexa[tri(dimethylamino)-phosphazene]-cyclotriphosphazene

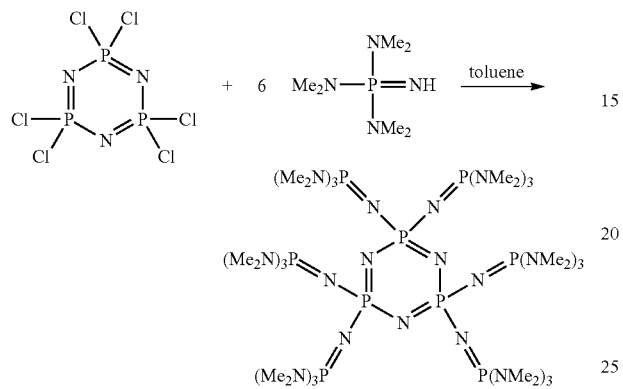

Hexachloro-cyclotriphosphazene (0.7 g, 2.0 mmol, 1.0 equiv.) was dissolved uniformly in 4 mL toluene in a low temperature bath of −78° C. with stirring in a nitrogen atmosphere. Tris(dimethylamino)-phosphazene (2.14 g, 12.0 mmol, 6 equiv.) was dissolved in 4 mL toluene, and further slowly added dropwise to the reaction system. Then, triethylamine (1.21 g, 12.0 mmol, 6.0 equiv.) was added as the acid scavenger. The mixture was heated, refluxed and reacted for 12 hours. After the reaction, the mixture was cooled to room temperature, insoluble materials were filtered off. After concentration, white solid of 1.63 g was obtained with a yield of 68%.

¹H NMR (500 MHz, CDCl₃) δ: 2.63 (d, 108H). ¹³C NMR (125 MHz, CDCl₃) δ: 37.53. ³¹P NMR (500 MHz, CDCl₃) δ: 47.02, 34.87. HRMS (ESI) calcd for $C_{36}H_{108}N_{27}P_9$ $[M+H]^+$, 1198.6998, found 1198.6949.

Embodiment 7

Preparation of hexa[tri(diethylamino)-phosphazene]-cyclotriphosphazene

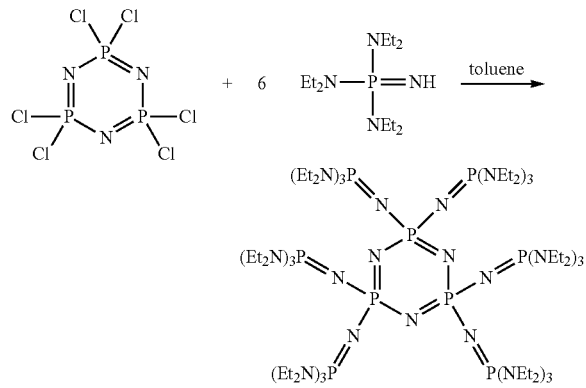

Hexachloro-cyclotriphosphazene (0.7 g, 2.0 mmol, 1.0 equiv.) was dissolved uniformly in 4 mL toluene in a low temperature bath of −78° C. with stirring in a nitrogen atmosphere. Tris(diethylamino)-phosphazene (3.15 g, 12.0 mmol, 6 equiv.) was dissolved in 4 mL toluene, and further slowly added dropwise to the reaction system. Then, triethylamine (1.21 g, 12.0 mmol, 6.0 equiv.) was added as the acid scavenger. The mixture was heated, refluxed and reacted for 12 hours. After the reaction, the mixture was cooled to room temperature, and insoluble materials were filtered off. After concentration, white solid of 1.74 g was obtained with a yield of 51%.

¹H NMR (500 MHz, CDCl₃) δ: 2.65 (t, 72H), 1.11 (q, 108H). HRMS (ESI) calcd for $C_{72}H_{180}N_{27}P_9$ $[M+H]^+$, 1703.2632, found 1703.2609.

Embodiment 8

Preparation of octa[tri(dimethylamino)-phosphazene]-cyclotetraphosphazene

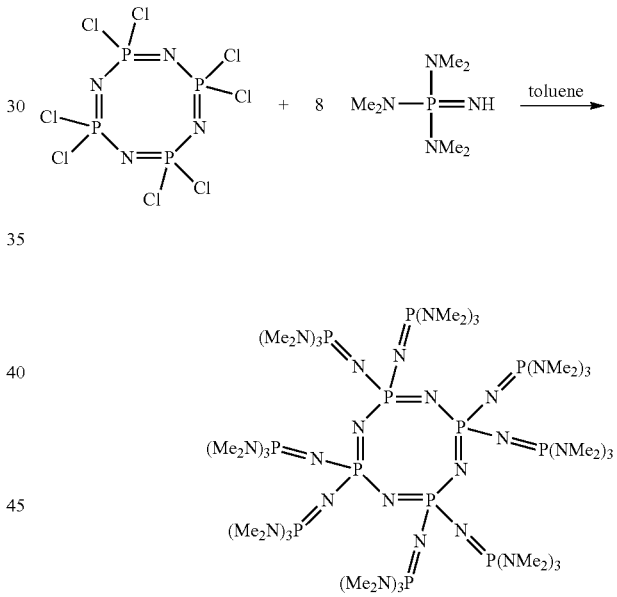

Octachloro-cyclotetraphosphazene (2.32 g, 5.0 mmol, 1.0 equiv.) was dissolved uniformly in 10 mL toluene in a low temperature bath of −78° C. with stirring in a nitrogen atmosphere. Tris(dimethylamino)-phosphazene (7.13 g, 40.0 mmol, 8 equiv.) was dissolved in 10 mL toluene, and further slowly added dropwise to the reaction system. Then, triethylamine (4.05 g, 40.0 mmol, 8.0 equiv.) was added as the acid scavenger. The mixture was heated, refluxed and reacted for 12 hours. After the reaction, the mixture was cooled to room temperature, and insoluble materials were filtered off. After concentration, white solid of 5.75 g was obtained with a yield of 72%.

¹H NMR (500 MHz, CDCl₃) δ: 2.68 (m, 144H). HRMS (ESI-TOF) calcd for $C_{48}H_{145}N_{36}P_{12}$ $[M+H]^+$, 1597.9304, found 1597.9275.

Embodiment 9

Preparation of hexa[tri(dicyclohexylamino)-phosphazene]-cyclotriphosphazene

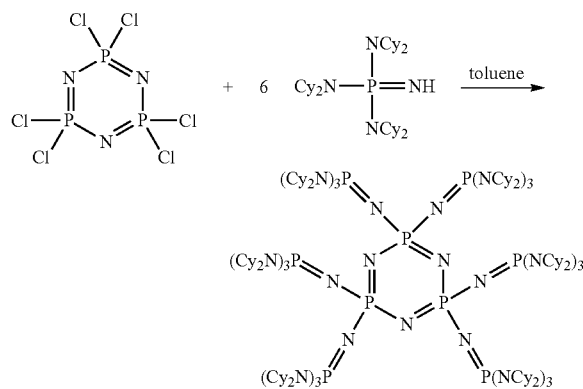

Hexachloro-cyclotriphosphazene (0.7 g, 2.0 mmol, 1.0 equiv.) was dissolved uniformly in 4 mL toluene in a low temperature bath of −78° C. with stirring in a nitrogen atmosphere. Tris(dimethylamino)-phosphazene (7.04 g, 12.0 mmol, 6.0 equiv.) was dissolved in 4 mL toluene, and further slowly added dropwise to the reaction system. Then, triethylamine (1.21 g, 12.0 mmol, 6.0 equiv.) was added as the acid scavenger. The mixture was heated, refluxed and reacted for 12 hours. After the reaction, the mixture was cooled to room temperature, and insoluble materials were filtered off. After concentration, white solid of 4.97 g was obtained with a yield of 68%.

$^1$H NMR (500 MHz, CDCl$_3$) δ: 2.62 (m, 36H), 1.62-1.09 (m, 360H). HRMS (ESI-TOF) calcd for C$_{216}$H$_{396}$N$_{27}$P$_9$ [M+H]$^+$, 3650.9601, found 3650.9575.

Embodiment 10

Preparation of hexa[tri(diphenylamino)-phosphazene]-cyclotriphosphazene

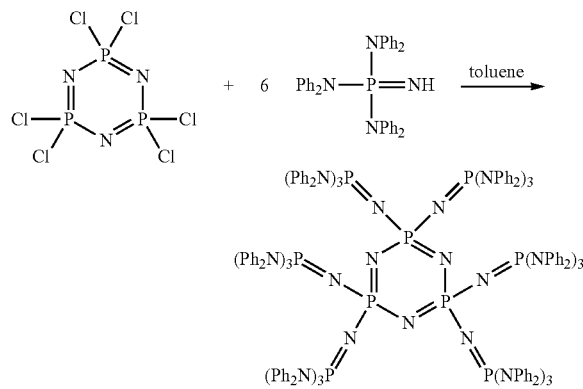

Hexachloro-cyclotriphosphazene (0.7 g, 2.0 mmol, 1.0 equiv.) was dissolved uniformly in 4 mL toluene in a low temperature bath of −78° C. with stirring in a nitrogen atmosphere. Tris(diphenylamino)-phosphazene (6.61 g, 12.0 mmol, 6.0 equiv.) was dissolved in 4 mL toluene, and further slowly added dropwise to the reaction system. Then, triethylamine (1.21 g, 12.0 mmol, 6.0 equiv.) was added as the acid scavenger. The mixture was heated, refluxed and reacted for 12 hours. After the reaction, the mixture was cooled to room temperature, and insoluble materials were filtered off. After concentration, white solid of 3.64 g was obtained with a yield of 53%.

$^1$H NMR (500 MHz, CDCl$_3$) δ: 7.39 (m, 72H), 6.88 (m, 36H), 6.72 (m, 72H). HRMS (ESI-TOF) calcd for C$_{216}$H$_{180}$N$_{27}$P$_9$ [M+H]$^+$, 3433.2699, found 3433.2646.

Embodiment 11

Preparation of hexa[tripyrrolidine-phosphazene]-cyclotriphosphazene

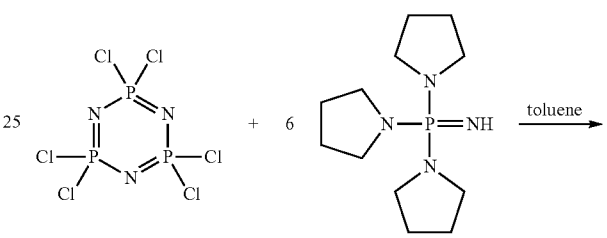

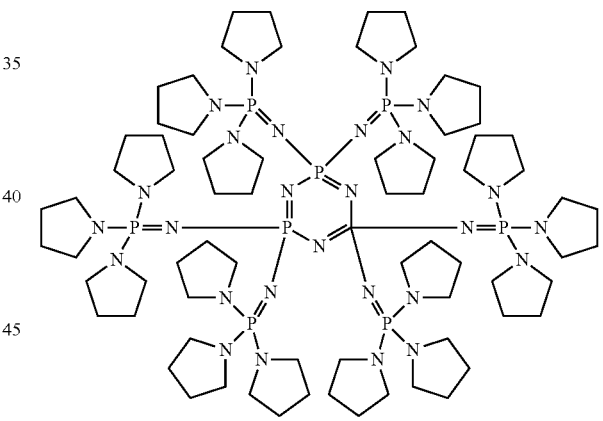

Hexachloro-cyclotriphosphazene (0.7 g, 2.0 mmol, 1.0 equiv.) was dissolved uniformly in 4 mL toluene in a low temperature bath of −78° C. with stirring in a nitrogen atmosphere. Tripyrrolidine-phosphazene (3.08 g, 12.0 mmol, 6.0 equiv.) was dissolved in 4 mL toluene, and further slowly added dropwise to the reaction system. Then, triethylamine (1.21 g, 12.0 mmol, 6.0 equiv.) was added as the acid scavenger. The mixture was heated, refluxed and reacted for 12 hours. After the reaction, the mixture was cooled to room temperature, and insoluble materials were filtered off. After concentration, white solid of 1.93 g was obtained with a yield of 58%.

$^1$H NMR (500 MHz, CDCl$_3$) δ: 3.27 (m, 72H), 1.72 (m, 72H). HRMS (ESI) calcd for C$_{72}$H$_{144}$N$_{27}$P$_9$ [M+H]$^+$, 1666.9815, found 1666.9798.

Embodiment 12

Preparation of penta[tri(dimethylamino)-phosphazene]-chloro-cyclotriphosphazene

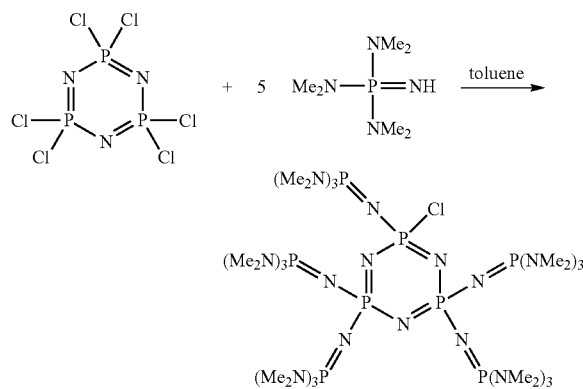

Hexachloro-cyclotriphosphazene (0.7 g, 2.0 mmol, 1.0 equiv.) was dissolved uniformly in 4 mL toluene in a low temperature bath of −78° C. with stirring in a nitrogen atmosphere. Tri(dimethylamino)-phosphazene (1.78 g, 10.0 mmol, 5.0 equiv.) was dissolved in 4 mL toluene, and further slowly added dropwise to the reaction system. Then, triethylamine (1.01 g, 10.0 mmol, 5.0 equiv.) was added as the acid scavenger. The mixture was heated, refluxed and reacted for 12 hours. After the reaction, the mixture was cooled to room temperature, and insoluble materials were filtered off. After concentration, white solid of 1.52 g was obtained with a yield of 72%.

$^1$H NMR (500 MHz, CDCl$_3$) δ: 2.67 (d, 90H). HRMS (ESI) calcd for C$_{30}$H$_{90}$ClN$_{23}$P$_8$ [M+H]$^+$, 1056.5417, found 1056.5399.

Embodiment 13

Preparation of tetra[tri(dimethylamino)-phosphazene]-dichloro-cyclotriphosphazene

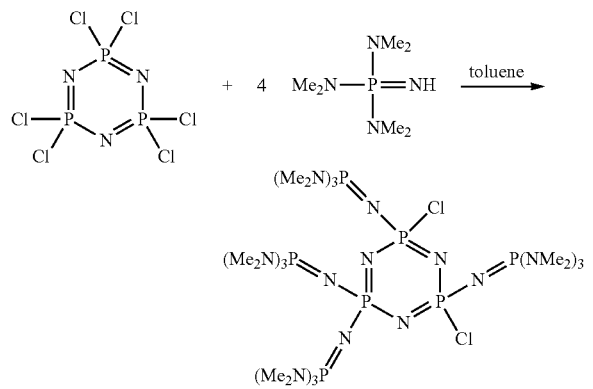

Hexachloro-cyclotriphosphazene (0.7 g, 2.0 mmol, 1.0 equiv.) was dissolved uniformly in 4 mL toluene in a low temperature bath of −78° C. with stirring in a nitrogen atmosphere. Tri(dimethylamino)-phosphazene (1.43 g, 8.0 mmol, 4.0 equiv.) was dissolved in 4 mL toluene, and further slowly added dropwise to the reaction system. Then, triethylamine (0.81 g, 8.0 mmol, 4.0 equiv.) was added as the acid scavenger. The mixture was heated, refluxed and reacted for 12 hours. After the reaction, the mixture was cooled to room temperature, and insoluble materials were filtered off. After concentration, white solid of 1.24 g was obtained with a yield of 68%.

$^1$H NMR (500 MHz, CDCl$_3$) δ: 2.68 (d, 72H). HRMS (ESI) calcd for C$_{24}$H$_{72}$Cl$_2$N$_{19}$P$_7$ [M+M]$^+$, 914.3837, found 914.3819.

Embodiment 14

Preparation of tri[tri(dimethylamino)-phosphazene]-trichloro-cyclotriphosphazene

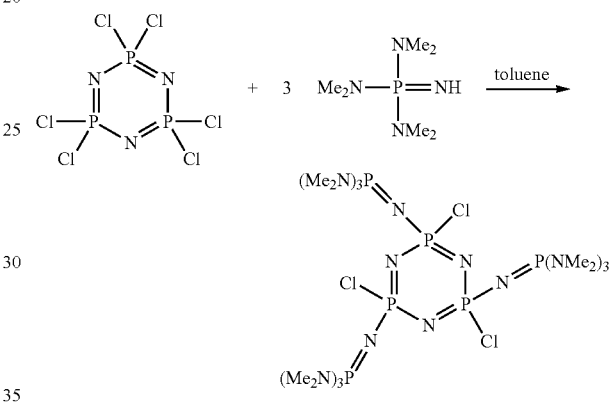

Hexachloro-cyclotriphosphazene (0.7 g, 2.0 mmol, 1.0 equiv.) was dissolved uniformly in 4 mL toluene in a low temperature bath of −78° C. with stirring in a nitrogen atmosphere. Tri(dimethylamino)-phosphazene (1.07 g, 6.0 mmol, 3.0 equiv.) was dissolved in 4 mL toluene, and further slowly added dropwise to the reaction system. Then, triethylamine (0.61 g, 6.0 mmol, 3.0 equiv.) was added as the acid scavenger. The mixture was reacted for 12 hours at room temperature. After the reaction, insoluble materials were filtered off. After concentration, white solid of 1.20 g was obtained with a yield of 78%.

$^1$H NMR (500 MHz, CDCl$_3$) δ: 2.67 (d, 54H). HRMS (ESI) calcd for C$_{18}$H$_{54}$Cl$_3$N$_{15}$P$_6$ [M+H]+, 772.2256, found 772.2247.

Embodiment 15

Preparation of di[tri(dimethylamino)-phosphazene]-tetrachloro-cyclotriphosphazene

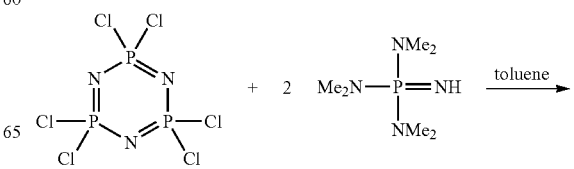

-continued

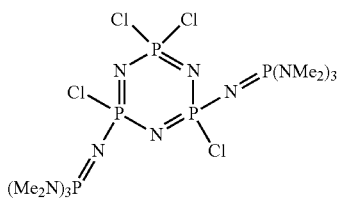

Hexachloro-cyclotriphosphazene (0.7 g, 2.0 mmol, 1.0 equiv.) was dissolved uniformly in 4 mL toluene in a low temperature bath of −78° C. with stirring in a nitrogen atmosphere. Tri(dimethylamino)-phosphazene (0.71 g, 4.0 mmol, 2.0 equiv.) was dissolved in 4 mL toluene, and further slowly added dropwise to the reaction system. Then, triethylamine (0.41 g, 4.0 mmol, 2.0 equiv.) was added as the acid scavenger. The mixture was reacted for 12 hours at room temperature. After the reaction, insoluble materials were filtered off. After concentration, white solid of 0.98 g was obtained with a yield of 78%.

$^1$H NMR (500 MHz, CDCl$_3$) δ: 2.67 (d, 36H). HRMS (ESI) calcd for C$_{12}$H$_{36}$Cl$_4$N$_{11}$P$_5$ [M+H]$^+$, 632.0646, found 632.0633.

Embodiment 16

Preparation of [tri(dimethylamino)-phosphazene]-pentachloro-cyclotriphosphazene

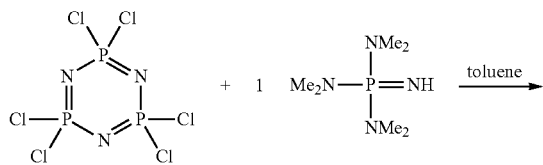

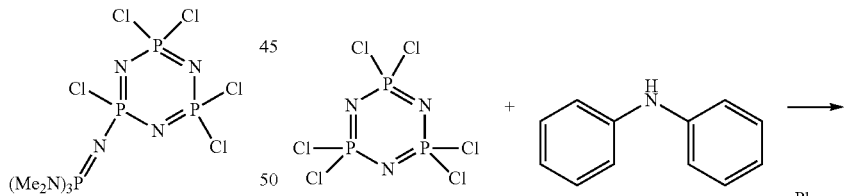

Hexachloro-cyclotriphosphazene (0.7 g, 2.0 mmol, 1.0 equiv.) was dissolved uniformly in 4 mL toluene in a low temperature bath of −78° C. with stirring in a nitrogen atmosphere. Tri(dimethylamino)-phosphazene (0.36 g, 2.0 mmol, 1.0 equiv.) was dissolved in 4 mL toluene, and further slowly added dropwise to the reaction system. Then, triethylamine (0.20 g, 2.0 mmol, 1.0 equiv.) was added as the acid scavenger. The mixture was reacted for 12 hours at room temperature. After the reaction, insoluble materials were filtered off. After concentration, white solid of 0.67 g was obtained with a yield of 68%.

$^1$H NMR (500 MHz, CDCl$_3$) δ: 2.68 (d, 18H). HRMS (ESI) calcd for C$_6$H$_{18}$Cl$_5$N$_7$P$_4$ [M+H]$^+$, 489.9066, found 489.9051.

Embodiment 17

Preparation of hexa(dimethylamino)-cyclotriphosphazene

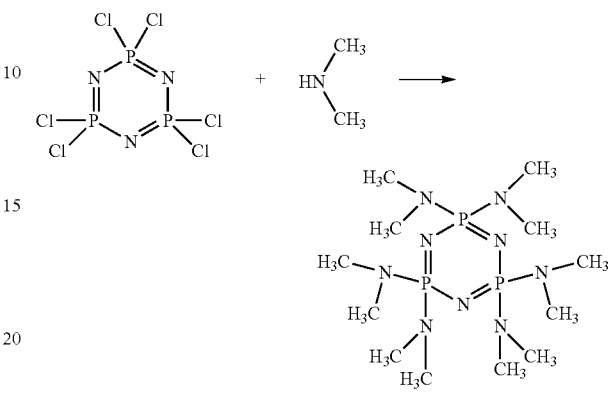

In a nitrogen atmosphere, hexachloro-cyclotriphosphazene (3.5 g, 10.0 mmol, 1.0 equiv.) was dissolved uniformly in 30 mL chloroform, and heated for reflux. Excess dimethylamine was introduced and reacted for 30 min. The mixture obtained was cooled to the room temperature, and solvent was removed by distillation under reduced pressure. Then, the obtained crude product was further extracted with 50 mL of light petroleum ether, and crystallized when being cooled at −10° C., hereby obtaining white solid of 3.2 g with a yield of 80%.

$^1$H NMR (500 MHz, CDCl$_3$) δ: 2.62 (s, 36H). HRMS (ESI) calcd for C$_{12}$H$_{36}$N$_9$P$_3$ [M+H]$^+$, 400.2385, found 400.2346.

Embodiment 18

Preparation of hexa(diphenylamino)-cyclotriphosphazene

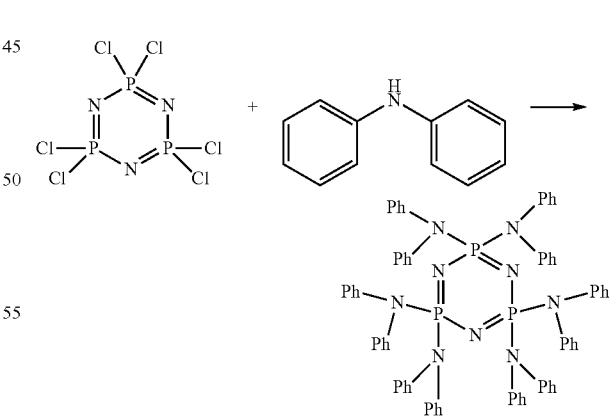

In a nitrogen atmosphere, hexachloro-cyclotriphosphazene (3.5 g, 10.0 mmol, 1.0 equiv.) was dissolved uniformly in 60 mL toluene, further added with triethylamine (6.1 g, 60.0 mmol, 6.0 equiv.) and diphenylamine (10.2 g, 60.0 mmol, 6.0 equiv.) and heated for reflux. After the reaction and cooling, insoluble materials were filtered off and the solvent was removed by distillation under reduced pressure.

The obtained solid was recrystallized in n-hexane, thereby obtaining a final product of 6.4 g with a yield of 53%.

$^1$H NMR (500 MHz, CDCl$_3$) δ: 7.16 (m, 60H). HRMS (ESI) calcd for C$_{72}$H$_{60}$N$_9$P$_3$ [M+H]$^+$, 1144.4263, found 1144.4236

Embodiment 19

Preparation of hexapyrrolidine-cyclotriphosphazene

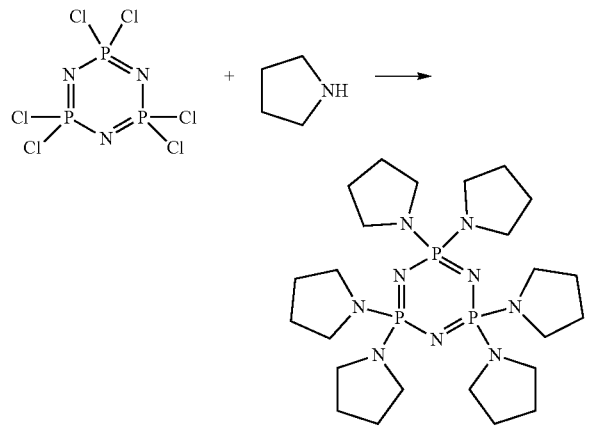

In a nitrogen atmosphere, hexachloro-cyclotriphosphazene (3.5 g, 10.0 mmol, 1.0 equiv.) was dissolved uniformly in 60 mL toluene, further added with pyrrolidine (9.9 mL, 120.0 mmol, 12.0 equiv.), and heated for reflux. After the reaction and cooling, insoluble materials were filtered off and the solvent was removed by distillation under reduced pressure. The obtained solid was recrystallized in n-hexane, thereby obtaining a final product of 4.2 g with a yield of 75%.

$^1$H NMR (500 MHz, CDCl$_3$) δ: 3.16 (m, 24H), 1.78 (m, 24H). HRMS (ESI) calcd for C$_{24}$H$_{48}$N$_9$P$_3$ [M+H]$^+$, 556.3324, found 556.3301.

Embodiment 20

Preparation of poly(propylene oxide) with hexa[tri (dimethylamino)-phosphazene]-cyclotriphosphazene prepared in Embodiment 6 as a Catalyst

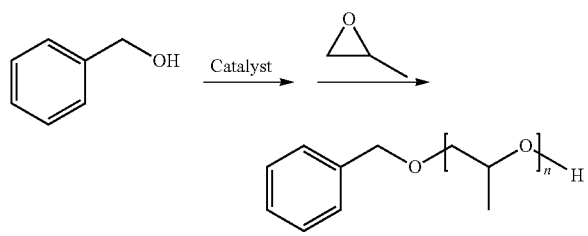

5.0 mL catalyst solution (0.1 mol/L in toluene, 0.50 mmol catalyst) was added to a 100 mL pressure-resistant reactor in a nitrogen atmosphere, the solvent was removed under high vacuum. Benzyl alcohol (52 μL, 0.50 mmol) and epoxy propane (3.5 mL, 50.0 mmol) were added, and then the reactor was sealed. The reactor was placed in an oil bath at 100° C. for reaction until the reaction pressure became and was kept constant at which the reaction was ended. After the reaction, the reactor was cooled to the room temperature, and added with tetrahydrofuran and little acetic acid. Insoluble materials were filtered out and the solvent was removed by distillation under reduced pressure, thereby obtaining poly(propylene oxide) of 2.85 g with a yield of 98%, exhibiting a number average molecular weight $M_{n,GPC}$ of 3500 g mol$^{-1}$ and a polydispersity $M_w/M_n$ (where $M_n$ is number average molecular weight and $M_w$ is weight average molecular weight) of 1.25 detected by Gel Permeation Chromatography (GPC).

Embodiment 21

Preparation of poly(propylene oxide) with hexa[tri (dimethylamino)-phosphazene]-cyclotriphosphazene prepared in Embodiment 6 as a Catalyst

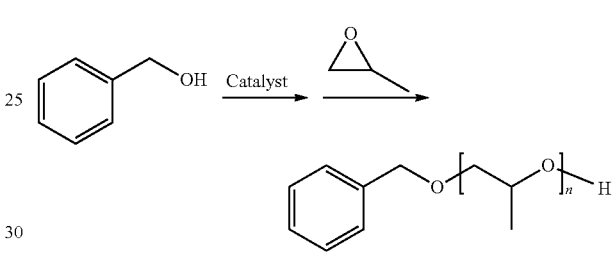

2.5 mL catalyst solution (0.1 mol/L in toluene, 0.25 mmol catalyst) was added to a 100 mL pressure-resistant reactor in a nitrogen atmosphere, the solvent was removed under high vacuum. Benzyl alcohol (26 μL, 0.25 mmol) and epoxy propane (3.5 mL, 50.0 mmol) were added, and then the reactor was sealed. The reactor was placed in an oil bath at 100° C. for reaction until the reaction pressure became and was kept constant. After the reaction, the reactor was cooled to the room temperature, and added with tetrahydrofuran and little acetic acid. Insoluble materials were filtered out and the solvent was removed by distillation under reduced pressure, thereby obtaining poly(propylene oxide) of 2.85 g with a yield of 98%, exhibiting $M_{n,GPC}$ of 4800 g mol$^{-1}$ and $M_w/M_n$ of 1.22.

Embodiment 22

Preparation of poly(propylene oxide) with hexa[tri (dimethylamino)-phosphazene]-cyclotriphosphazene prepared in Embodiment 6 as a Catalyst

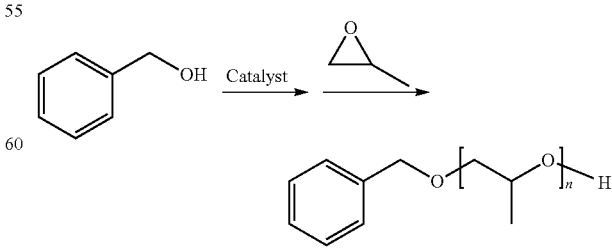

0.1 mL catalyst solution (0.1 mol/L in toluene, 0.01 mmol catalyst) was added to a 100 mL pressure-resistant reactor in a nitrogen atmosphere, the solvent was removed under high vacuum. Benzyl alcohol (52 μL, 0.50 mmol) and epoxy propane (7.0 mL, 100.0 mmol) were added, and then the reactor was sealed. The reactor was placed in an oil bath at 100° C. for reaction until the reaction pressure became and was kept constant. After the reaction, the reactor was cooled to the room temperature, and added with tetrahydrofuran and little acetic acid. Insoluble materials were filtered out and the solvent was removed by distillation under reduced pressure, thereby obtaining poly(propylene oxide) of 5.72 g with a yield of 98%, exhibiting $M_{n,GPC}$ of 9300 g mol$^{-1}$ and $M_w/M_n$ of 1.15.

Embodiment 23

Preparation of poly(ethylene oxide) with hexa[tri(dimethylamino)-phosphazene]-cyclotriphosphazene prepared in Embodiment 6 as a Catalyst

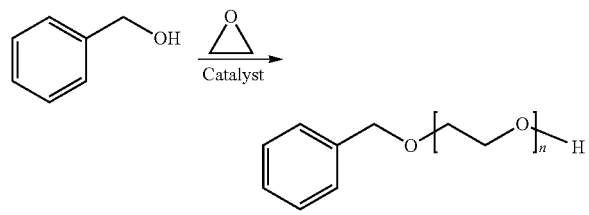

5.0 mL catalyst solution (0.1 mol/L in toluene, 0.50 mmol catalyst) was added to a 100 mL pressure-resistant reactor in a nitrogen atmosphere, the solvent was removed under high vacuum. Benzyl alcohol (52 μL, 0.50 mmol) and epoxy ethane (2.2 g, 50.0 mmol) were added, and then the reactor was sealed. The reactor was placed in an oil bath at 100° C. for reaction until the reaction pressure became and was kept constant. After the reaction, the reactor was cooled to the room temperature, and added with tetrahydrofuran and little acetic acid. Insoluble materials were filtered out and the solvent was removed by distillation under reduced pressure, thereby obtaining poly(ethylene oxide) of 2.15 g with a yield of 98%, exhibiting $M_{n,GPC}$ of 3800 g mol$^{-1}$ and $M_w/M_n$ of 1.06.

Embodiment 24

Preparation of propylene oxide-ethylene oxide copolymer with hexa[tri(dimethylamino)-phosphazene]-cyclotriphosphazene prepared in Embodiment 6 as a catalyst

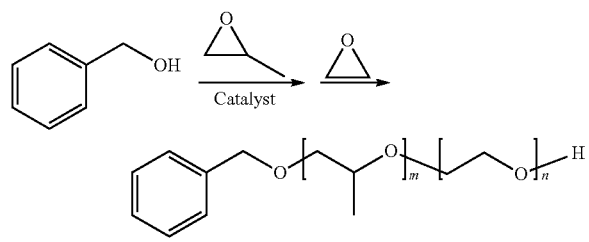

5.0 mL catalyst solution (0.1 mol/L in toluene, 0.50 mmol catalyst) was added to a 100 mL pressure-resistant reactor in a nitrogen atmosphere, the solvent was removed under high vacuum. Benzyl alcohol (52 μL, 0.50 mmol) and epoxy propane (3.5 mL, 50.0 mmol) were added, and then the reactor was sealed. The reactor was placed in an oil bath at 100° C. for reaction until the reaction pressure became and was kept constant. Then, epoxy ethane (2.2 g, 50.0 mmol) was added, and the reaction continued until the reaction pressure became and was kept constant. After the reaction, the reactor was cooled to the room temperature, and added with tetrahydrofuran and little acetic acid. Insoluble materials were filtered out and the solvent was removed by distillation under reduced pressure, thereby obtaining propylene oxide-ethylene oxide copolymer copolymer of 5.01 g with a yield of 98%, exhibiting $M_{n,GPC}$ of 7500 g mol$^{-1}$ and $M_w/M_n$ of 1.11.

Embodiment 25

Preparation of ethylene oxide-propylene oxide copolymer with hexa[tri(dimethylamino)-phosphazene]-cyclotriphosphazene prepared in Embodiment 6 as a catalyst

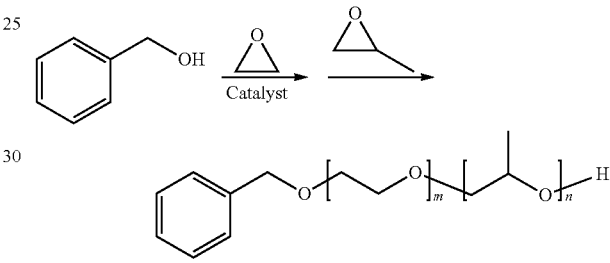

5.0 mL catalyst solution (0.1 mol/L in toluene, 0.50 mmol catalyst) was added to a 100 mL pressure-resistant reactor in a nitrogen atmosphere, the solvent was removed under high vacuum. Benzyl alcohol (52 μL, 0.50 mmol) and epoxy ethane (2.2 g, 50.0 mmol) were added, and then the reactor was sealed. The reactor was placed in an oil bath at 100° C. for reaction until the reaction pressure became and was kept constant. Then, epoxy propane (3.5 mL, 50.0 mmol) was added and the reaction continued until the reaction pressure became and was kept constant. After the reaction, the reactor was cooled to the room temperature, and added with tetrahydrofuran and little acetic acid. Insoluble materials were filtered out and the solvent was removed by distillation under reduced pressure, thereby obtaining ethylene oxide-propylene oxide copolymer of 4.96 g with a yield of 97%, exhibiting $M_{n,GPC}$ of 7800 g mol$^{-1}$ and $M_w/M_n$ of 1.13.

Embodiment 26

Preparation of polycaprolactone with hexa[tri(dimethylamino)-phosphazene]-cyclotriphosphazene prepared in Embodiment 6 as a catalyst

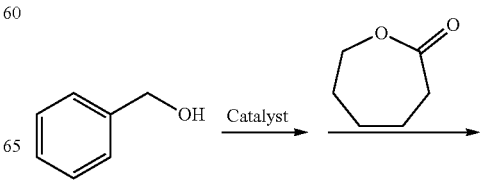

-continued

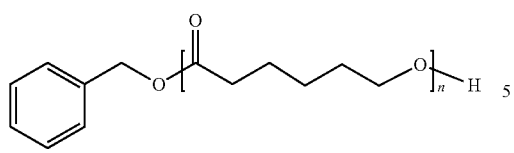

0.5 mL catalyst solution (0.1 mol/L in toluene, 0.05 mmol catalyst) was added to a 50 mL Schlenk tube in a nitrogen atmosphere. Benzyl alcohol (5.2 μL, 0.05 mmol) was further added and reacted for 10 min at the room temperature. Then, ε-caprolactone (1.11 mL, 10.0 mmol) was added and reacted for 12 hours in a nitrogen atmosphere. After the reaction, tetrahydrofuran and little acetic acid were added. Precipitation was performed by using 100 mL cold methanol for twice, thereby obtaining polycaprolactone of 1.05 g with a yield of 92%, exhibiting $M_{n,GPC}$ of 16000 g mol$^{-1}$ and $M_w/M_n$ of 1.21.

Embodiment 27

Preparation of polylactide with hexa[tri(dimethylamino)-phosphazene]-cyclotriphosphazene prepared in Embodiment 6 as a catalyst

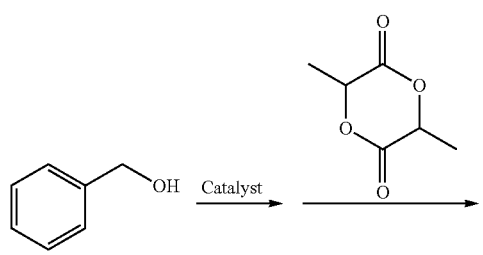

0.5 mL catalyst solution (0.1 mol/L in toluene, 0.05 mmol catalyst) was added to a 50 mL Schlenk tube in a nitrogen atmosphere. Benzyl alcohol (5.2 μL, 0.05 mmol) was further added and reacted for 10 min at the room temperature. Then, lactide (1.44 g, 10.0 mmol) was added and reacted for 12 hours in a nitrogen atmosphere. After the reaction, tetrahydrofuran and little acetic acid were added. Precipitation was performed by using 100 mL cold methanol for twice, thereby obtaining polylactide of 1.35 g with a yield of 94%, exhibiting $M_{n,GPC}$ of 16800 g mol$^{-1}$ and $M_w/M_n$ of 1.22.

Embodiment 28

Preparation of polydimethylsiloxane with hexa[tri(dimethylamino)-phosphazene]-cyclotriphosphazene prepared in Embodiment 6 as a Catalyst

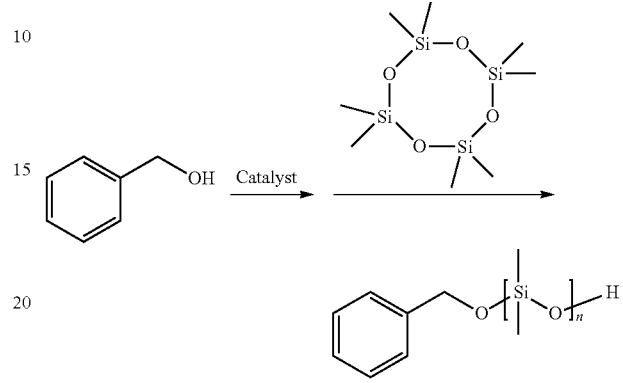

0.5 mL catalyst solution (0.1 mol/L in toluene, 0.05 mmol catalyst) was added to a 50 mL Schlenk tube in a nitrogen atmosphere. Benzyl alcohol (5.2 μL, 0.05 mmol) was further added and reacted for 10 min at the room temperature. Then, octamethylcyclotetrasiloxane (3.10 mL, 10.0 mmol) was added in an oil bath at 80° C. and reacted for 20 min. After the reaction, tetrahydrofuran and little acetic acid were added. Precipitation was performed by using 100 mL cold methanol for twice, thereby obtaining polydimethylsiloxane of 2.97 g with a yield of 99%, exhibiting $M_{n,GPC}$ of 83900 g mol$^{-1}$ and $M_w/M_n$ of 1.06.

Embodiment 29

Preparation of caprolactone-lactide copolymer with hexa[tri(dimethylamino)-phosphazene]-cyclotriphosphazene prepared in Embodiment 6 as a catalyst

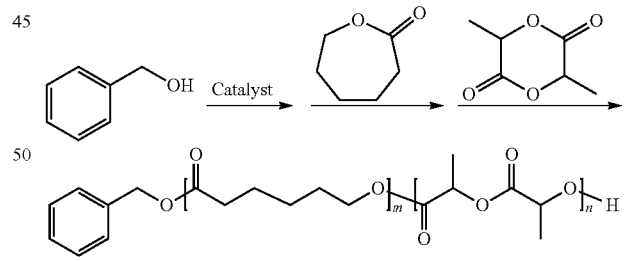

0.5 mL catalyst solution (0.1 mol/L in toluene, 0.05 mmol catalyst) was added to a 50 mL Schlenk tube in a nitrogen atmosphere. Benzyl alcohol (5.2 μL, 0.05 mmol) was further added and reacted for 10 min at the room temperature. Then, ε-caprolactone (1.11 mL, 10.0 mmol) was added and reacted for 12 hours in a nitrogen atmosphere. After this reaction, lactide (1.44 g, 10.0 mmol) was added and reacted for 30 min. After the reaction, tetrahydrofuran and little acetic acid were added. Precipitation was performed by using 100 mL cold methanol for twice, thereby obtaining caprolactone-lactide copolymer of 2.09 g with a yield of 81%, exhibiting $M_{n,GPC}$ of 17000 g mol$^{-1}$ and $M_w/M_n$ of 1.31.

Embodiment 30

Preparation of propylene oxide-caprolactone copolymer with hexa[tri(dimethylamino)-phosphazene]-cyclotriphosphazene prepared in Embodiment 6 as a Catalyst

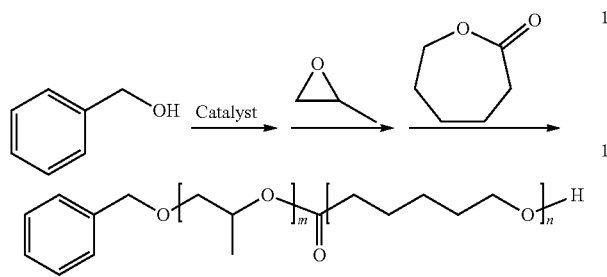

2.5 mL catalyst solution (0.1 mol/L in toluene, 0.25 mmol catalyst) was added to a 100 mL pressure-resistant reactor in a nitrogen atmosphere, the solvent was removed under high vacuum. Benzyl alcohol (26 μL, 0.25 mmol) and epoxy propane (3.5 mL, 50.0 mmol) were added, and then the reactor was sealed. The reactor was placed in an oil bath at 100° C. for reaction until the reaction pressure became and was kept constant. After the reaction, the reactor was cooled to the room temperature, and added with 2.5 mL benzyl alcohol with stirring to obtain a homogeneous mixture. Then, ε-caprolactone (1.11 mL, 10.0 mmol) was added and reacted for 12 hours in a nitrogen atmosphere. After this reaction, tetrahydrofuran and little acetic acid were added. Precipitation was performed by using 100 mL cold methanol for twice, thereby obtaining propylene oxide-caprolactone copolymer of 3.68 g with a yield of 91%, exhibiting $M_{n,GPC}$ of 8700 g mol$^1$ and $M_w/M_n$ of 1.22.

Embodiment 31

Preparation of poly(propylene oxide) with hexa[tri(dimethylamino)-phosphazene]-cyclotriphosphazene prepared in Embodiment 6 as a Catalyst

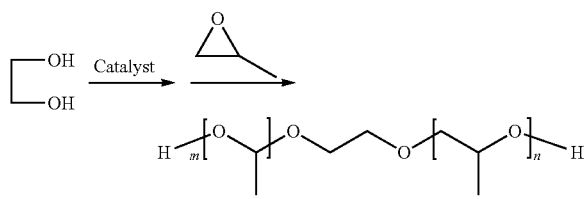

2.5 mL catalyst solution (0.1 mol/L in toluene, 0.25 mmol catalyst) was added to a 100 mL pressure-resistant reactor in a nitrogen atmosphere, the solvent was removed under high vacuum. Ethylene glycol (13 μL, 0.25 mmol) and epoxy propane (3.5 mL, 50.0 mmol) were added, and then the reactor was sealed. The reactor was placed in an oil bath at 100° C. for reaction until the reaction pressure became and was kept constant. After the reaction, the reactor was cooled to the room temperature, and added with tetrahydrofuran and little acetic acid. Insoluble materials were filtered out and the solvent was removed by distillation under reduced pressure, thereby obtaining poly(propylene oxide) of 2.87 g with a yield of 99%, exhibiting $M_{n,GPC}$ of 5200 g mol$^{-1}$ and $M_w/M_n$ of 1.22.

Embodiment 32

Preparation of poly(propylene oxide) with hexa[tri(dimethylamino)-phosphazene]-cyclotriphosphazene prepared in Embodiment 6 as a Catalyst

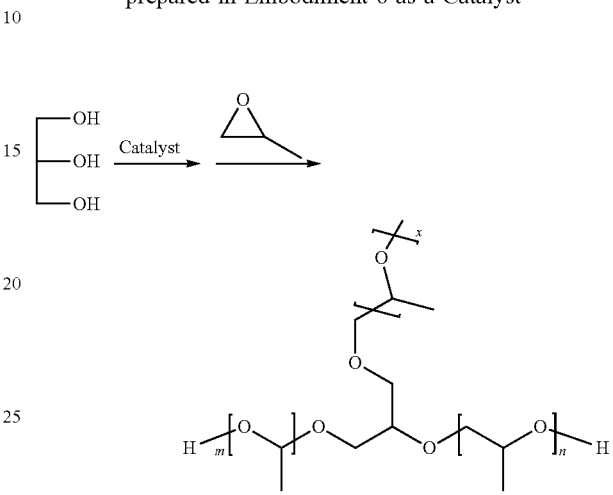

2.5 mL catalyst solution (0.1 mol/L in toluene, 0.25 mmol catalyst) was added to a 100 mL pressure-resistant reactor in a nitrogen atmosphere, the solvent was removed under high vacuum. Glycerol (18 μL, 0.25 mmol) and epoxy propane (3.5 mL, 50.0 mmol) were added, and then the reactor was sealed. The reactor was placed in an oil bath at 100° C. for reaction until the reaction pressure became and was kept constant. After the reaction, the reactor was cooled to the room temperature, and added with tetrahydrofuran and little acetic acid. Insoluble materials were filtered out and the solvent was removed by distillation under reduced pressure, thereby obtaining poly(propylene oxide) of 2.76 g with a yield of 95%, exhibiting $M_{n,GPC}$ of 5100 g mol$^{-1}$ and $M_w/M_n$ of 1.32.

Embodiment 33

Preparation of poly(propylene oxide) with hexa[tri(dimethylamino)-phosphazene]-cyclotriphosphazene prepared in Embodiment 6 as a Catalyst

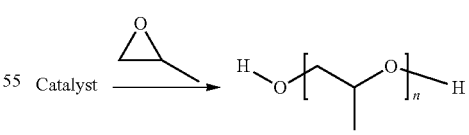

2.5 mL catalyst solution (0.1 mol/L in toluene, 0.25 mmol catalyst) was added to a 100 mL pressure-resistant reactor in a nitrogen atmosphere, the solvent was removed under high vacuum. Epoxy propane (3.5 mL, 50.0 mmol) was added but without any initiator, and then the reactor was sealed. The reactor was placed in an oil bath at 100° C. for reaction until the reaction pressure became and was kept constant. After the reaction, the reactor was cooled to the room temperature, and added with tetrahydrofuran and little acetic acid.

Insoluble materials were filtered out and the solvent was removed by distillation under reduced pressure, thereby obtaining poly(propylene oxide) of 2.76 g with a yield of 95%, exhibiting $M_{n,GPC}$ of 4500 g mol$^{-1}$ and $M_w/M_n$ of 1.56.

Embodiment 34

Preparation of poly(propylene oxide) with hexa[tri(dimethylamino)-phosphazene]-cyclotriphosphazene prepared in Embodiment 6 as a Catalyst

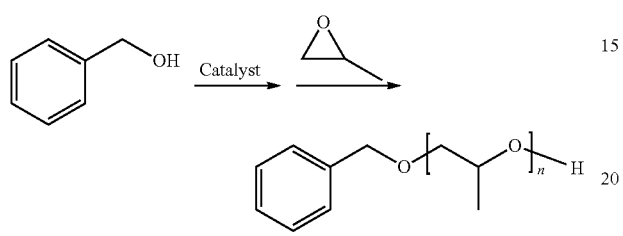

2.5 mL catalyst solution (0.1 mol/L in toluene, 0.25 mmol catalyst) was added to a 100 mL pressure-resistant reactor in a nitrogen atmosphere, the solvent was removed under high vacuum. Benzyl alcohol (26 μL, 0.25 mmol) and epoxy propane (17.5 mL, 250.0 mmol) were added, and then the reactor was sealed. The reactor was placed in an oil bath at 100° C. for reaction until the reaction pressure became and was kept constant. After the reaction, the reactor was cooled to the room temperature, and added with tetrahydrofuran and little acetic acid. Insoluble materials were filtered out and the solvent was removed by distillation under reduced pressure, thereby obtaining poly(propylene oxide) of 11.91 g with a yield of 82%, exhibiting $M_{n,GPC}$ of 21800 g mol$^{-1}$ and $M_w/M_n$ of 1.25.

Embodiment 35

Preparation of poly(propylene oxide) with hexa[tri(dimethylamino)-phosphazene]-cyclotriphosphazene prepared in Embodiment 6 as a Catalyst

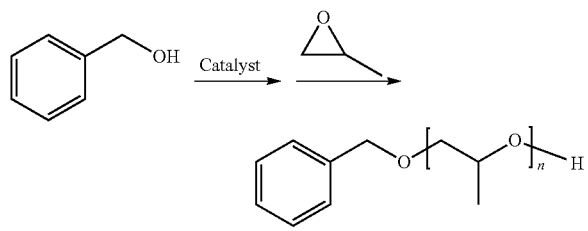

2.5 mL catalyst solution (0.1 mol/L in toluene, 0.25 mmol catalyst) was added to a 500 mL pressure-resistant reactor in a nitrogen atmosphere, the solvent was removed under high vacuum. Benzyl alcohol (26 μL, 0.25 mmol) and epoxy propane (175 mL, 2.5 mol) were added, and then the reactor was sealed. The reactor was placed in an oil bath at 100° C. for reaction until the reaction pressure became and was kept constant. After the reaction, the reactor was cooled to the room temperature, and added with tetrahydrofuran and little acetic acid. Insoluble materials were filtered out and the solvent was removed by distillation under reduced pressure, thereby obtaining poly(propylene oxide) of 76.96 g with a yield of 53%, exhibiting $M_{n,GPC}$ of 25500 g mol$^{-1}$ and $M_w/M_n$ of 1.21.

Embodiment 36

Preparation of poly(propylene oxide) with hexa[tri(dimethylamino)-phosphazene]-cyclotriphosphazene prepared in Embodiment 6 as a Catalyst

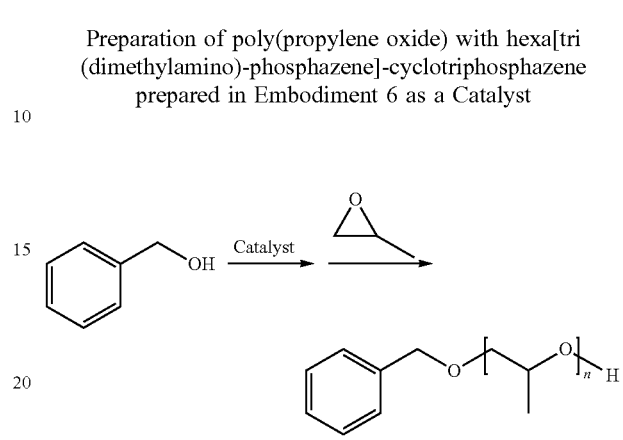

2.5 mL catalyst solution (0.1 mol/L in toluene, 0.25 mmol catalyst) was added to a 500 mL pressure-resistant reactor in a nitrogen atmosphere, the solvent was removed under high vacuum. Benzyl alcohol (260 μL, 2.5 mmol) and epoxy propane (175 mL, 2.5 mol) were added, and then the reactor was sealed. The reactor was placed in an oil bath at 100° C. for reaction until the reaction pressure became and was kept constant. After the reaction, the reactor was cooled to the room temperature, and added with tetrahydrofuran and little acetic acid. Insoluble materials were filtered out and the solvent was removed by distillation under reduced pressure, thereby obtaining poly(propylene oxide) of 108.91 g with a yield of 75%, exhibiting $M_{n,GPC}$ of 23400 g mol$^{-1}$ and $M_w/M_n$ of 1.27.

Embodiment 37

Preparation of poly(propylene oxide) with hexa[tri(dimethylamino)-phosphazene]-cyclotriphosphazene prepared in Embodiment 6 as a Catalyst

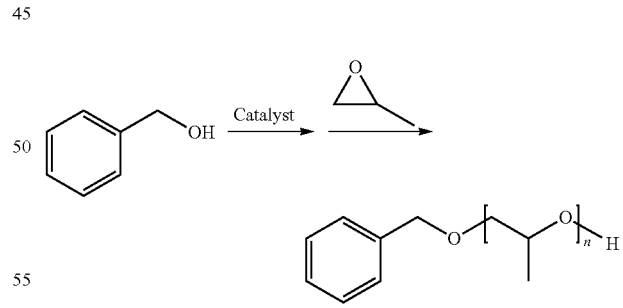

2.5 mL catalyst solution (0.1 mol/L in toluene, 0.25 mmol catalyst) was added to a 500 mL pressure-resistant reactor in a nitrogen atmosphere, the solvent was removed under high vacuum. Benzyl alcohol (2.6 mL, 25 mmol) and epoxy propane (175 mL, 2.5 mol) were added, and then the reactor was sealed. The reactor was placed in an oil bath at 100° C. for reaction until the reaction pressure became and was kept constant. After the reaction, the reactor was cooled to the room temperature, and added with tetrahydrofuran and little acetic acid. Insoluble materials were filtered out and the solvent was removed by distillation under reduced pressure, thereby obtaining poly(propylene oxide) of 113.26 g with a yield of 78%, exhibiting $M_{n,GPC}$ of 3700 g mol$^{-1}$ and $M_w/M_n$ of 1.27.

Embodiment 38

Preparation of poly(propylene oxide) with hexa[tri(dimethylamino)-phosphazene]-cyclotriphosphazene prepared in Embodiment 6 as a Catalyst

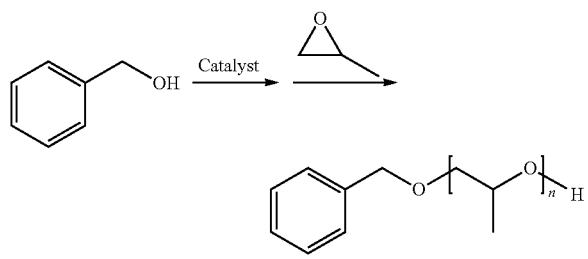

2.5 mL catalyst solution (0.1 mol/L in toluene, 0.25 mmol catalyst) was added to a 100 mL pressure-resistant reactor in a nitrogen atmosphere, the solvent was removed under high vacuum. Benzyl alcohol (26 μL, 0.25 mmol) and epoxy propane (3.5 mL, 50.0 mmol) were added, and then the reactor was sealed. The reactor was placed in an oil bath at 50° C. for reaction until the reaction pressure became and was kept constant. After the reaction, the reactor was cooled to the room temperature, and added with tetrahydrofuran and little acetic acid. Insoluble materials were filtered out and the solvent was removed by distillation under reduced pressure, thereby obtaining poly(propylene oxide) of 2.7 g with a yield of 93%, exhibiting $M_{n,GPC}$ of 5300 g mol$^{-1}$ and $M_w/M_n$ of 1.32.

Embodiment 39

Preparation of poly(propylene oxide) with hexa[tri(dimethylamino)-phosphazene]-cyclotriphosphazene prepared in Embodiment 6 as a Catalyst

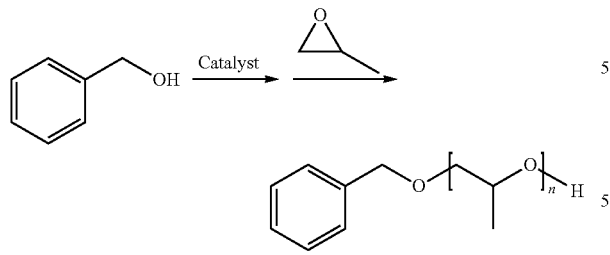

2.5 mL catalyst solution (0.1 mol/L in toluene, 0.25 mmol catalyst) was added to a 100 mL pressure-resistant reactor in a nitrogen atmosphere, the solvent was removed under high vacuum. Benzyl alcohol (26 μL, 0.25 mmol) and epoxy propane (3.5 mL, 50.0 mmol) were added, and then the reactor was sealed. The reactor was placed in an oil bath at 120° C. for reaction until the reaction pressure became and was kept constant. After the reaction, the reactor was cooled to the room temperature, and added with tetrahydrofuran and little acetic acid. Insoluble materials were filtered out and the solvent was removed by distillation under reduced pressure, thereby obtaining poly(propylene oxide) of 2.76 g with a yield of 95%, exhibiting $M_{n,GPC}$ of 5300 g mol$^{-1}$ and $M_w/M_n$ of 1.52.

Embodiment 40

Preparation of polycaprolactone with hexa[tri(dimethylamino)-phosphazene]-cyclotriphosphazene prepared in Embodiment 6 as a Catalyst

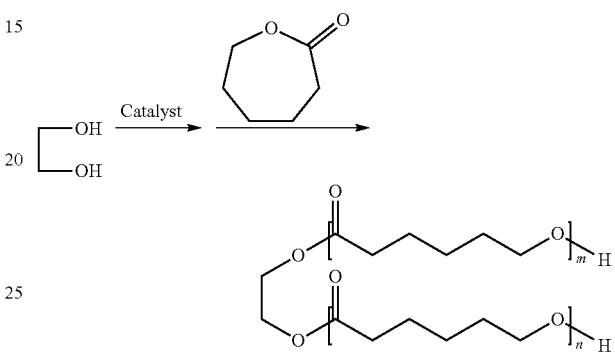

0.5 mL catalyst solution (0.1 mol/L in toluene, 0.05 mmol catalyst) was added to a 50 mL Schlenk tube in a nitrogen atmosphere, and added with ethylene glycol (2.6 μL, 0.05 mmol). After reacting for 10 min, the system was further added with ε-caprolactone (1.11 mL, 10.0 mmol), and reacted for 12 hours at the room temperature in a nitrogen atmosphere. After the reaction, the reactor was cooled to the room temperature, and added with tetrahydrofuran and little acetic acid. Precipitation was performed by using 100 mL cold methanol for twice, thereby obtaining polycaprolactone of 1.02 g with a yield of 90%, exhibiting $M_{n,GPC}$ of 16600 g mol$^{-1}$ and $M_w/M_n$ of 1.24.

Embodiment 41

Preparation of polycaprolactone with hexa[tri(dimethylamino)-phosphazene]-cyclotriphosphazene prepared in Embodiment 6 as a Catalyst

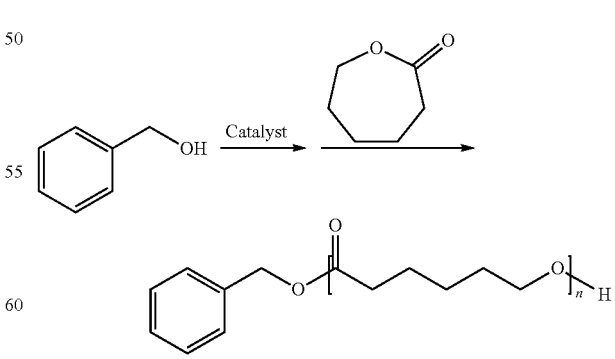

0.5 mL catalyst solution (0.1 mol/L in toluene, 0.05 mmol catalyst) was added to a 50 mL Schlenk tube in a nitrogen atmosphere, and added with benzyl alcohol (5.2 μL, 0.05 mmol). After reacting for 10 min, the system was further added with ε-caprolactone (0.55 mL, 5.0 mmol), and reacted for 12 hours at the room temperature in a nitrogen atmosphere. After the reaction, tetrahydrofuran and little acetic acid were added. Precipitation was performed by using 100 mL cold methanol for twice, thereby obtaining polycaprolactone of 0.54 g with a yield of 95%, exhibiting $M_{n,GPC}$ of 8700 g mol$^{-1}$ and $M_w/M_n$ of 1.25.

Embodiment 42

Preparation of polycaprolactone with hexa[tri(dimethylamino)-phosphazene]-cyclotriphosphazene prepared in Embodiment 6 as a Catalyst

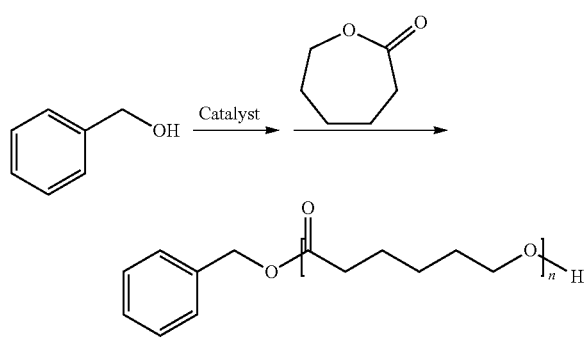

0.5 mL catalyst solution (0.1 mol/L in toluene, 0.05 mmol catalyst) was added to a 50 mL Schlenk tube in a nitrogen atmosphere, and added with benzyl alcohol (5.2 μL, 0.05 mmol). After reacting for 10 min, the system was further added with ε-caprolactone (5.5 mL, 50.0 mmol), and reacted for 24 hours at the room temperature in a nitrogen atmosphere. After the reaction, tetrahydrofuran and little acetic acid were added. Precipitation was performed by using 100 mL cold methanol for twice, thereby obtaining polycaprolactone of 3.13 g with a yield of 55%, exhibiting $M_{n,GPC}$ of 28700 g mol$^{-1}$ and $M_w/M_n$ of 1.21.

Embodiment 43

Preparation of polycaprolactone with hexa[tri(dimethylamino)-phosphazene]-cyclotriphosphazene prepared in Embodiment 6 as a Catalyst

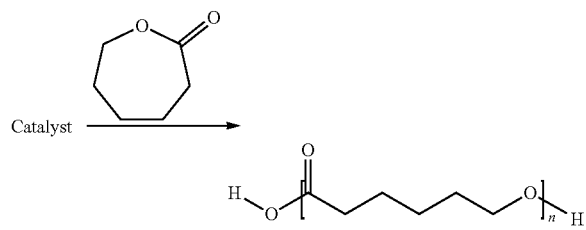

0.5 mL catalyst solution (0.1 mol/L in toluene, 0.05 mmol catalyst) was added to a 50 mL Schlenk tube in a nitrogen atmosphere, and further added with ε-caprolactone (1.11 mL, 10.0 mmol) but without any initiator. A reaction happened and continued for 12 hours at the room temperature in a nitrogen atmosphere. After the reaction, tetrahydrofuran and little acetic acid were added. Precipitation was performed by using 100 mL cold methanol for twice, thereby obtaining polycaprolactone of 0.93 g with a yield of 82%, exhibiting $M_{n,GPC}$ of 16300 g mol$^{-1}$ and $M_w/M_n$ of 1.45.

Embodiment 44

Preparation of polycaprolactone with hexa[tri(dimethylamino)-phosphazene]-cyclotriphosphazene prepared in Embodiment 6 as a Catalyst

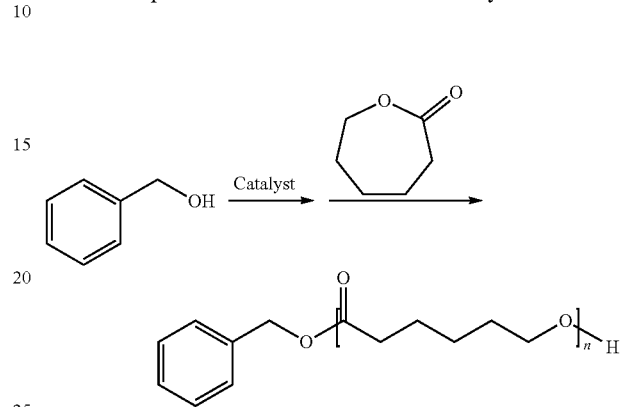

0.5 mL catalyst solution (0.1 mol/L in toluene, 0.05 mmol catalyst) was added to a 50 mL Schlenk tube in a nitrogen atmosphere, and added with benzyl alcohol (52 μL, 0.5 mmol). After reacting for 10 min, the system was further added with ε-caprolactone (27.5 mL, 250.0 mmol), and reacted for 24 hours at the room temperature in a nitrogen atmosphere. After the reaction, tetrahydrofuran and little acetic acid were added. Precipitation was performed by using 200 mL cold methanol for twice, thereby obtaining polycaprolactone of 7.13 g with a yield of 25%, exhibiting $M_{n,GPC}$ of 31700 g mol$^{-1}$ and $M_w/M_n$ of 1.18.

Embodiment 45

Preparation of polycaprolactone with hexa[tri(dimethylamino)-phosphazene]-cyclotriphosphazene prepared in Embodiment 6 as a Catalyst

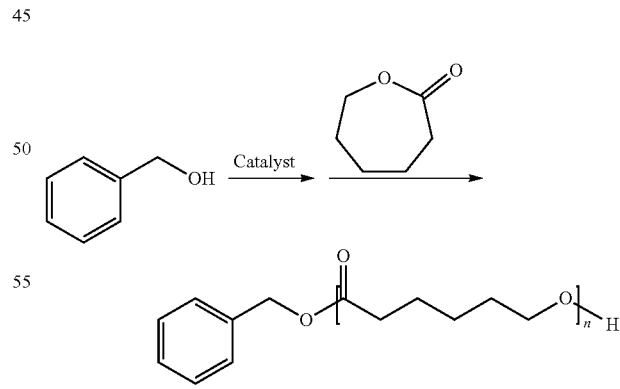

0.5 mL catalyst solution (0.1 mol/L in toluene, 0.05 mmol catalyst) was added to a 50 mL Schlenk tube in a nitrogen atmosphere, and added with benzyl alcohol (5.2 μL, 0.05 mmol). After reacting for 10 min, the system was placed in an ice bath, further added with ε-caprolactone (1.11 mL, 10.0 mmol), and reacted for 12 hours at 0° C. in a nitrogen atmosphere. After the reaction, tetrahydrofuran and little acetic acid were added. Precipitation was performed by using 100 mL cold methanol for twice, thereby obtaining polycaprolactone of 0.97 g with a yield of 85%, exhibiting $M_{n,GPC}$ of 17500 g mol$^{-1}$ and $M_w/M_n$ of 1.16.

Embodiment 46

Preparation of polycaprolactone with hexa[tri(dimethylamino)-phosphazene]-cyclotriphosphazene prepared in Embodiment 6 as a Catalyst

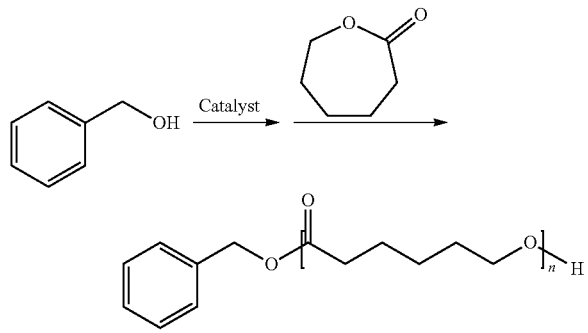

0.5 mL catalyst solution (0.1 mol/L in toluene, 0.05 mmol catalyst) was added to a 50 mL Schlenk tube in a nitrogen atmosphere, and added with benzyl alcohol (5.2 μL, 0.05 mmol). After reacting for 10 min, the system was placed in an oil bath at 50° C., further added with ε-caprolactone (1.11 mL, 10.0 mmol), and reacted for 12 hours at 50° C. in a nitrogen atmosphere. After the reaction, tetrahydrofuran and little acetic acid were added. Precipitation was performed by using 100 mL cold methanol for twice, thereby obtaining polycaprolactone of 1.08 g with a yield of 95%, exhibiting $M_{n,GPC}$ of 16300 g mol$^{-1}$ and $M_w/M_n$ of 1.31.

Embodiment 47

Preparation of polycaprolactone with hexa[tri(dimethylamino)-phosphazene]-cyclotriphosphazene prepared in Embodiment 6 as a Catalyst

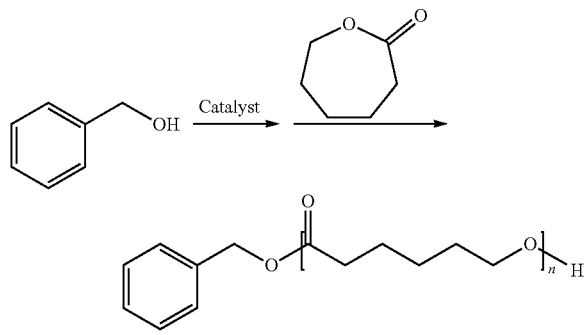

0.5 mL catalyst solution (0.1 mol/L in toluene, 0.05 mmol catalyst) was added to a 50 mL Schlenk tube in a nitrogen atmosphere, and added with benzyl alcohol (5.2 μL, 0.05 mmol). After reacting for 10 min, the system was placed in an oil bath at 100° C. After another 10 min, ε-caprolactone (1.11 mL, 10.0 mmol) was added, and reacted for 12 hours at 100° C. in a nitrogen atmosphere. After the reaction, tetrahydrofuran and little acetic acid were added. Precipitation was performed by using 100 mL cold methanol for twice, thereby obtaining polycaprolactone of 1.12 g with a yield of 99%, exhibiting $M_{n,GPC}$ of 15600 g mol$^{-1}$ and $M_w/M_n$ of 1.36.

Embodiment 48

Preparation of polycaprolactone with hexa[tri(dimethylamino)-phosphazene]-cyclotriphosphazene prepared in Embodiment 6 as a Catalyst

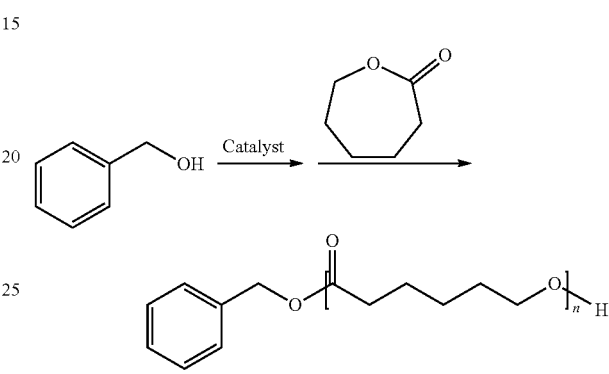

0.5 mL catalyst solution (0.1 mol/L in toluene, 0.05 mmol catalyst) was added to a 50 mL Schlenk tube in a nitrogen atmosphere, and the solvent was removed by distillation under reduced pressure. Then, 0.5 mL tetrahydrofuran was added to dissolve the catalyst and further added with benzyl alcohol (5.2 μL, 0.05 mmol). After reacting for 10 min, ε-caprolactone (1.11 mL, 10.0 mmol) was added, and reacted for 12 hours at the room temperature in a nitrogen atmosphere. After the reaction, tetrahydrofuran and little acetic acid were added. Precipitation was performed by using 100 mL cold methanol for twice, thereby obtaining polycaprolactone of 1.12 g with a yield of 98%, exhibiting $M_{n,GPC}$ of 16800 g mol$^{-1}$ and $M_w/M_n$ of 1.25.

Embodiment 49

Preparation of polycaprolactone with hexa[tri(dimethylamino)-phosphazene]-cyclotriphosphazene prepared in Embodiment 6 as a Catalyst

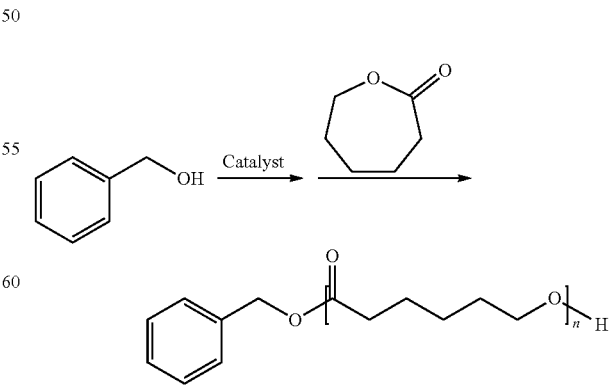

0.5 mL catalyst solution (0.1 mol/L in toluene, 0.05 mmol catalyst) was added to a 50 mL Schlenk tube in a nitrogen atmosphere, and the solvent was removed by distillation under reduced pressure. Then, 0.5 mL dichloromethane was added to dissolve the catalyst and further added with benzyl alcohol (5.2 μL, 0.05 mmol). After reacting for 10 min, ε-caprolactone (1.11 mL, 10.0 mmol) was added, and reacted for 12 hours at the room temperature in a nitrogen atmosphere. After the reaction, tetrahydrofuran and little acetic acid were added. Precipitation was performed by using 100 mL cold methanol for twice, thereby obtaining polycaprolactone of 0.97 g with a yield of 85%, exhibiting $M_{n,GPC}$ of 15300 g mol$^{-1}$ and $M_w/M_n$ of 1.28.

Embodiment 50

Preparation of propylene oxide-caprolactone copolymer with hexa[tri(dimethylamino)-phosphazene]-cyclotriphosphazene prepared in Embodiment 6 as a Catalyst

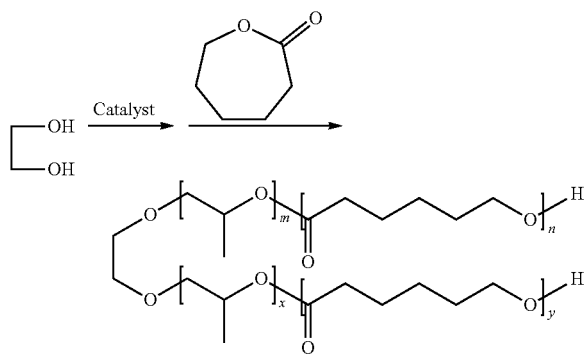

2.5 mL catalyst solution (0.1 mol/L in toluene, 0.05 mmol catalyst) was added to a 100 mL pressure-resistant reactor in a nitrogen atmosphere, and the solvent was removed under high vacuum. Ethylene glycol (13 μL, 0.25 mmol) and epoxy propane (3.5 mL, 50.0 mmol) were added, and then the reactor was sealed. The reactor was placed in an oil bath at 100° C. for reaction until the reaction pressure became and was kept constant. After this reaction, the reactor was cooled to the room temperature and added with 2.5 mL toluene with stirring to obtain a homogeneous mixture. Then, ε-caprolactone (1.11 mL, 10.0 mmol) was added, and reacted for 12 hours at the room temperature in a nitrogen atmosphere. After the reaction, tetrahydrofuran and little acetic acid were added. Precipitation was performed by using 100 mL cold methanol for twice, thereby obtaining propylene oxide-caprolactone copolymer of 3.55 g with a yield of 88%, exhibiting $M_{n,GPC}$ of 9300 g mol$^{-1}$ and $M_w/M_n$ of 1.25.

Embodiment 51

Preparation of poly(propylene oxide) with penta[tri(dimethylamino)-phosphazene]-chloro-cyclotriphosphazene prepared in Embodiment 12 as a Catalyst

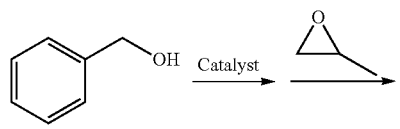
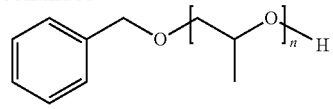

2.5 mL catalyst solution (0.1 mol/L in toluene, 0.25 mmol catalyst) was added to a 100 mL pressure-resistant reactor in a nitrogen atmosphere, the solvent was removed under high vacuum. Benzyl alcohol (26 μL, 0.25 mmol) and epoxy propane (3.5 mL, 50.0 mmol) were added, and then the reactor was sealed. The reactor was placed in an oil bath at 100° C. for reaction until the reaction pressure became and was kept constant. After the reaction, the reactor was cooled to the room temperature, and added with tetrahydrofuran and little acetic acid. Insoluble materials were filtered out and the solvent was removed by distillation under reduced pressure, thereby obtaining poly(propylene oxide) of 2.70 g with a yield of 93%, exhibiting $M_{n,GPC}$ of 4500 g mol$^4$ and $M_w/M_n$ of 1.42.

Embodiment 52

Preparation of poly(propylene oxide) with tetra[tri(dimethylamino)-phosphazene]-dichloro-cyclotriphosphazene prepared in Embodiment 13 as a Catalyst

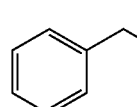
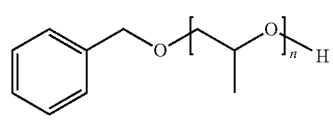
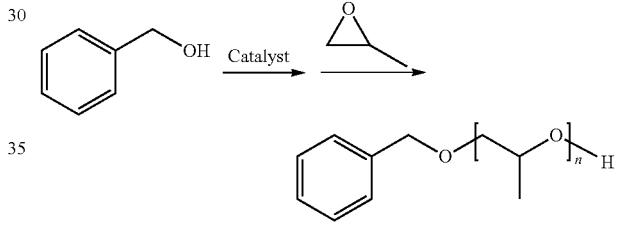

2.5 mL catalyst solution (0.1 mol/L in toluene, 0.25 mmol catalyst) was added to a 100 mL pressure-resistant reactor in a nitrogen atmosphere, the solvent was removed under high vacuum. Benzyl alcohol (26 μL, 0.25 mmol) and epoxy propane (3.5 mL, 50.0 mmol) were added, and then the reactor was sealed. The reactor was placed in an oil bath at 100° C. for reaction until the reaction pressure became and was kept constant. After the reaction, the reactor was cooled to the room temperature, and added with tetrahydrofuran and little acetic acid. Insoluble materials were filtered out and the solvent was removed by distillation under reduced pressure, thereby obtaining poly(propylene oxide) of 2.75 g with a yield of 95%, exhibiting $M_{n,GPC}$ of 4300 g mol$^{-1}$ and $M_w/M_n$ of 1.45.

Embodiment 53

Preparation of poly (propylene oxide) with tri[tri(dimethylamino)-phosphazene]-trichloro-cyclotriphosphazene Prepared in Embodiment 14 as a Catalyst

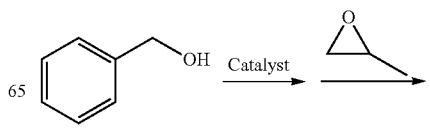

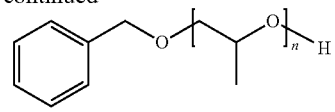

2.5 mL catalyst solution (0.1 mol/L in toluene, 0.25 mmol catalyst) was added to a 100 mL pressure-resistant reactor in a nitrogen atmosphere, the solvent was removed under high vacuum. Benzyl alcohol (26 μL, 0.25 mmol) and epoxy propane (3.5 mL, 50.0 mmol) were added, and then the reactor was sealed. The reactor was placed in an oil bath at 100° C. for reaction until the reaction pressure became and was kept constant. After the reaction, the reactor was cooled to the room temperature, and added with tetrahydrofuran and little acetic acid. Insoluble materials were filtered out and the solvent was removed by distillation under reduced pressure, thereby obtaining poly(propylene oxide) of 2.76 g with a yield of 95%, exhibiting $M_{n,GPC}$ of 4600 g mol$^{-1}$ and $M_w/M_n$ of 1.40.

Embodiment 54

Preparation of poly(propylene oxide) with di[tri(dimethylamino)-phosphazene]-tetrachloro-cyclotriphosphazene Prepared in Embodiment 15 as a Catalyst

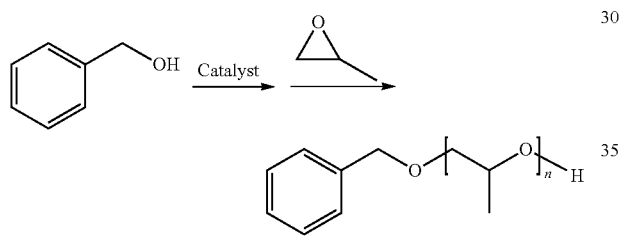

2.5 mL catalyst solution (0.1 mol/L in toluene, 0.25 mmol catalyst) was added to a 100 mL pressure-resistant reactor in a nitrogen atmosphere, the solvent was removed under high vacuum. Benzyl alcohol (26 μL, 0.25 mmol) and epoxy propane (3.5 mL, 50.0 mmol) were added, and then the reactor was sealed. The reactor was placed in an oil bath at 100° C. for reaction until the reaction pressure became and was kept constant. After the reaction, the reactor was cooled to the room temperature, and added with tetrahydrofuran and little acetic acid. Insoluble materials were filtered out and the solvent was removed by distillation under reduced pressure, thereby obtaining poly(propylene oxide) of 2.55 g with a yield of 87%, exhibiting $M_{n,GPC}$ of 4200 g mol$^{-1}$ and $M_w/M_n$ of 1.36.

Embodiment 55

Preparation of poly(propylene oxide) with [tri(dimethylamino)-phosphazene]-pentachloro-cyclotriphosphazene Prepared in Embodiment 16 as a Catalyst

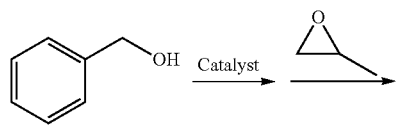

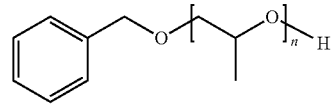

2.5 mL catalyst solution (0.1 mol/L in toluene, 0.25 mmol catalyst) was added to a 100 mL pressure-resistant reactor in a nitrogen atmosphere, the solvent was removed under high vacuum. Benzyl alcohol (26 μL, 0.25 mmol) and epoxy propane (3.5 mL, 50.0 mmol) were added, and then the reactor was sealed. The reactor was placed in an oil bath at 100° C. for 12 hour reaction. After the reaction, the reactor was cooled to the room temperature, and added with tetrahydrofuran and little acetic acid. Insoluble materials were filtered out and the solvent was removed by distillation under reduced pressure, thereby obtaining poly(propylene oxide) of 2.15 g with a yield of 74%, exhibiting $M_{n,GPC}$ of 3400 g mol$^{-1}$ and $M_w/M_n$ of 1.32.

Embodiment 56

Preparation of Random Copolymer of caprolactone-lactide with hexa[tri(dimethylamino)-phosphazene]-cyclotriphosphazene Prepared in Embodiment 6 as a Catalyst

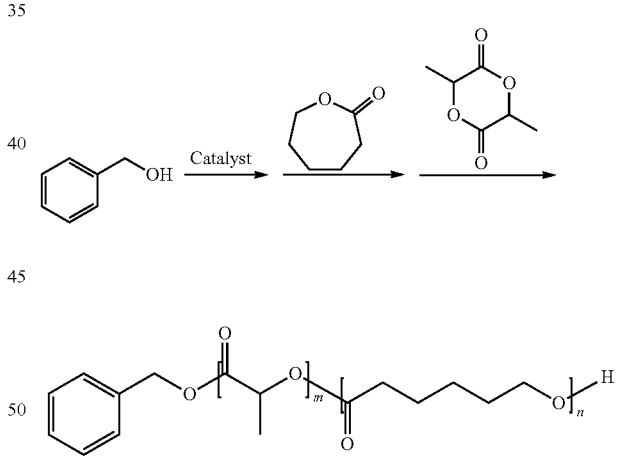

0.5 mL catalyst solution (0.1 mol/L in toluene, 0.05 mmol catalyst) was added to a 50 mL Schlenk tube in a nitrogen atmosphere. Benzyl alcohol (5.2 μL, 0.05 mmol) was added and reacted for 10 min at the room temperature. Then, ε-caprolactone (1.11 mL, 10.0 mmol) and lactide (1.44 g, 10.0 mmol) were added and reacted for 12 hours in a nitrogen atmosphere. After the reaction, tetrahydrofuran and little acetic acid were added. Precipitation was performed by using 100 mL cold methanol for twice, thereby obtaining random copolymer of caprolactone-lactide of 2.21 g with a yield of 86%, exhibiting $M_{n,GPC}$ of 19200 g mol$^{-1}$ and $M_w/M_n$ of 1.27.

Embodiment 57

Preparation of poly(propylene oxide) with hexa(dimethylamino)-cyclotriphosphazene Prepared in Embodiment 17 as a Catalyst

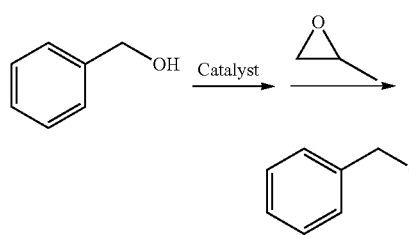

2.5 mL catalyst solution (0.1 mol/L in toluene, 0.25 mmol catalyst) was added to a 100 mL pressure-resistant reactor in a nitrogen atmosphere, the solvent was removed under high vacuum. Benzyl alcohol (26 μL, 0.25 mmol) and epoxy propane (3.5 mL, 50.0 mmol) were added, and then the reactor was sealed. The reactor was placed in an oil bath at 100° C. and the mixture contained in the reactor was reacted until the reaction pressure became and was kept constant. After the reaction, the reactor was cooled to the room temperature, and added with tetrahydrofuran and little acetic acid. Insoluble materials were filtered out and the solvent was removed by distillation under reduced pressure, thereby obtaining poly(propylene oxide) of 2.72 g with a yield of 94%, exhibiting $M_{n,GPC}$ of 4400 g mol$^{-1}$ and $M_w/M_n$ of 1.35.

Embodiment 58

Preparation of polycaprolactone with hexa(dimethylamino)-cyclotriphosphazene Prepared in Embodiment 17 as a Catalyst

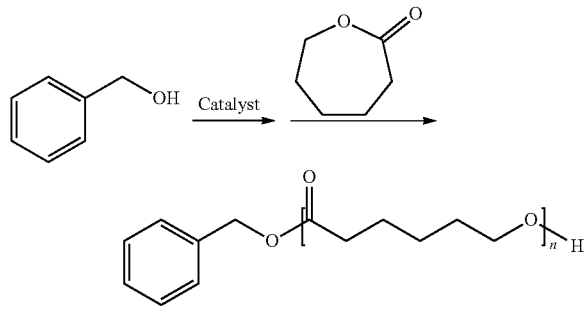

0.5 mL catalyst solution (0.1 mol/L in toluene, 0.05 mmol catalyst) was added to a 50 mL Schlenk tube in a nitrogen atmosphere. Benzyl alcohol (5.2 μL, 0.05 mmol) was further added and reacted for 10 min at the room temperature. Then, ε-caprolactone (1.11 mL, 10.0 mmol) was added and reacted for 24 hours in a nitrogen atmosphere. After the reaction, tetrahydrofuran and little acetic acid were added. Precipitation was performed by using 100 mL cold methanol for twice, thereby obtaining polycaprolactone of 1.00 g with a yield of 88%, exhibiting $M_{n,GPC}$ of 17100 g mol$^{-1}$ and $M_w/M_n$ of 1.25.

Embodiment 59

Preparation of propylene oxide-caprolactone Copolymer with hexa(dimethylamino)-cyclotriphosphazene Prepared in Embodiment 17 as a Catalyst

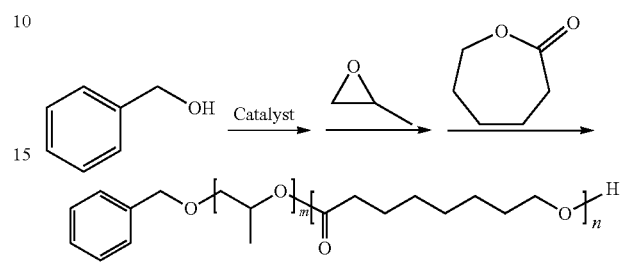

2.5 mL catalyst solution (0.1 mol/L in toluene, 0.25 mmol catalyst) was added to a 100 mL pressure-resistant reactor in a nitrogen atmosphere, the solvent was removed under high vacuum. Benzyl alcohol (26 μL, 0.25 mmol) and epoxy propane (3.5 mL, 50.0 mmol) were added, and then the reactor was sealed. The reactor was placed in an oil bath at 100° C. for reaction until the reaction pressure became and was kept constant. After the reaction, the reactor was cooled to the room temperature, and added with 2.5 mL benzyl alcohol with stirring to obtain a homogeneous mixture. Then, ε-caprolactone (1.11 mL, 10.0 mmol) was added and reacted for 12 hours in a nitrogen atmosphere. After this reaction, tetrahydrofuran and little acetic acid were added. Precipitation was performed by using 100 mL cold methanol for twice, thereby obtaining propylene oxide-caprolactone copolymer of 3.15 g with a yield of 78%, exhibiting $M_{n,GPC}$ of 8700 g mol$^{-1}$ and $M_w/M_n$ of 1.29.

Embodiment 60

Preparation of polycaprolactone with hexa(diphenylamino)-cyclotriphosphazene Prepared in Embodiment 18 as a Catalyst

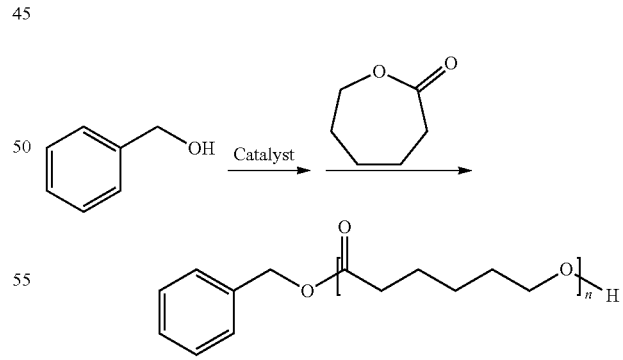

0.5 mL catalyst solution (0.1 mol/L in toluene, 0.05 mmol catalyst) was added to a 50 mL Schlenk tube in a nitrogen atmosphere. Benzyl alcohol (5.2 μL, 0.05 mmol) was further added and reacted for 10 min at the room temperature. Then; ε-caprolactone (1.11 mL, 10.0 mmol) was added and reacted for 24 hours in a nitrogen atmosphere. After the reaction, tetrahydrofuran and little acetic acid were added. Precipitation was performed by using 100 mL cold methanol for twice, thereby obtaining polycaprolactone of 0.74 g with a yield of 65%, exhibiting $M_{n,GPC}$ of 13200 g mol$^{-1}$ and $M_w/M_n$ of 1.32.

Embodiment 61

Preparation of polycaprolactone with hexapyrrolidine-cyclotriphosphazene Prepared in Embodiment 19 as a Catalyst

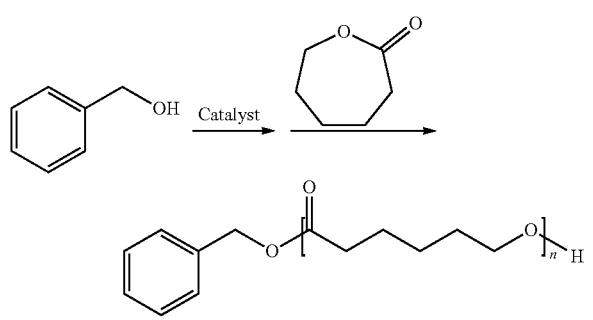

0.5 mL catalyst solution (0.1 mol/L in toluene, 0.05 mmol catalyst) was added to a 50 mL Schlenk tube in a nitrogen atmosphere. Benzyl alcohol (5.2 μL, 0.05 mmol) was further added and reacted for 10 min at the room temperature. Then, ε-caprolactone (1.11 mL, 10.0 mmol) was added and reacted for 24 hours in a nitrogen atmosphere. After the reaction, tetrahydrofuran and little acetic acid were added. Precipitation was performed by using 100 mL cold methanol for twice, thereby obtaining polycaprolactone of 1.02 g with a yield of 90%, exhibiting $M_{n,GPC}$ of 16500 g mol$^{-1}$ and $M_w/M_n$ of 1.23.

Embodiment 62

Preparation of poly(γ-benzyl-L-glutamate) with hexa[tri(dimethylamino)-phosphazene]-cyclotriphosphazene Prepared in Embodiment 6 as a Catalyst

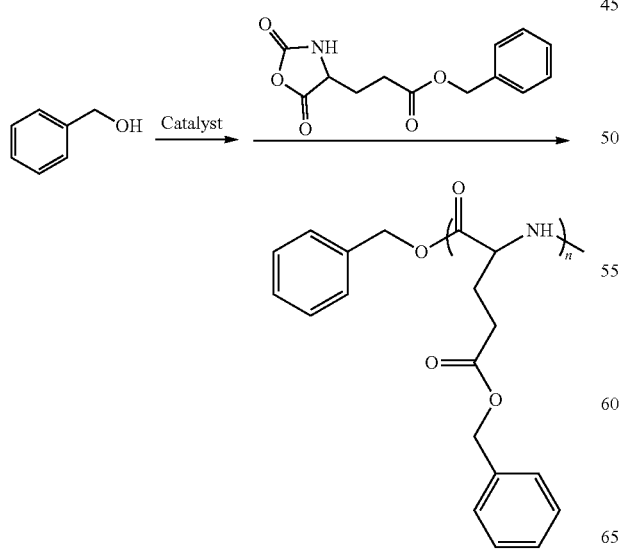

0.5 mL catalyst solution (0.1 mol/L in toluene, 0.05 mmol catalyst) was added to a 50 mL Schlenk flask in a nitrogen atmosphere. Benzyl alcohol (5.2 μL, 0.05 mmol) and 13.1 mL γ-benzyl-L-glutamic acid-N-carboxylic anhydride (BLG-NCA) solution (100 mg/mL in DMF, 5.0 mmol BLG-NCA) were added. The flask was placed in a low and constant temperature chamber at 0° C. After the reaction, the temperature of the flask was raised to the room temperature, diethyl ether was added for precipitation, the obtained mixture was centrifuged, and the solvent was removed by vacuum drying, thereby obtaining poly(γ-benzyl-L-glutamate) (PBLG) of 1.05 g with a yield of 95%, exhibiting $M_{n,GPC}$ of 17300 g mol$^{-1}$ and $M_w/M_n$ of 1.41.

Embodiment 63

Preparation of poly(γ-benzyl-L-glutamate) with hexa[tri(dimethylamino)-phosphazene]-cyclotriphosphazene Prepared in Embodiment 6 as a Catalyst

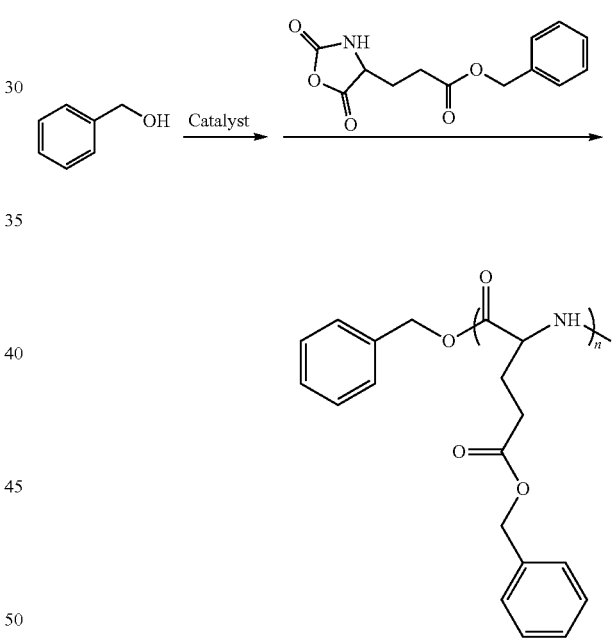

0.5 mL catalyst solution (0.1 mol/L in toluene, 0.05 mmol catalyst) was added to a 50 mL Schlenk flask in a nitrogen atmosphere. Benzyl alcohol (5.2 μL, 0.05 mmol) and 6.55 mL BLG-NCA solution (100 mg/mL in DMF, 2.5 mmol BLG-NCA) were added. The flask was placed in a low and constant temperature chamber at 0° C. After the reaction, the temperature of the flask was raised to the room temperature, diethyl ether was added for precipitation, the obtained mixture was centrifuged, and the solvent was removed by vacuum drying, thereby obtaining PBLG of 0.52 g with a yield of 95%, exhibiting $M_{n,GPC}$ of 9500 g mol$^{-1}$ and $M_w/M_n$ of 1.49.

Embodiment 64

Preparation of poly(γ-benzyl-L-glutamate) with hexa[tri(dimethylamino)-phosphazene]-cyclotriphosphazene Prepared in Embodiment 6 as a Catalyst

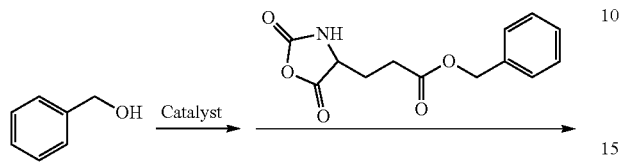

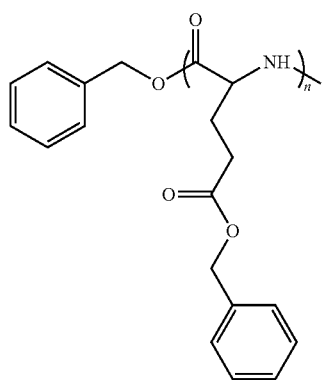

50 μL catalyst solution (0.1 mol/L in toluene, 0.005 mmol catalyst) was added to a 50 mL Schlenk flask in a nitrogen atmosphere. Benzyl alcohol (5.2 μL, 0.05 mmol) and 13.1 mL BLG-NCA solution (100 mg/mL in DMF, 5.0 mmol BLG-NCA) were added. The flask was placed in a low and constant temperature chamber at 0° C. After the reaction, the temperature of the flask was raised to the room temperature, diethyl ether was added for precipitation, the obtained mixture was centrifuged, and the solvent was removed by vacuum drying, thereby obtaining PBLG of 1.02 g with a yield of 93%, exhibiting $M_{n,GPC}$ of 18600 g mol$^{-1}$ and $M_w/M_n$ of 1.35.

Embodiment 65

Preparation of poly(ε-benzyloxycarbonyl)-lysine) with hexa[tri(dimethylamino)-phosphazene]-cyclotriphosphazene Prepared in Embodiment 6 as a Catalyst

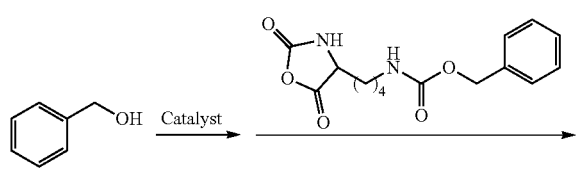

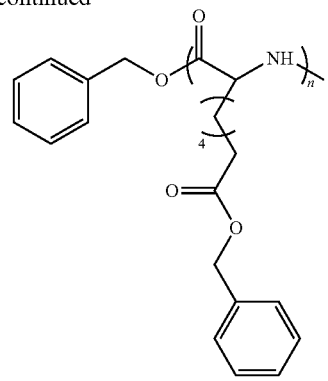

0.5 mL catalyst solution (0.1 mol/L in toluene, 0.05 mmol catalyst) was added to a 50 mL Schlenk flask in a nitrogen atmosphere. Benzyl alcohol (5.2 μL, 0.05 mmol) and 15.3 mL ε-benzyloxycarbonyl-lysine-N-carboxylic anhydride (ZLL-NCA) solution (100 mg/mL in DMF, 5.0 mmol ZLL-NCA) were added. The flask was placed in a low and constant temperature chamber at 0° C. After the reaction, the temperature of the flask was raised to the room temperature, diethyl ether was added for precipitation, the obtained mixture was centrifuged, and the solvent was removed by vacuum drying, thereby obtaining poly(ε-benzyloxycarbonyl)-lysine) (PZLL) of 1.24 g with a yield of 95%, exhibiting $M_{n,GPC}$ of 16900 g mol$^{-1}$ and $M_w/M_n$ of 1.36.

Embodiment 66

Preparation of poly(ε-benzyloxycarbonyl)-lysine) with hexa[tri(dimethylamino)-phosphazene]-cyclotriphosphazene Prepared in Embodiment 6 as a Catalyst

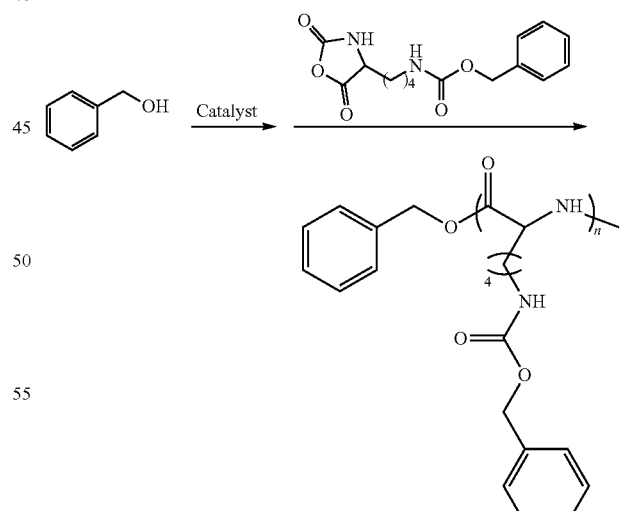

0.5 mL catalyst solution (0.1 mol/L in toluene, 0.05 mmol catalyst) was added to a 50 mL Schlenk flask in a nitrogen atmosphere. Benzyl alcohol (5.2 μL, 0.05 mmol) and 7.65 mL ZLL-NCA solution (100 mg/mL in DMF, 2.5 mmol ZLL-NCA) were added. The flask was placed in a low and constant temperature chamber at 0° C. After the reaction, the temperature of the flask was raised to the room temperature, diethyl ether was added for precipitation, the obtained mixture was centrifuged, and the solvent was removed by vacuum drying, thereby obtaining PZLL of 0.61 g with a yield of 94%, exhibiting $M_{n,GPC}$ of 9800 g mol$^{-1}$ and $M_w/M_n$ of 1.45.

Embodiment 67

Preparation of poly(ε-benzyloxycarbonyl)-lysine) with hexa[tri(dimethylamino)-phosphazene]-cyclotriphosphazene Prepared in Embodiment 6 as a Catalyst

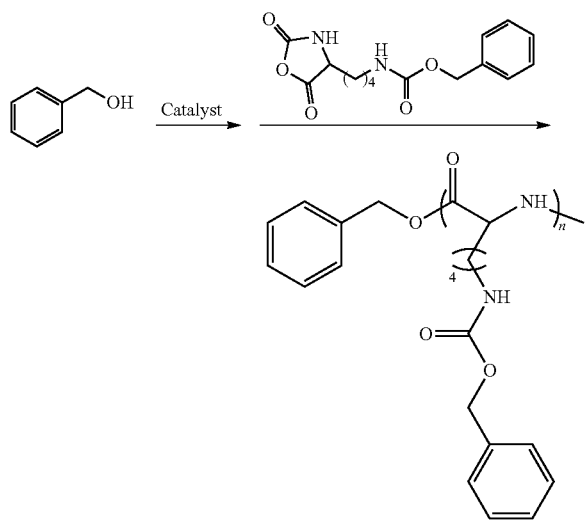

50 μL catalyst solution (0.1 mol/L in toluene, 0.005 mmol catalyst) was added to a 50 mL Schlenk flask in a nitrogen atmosphere. Benzyl alcohol (5.2 μL, 0.05 mmol) and 15.3 mL ZLL-NCA solution (100 mg/mL in DMF, 5.0 mmol ZLL-NCA) were added. The flask was placed in a low and constant temperature chamber at 0° C. After the reaction, the temperature of the flask was raised to the room temperature, diethyl ether was added for precipitation, the obtained mixture was centrifuged, and the solvent was removed by vacuum drying, thereby obtaining PZLL of 1.22 g with a yield of 94%, exhibiting $M_{n,GPC}$ of 18500 g mol$^{-1}$ and $M_w/M_n$ of 1.24.

Embodiment 68

Preparation of poly(γ-benzyl-L-glutamate) with hexa[tri(dimethylamino)-phosphazene]-cyclotriphosphazene Prepared in Embodiment 6 as a Catalyst

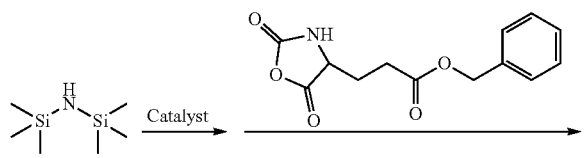

-continued

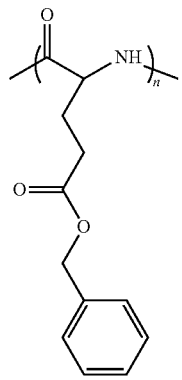

0.5 mL catalyst solution (0.1 mol/L in toluene, 0.05 mmol catalyst) was added to a 50 mL Schlenk flask in a nitrogen atmosphere. 0.5 mL hexamethyldisilazane (HMDS) solution (0.1 mol/L DMF, 0.05 mmol HMDS) and 6.55 mL BLG-NCA solution (100 mg/mL in DMF, 2.5 mmol BLG-NCA) were added. The flask was placed in a low and constant temperature chamber at 0° C. After the reaction, the temperature of the flask was raised to the room temperature, diethyl ether was added for precipitation, the obtained mixture was centrifuged, and the solvent was removed by vacuum drying, thereby obtaining PBLG of 1.07 g with a yield of 97%, exhibiting $M_{n,GPC}$ of 8900 g mol$^{-1}$ and $M_w/M_n$ of 1.32.

Embodiment 69

Preparation of poly(ε-benzyloxycarbonyl)-lysine) with hexa[tri(dimethylamino)-phosphazene]-cyclotriphosphazene Prepared in Embodiment 6 as a Catalyst

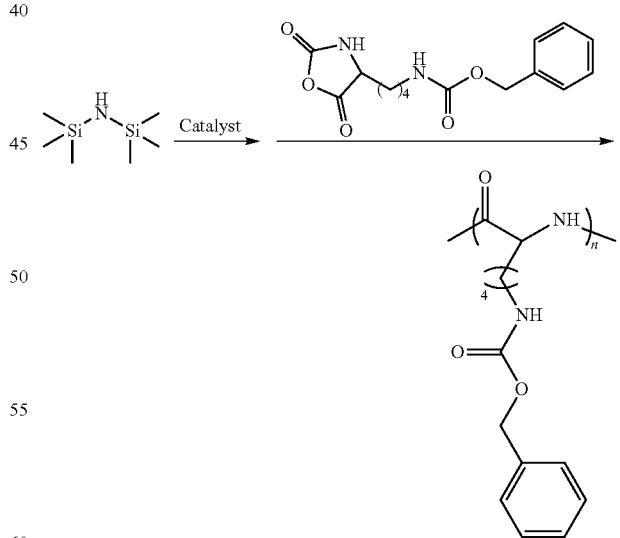

0.5 mL catalyst solution (0.1 mol/L in toluene, 0.05 mmol catalyst) was added to a 50 mL Schlenk flask in a nitrogen atmosphere. 0.5 mL HMDS solution (0.1 mol/L DMF, 0.05 mmol HMDS) and 15.3 mL ZLL-NCA solution (100 mg/mL in DMF, 5.0 mmol ZLL-NCA) were added. The flask was placed in a low and constant temperature chamber at 0° C.

After the reaction, the temperature of the flask was raised to the room temperature, diethyl ether was added for precipitation, the obtained mixture was centrifuged, and the solvent was removed by vacuum drying, thereby obtaining PZLL of 1.24 g with a yield of 95%, exhibiting $M_{n,GPC}$ of 18200 g mol$^{-1}$ and $M_w/M_n$ of 1.31.

Embodiment 70

Preparation of polysarcosine with hexa[tri(dimethylamino)-phosphazene]-cyclotriphosphazene Prepared in Embodiment 6 as a Catalyst

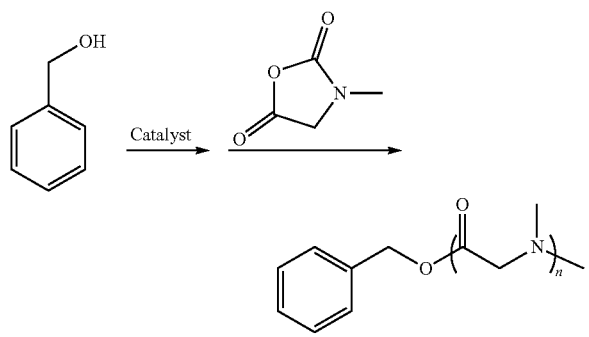

0.5 mL catalyst solution (0.1 mol/L in toluene, 0.05 mmol catalyst) was added to a 50 mL Schlenk flask in a nitrogen atmosphere. Benzyl alcohol (5.2 μL, 0.05 mmol) and 5.75 mL $^N$Methyl-NCA solution (100 mg/mL in DMF, 5.0 mmol $^N$Methyl-NCA) were added. The flask was placed in a low and constant temperature chamber at 0° C. After the reaction, the temperature of the flask was raised to the room temperature, diethyl ether was added for precipitation, the obtained mixture was centrifuged, and the solvent was removed by vacuum drying, thereby obtaining polysarcosine of 0.32 g with a yield of 91%, exhibiting $M_{n,GPC}$ of 17300 g mol$^{-1}$ and $M_w/M_n$ of 1.41.

Embodiment 71

Preparation of polysarcosine with hexa[tri(dimethylamino)-phosphazene]-cyclotriphosphazene Prepared in Embodiment 6 as a Catalyst

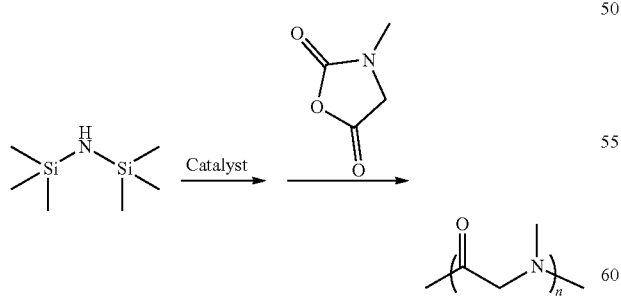

0.5 mL catalyst solution (0.1 mol/L in toluene, 0.05 mmol catalyst) was added to a 50 mL Schlenk flask in a nitrogen atmosphere. 0.5 mL HMDS solution (0.1 mol/L DMF, 0.05 mmol HMDS) and 5.75 mL $^N$Methyl-NCA solution (100 mg/mL in DMF, 5.0 mmol $^N$Methyl-NCA) were added. The flask was placed in a low and constant temperature chamber at 0° C. After the reaction, the temperature of the flask was raised to the room temperature, diethyl ether was added for precipitation, the obtained mixture was centrifuged, and the solvent was removed by vacuum drying, thereby obtaining polysarcosine of 0.32 g with a yield of 91%, exhibiting $M_{n,GPC}$ of 6700 g mol$^{-1}$ and $M_w/M_n$ of 1.36.

Embodiment 72

Preparation of polysarcosine with hexa[tri(dimethylamino)-phosphazene]-cyclotriphosphazene Prepared in Embodiment 6 as a Catalyst

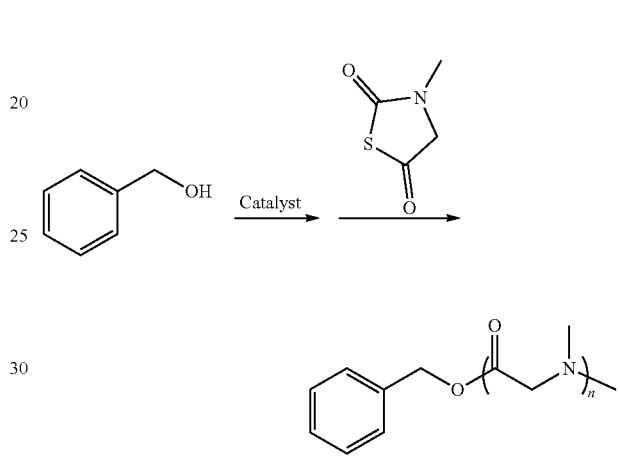

0.5 mL catalyst solution (0.1 mol/L in toluene, 0.05 mmol catalyst) was added to a 50 mL Schlenk flask in a nitrogen atmosphere. Benzyl alcohol (5.2 μL, 0.05 mmol) and 6.55 mL $^N$Methyl-NTA solution (100 mg/mL in DMF, 5.0 mmol $^N$Methyl-NTA) were added and further reacted at 40° C. After the reaction, the temperature of the flask was cooled to the room temperature, diethyl ether was added for precipitation, the obtained mixture was centrifuged, and the solvent was removed by vacuum drying, thereby obtaining polysarcosine of 0.33 g with a yield of 93%, exhibiting $M_{n,GPC}$ of 6300 g mol$^{-1}$ and $M_w/M_n$ of 1.32.

Embodiment 73

Preparation of a Copolymer of Glutamic Acid and Sarcosine with hexa[tri(dimethylamino)-phosphazene]-cyclotriphosphazene Prepared in Embodiment 6 as a Catalyst

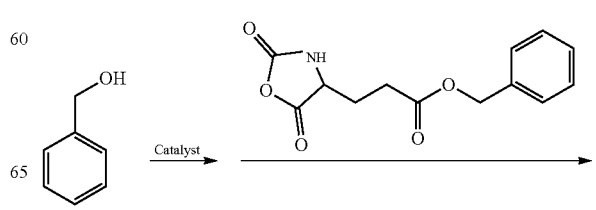

-continued

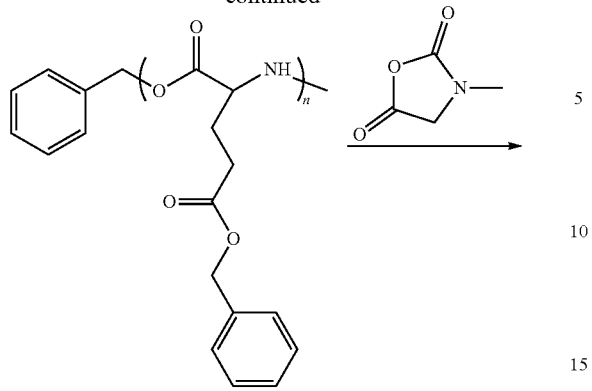

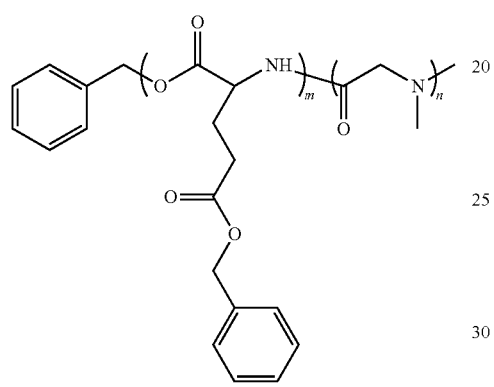

0.5 mL catalyst solution (0.1 mol/L in toluene, 0.05 mmol catalyst) was added to a 50 mL Schlenk flask in a nitrogen atmosphere. Benzyl alcohol (5.2 μL, 0.05 mmol) and 6.55 mL BLG-NCA solution (100 mg/mL in DMF, 5.0 mmol BLG-NCA) were added. After the NCA was reacted completely, 2.88 mL $^N$Methyl-NCA solution (100 mg/mL in DMF, 2.5 mmol $^N$Methyl-NCA) was added and further reacted at 40° C. After the reaction, the temperature of the flask was cooled to the room temperature, diethyl ether was added for precipitation, the obtained mixture was centrifuged, and the solvent was removed by vacuum drying, thereby obtaining the copolymer of glutamic acid and sarcosine of 0.66 g with a yield of 92%, exhibiting $M_{n,GPC}$ of 10300 g mol$^{-1}$ and $M_w/M_n$ of 1.72.

Embodiment 74

Preparation of poly(ε-benzyloxycarbonyl)-lysine) with penta[tri(dimethylamino)-phosphazene]-chloro-cyclotriphosphazene Prepared in Embodiment 12 as a Catalyst

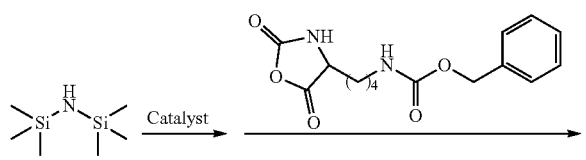

-continued

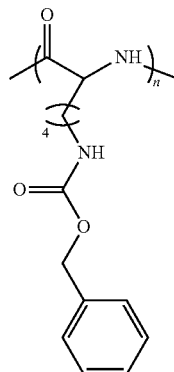

0.5 mL catalyst solution (0.1 mol/L in toluene, 0.05 mmol catalyst) was added to a 50 mL Schlenk flask in a nitrogen atmosphere. 0.5 mL HMDS solution (0.1 mol/L in DMF, 0.05 mmol HMDS) and 15.3 mL ZLL-NCA solution (100 mg/mL in DMF, 5.0 mmol ZLL-NCA) were added. The flask was placed in a low and constant temperature chamber at 0° C. After the reaction, the temperature of the flask was raised to the room temperature, diethyl ether was added for precipitation, the obtained mixture was centrifuged, and the solvent was removed by vacuum drying, thereby obtaining PZLL of 1.21 g with a yield of 92%, exhibiting $M_{n,GPC}$ of 17700 g mol$^d$ and $M_w/M_n$ of 1.33.

Embodiment 75

Preparation of poly(ε-benzyloxycarbonyl)-lysine) with tetra[tri(dimethylamino)-phosphazene]-dichloro-cyclotriphosphazene Prepared in Embodiment 13 as a Catalyst

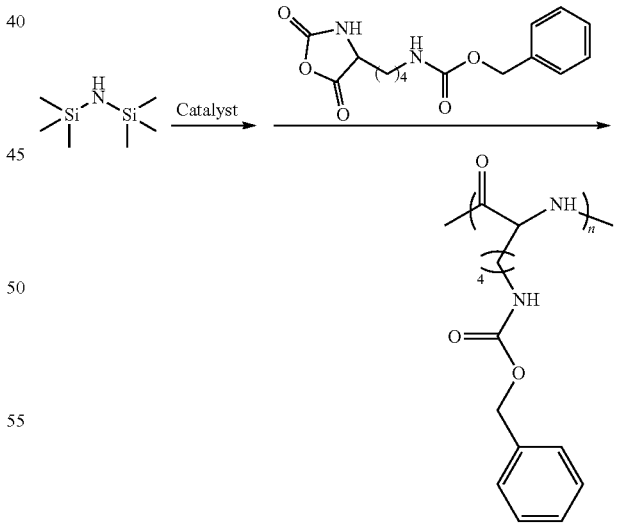

0.5 mL catalyst solution (0.1 mol/L in toluene, 0.05 mmol catalyst) was added to a 50 mL Schlenk flask in a nitrogen atmosphere. 0.5 mL HMDS solution (0.1 mol/L in DMF, 0.05 mmol HMDS) and 15.3 mL ZLL-NCA solution (100 mg/mL in DMF, 5.0 mmol ZLL-NCA) were added. The flask was placed in a low and constant temperature chamber at 0° C. After the reaction, the temperature of the flask was raised to the room temperature, diethyl ether was added for precipitation, the obtained mixture was centrifuged, and the solvent was removed by vacuum drying, thereby obtaining PZLL of 1.23 g with a yield of 94%, exhibiting $M_{n,GPC}$ of 17900 g mol$^{-1}$ and $M_w/M_n$ of 1.31.

Embodiment 76

Preparation of poly(ε-benzyloxycarbonyl)-lysine) with tri[tri(dimethylamino)-phosphazene]-trichloro-cyclotriphosphazene Prepared in Embodiment 14 as a Catalyst

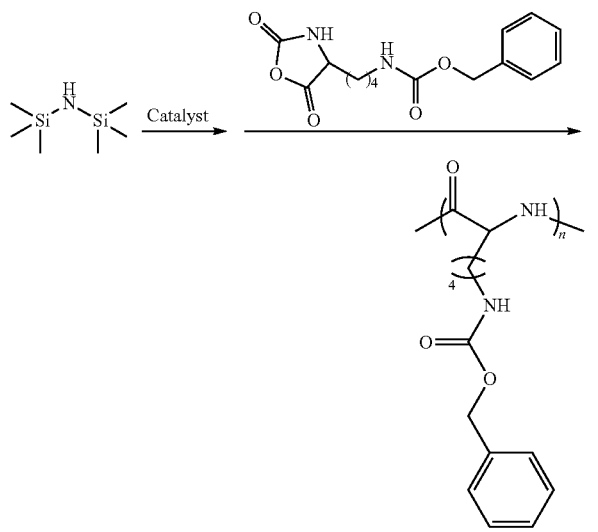

0.5 mL catalyst solution (0.1 mol/L in toluene, 0.05 mmol catalyst) was added to a 50 mL Schlenk flask in a nitrogen atmosphere. 0.5 mL HMDS solution (0.1 mol/L in DMF, 0.05 mmol HMDS) and 15.3 mL ZLL-NCA solution (100 mg/mL in DMF, 5.0 mmol ZLL-NCA) were added. The flask was placed in a low and constant temperature chamber at 0° C. After the reaction, the temperature of the flask was raised to the room temperature, diethyl ether was added for precipitation, the obtained mixture was centrifuged, and the solvent was removed by vacuum drying, thereby obtaining PZLL of 1.19 g with a yield of 91%, exhibiting $M_{n,GPC}$ of 17400 g mol$^{-1}$ and $M_w/M_n$ of 1.35.

Embodiment 77

Preparation of poly(ε-benzyloxycarbonyl)-lysine) with di[tri(dimethylamino)-phosphazene]-tetra-chloro-cyclotriphosphazene Prepared in Embodiment 15 as a Catalyst

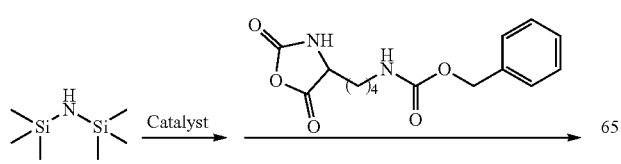

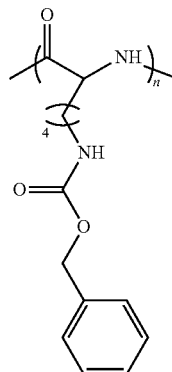

0.5 mL catalyst solution (0.1 mol/L in toluene, 0.05 mmol catalyst) was added to a 50 mL Schlenk flask in a nitrogen atmosphere. 0.5 mL HMDS solution (0.1 mol/L in DMF, 0.05 mmol HMDS) and 15.3 mL ZLL-NCA solution (100 mg/mL in DMF, 5.0 mmol ZLL-NCA) were added. The flask was placed in a low and constant temperature chamber at 0° C. After the reaction, the temperature of the flask was raised to the room temperature, diethyl ether was added for precipitation, the obtained mixture was centrifuged, and the solvent was removed by vacuum drying, thereby obtaining PZLL of 1.23 g with a yield of 94%, exhibiting $M_{n,GPC}$ of 17900 g mol$^{-1}$ and $M_w/M_n$ of 1.31.

Embodiment 78

Preparation of poly(ε-benzyloxycarbonyl)-lysine) with [tri(dimethylamino)-phosphazene]-pentachloro-cyclotriphosphazene Prepared in Embodiment 16 as a Catalyst

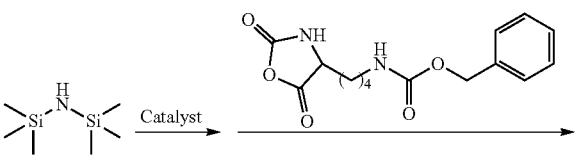

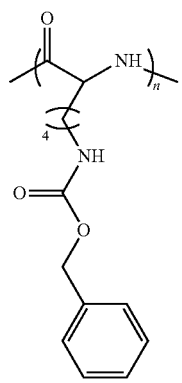

0.5 mL catalyst solution (0.1 mol/L in toluene, 0.05 mmol catalyst) was added to a 50 mL Schlenk flask in a nitrogen atmosphere. 0.5 mL HMDS solution (0.1 mol/L in DMF, 0.05 mmol HMDS) and 15.3 mL ZLL-NCA solution (100 mg/mL in DMF, 5.0 mmol ZLL-NCA) were added. The flask was placed in a low and constant temperature chamber at 0° C. After the reaction, the temperature of the flask was raised to the room temperature, diethyl ether was added for precipitation, the obtained mixture was centrifuged, and the solvent was removed by vacuum drying, thereby obtaining PZLL of 1.20 g with a yield of 92%, exhibiting $M_{n,GPC}$ of 17300 g mol$^{-1}$ and $M_w/M_n$ of 1.32.

Embodiment 79

Preparation of poly(ε-benzyloxycarbonyl)-lysine) with hexachloro-cyclotriphosphazene as a Catalyst

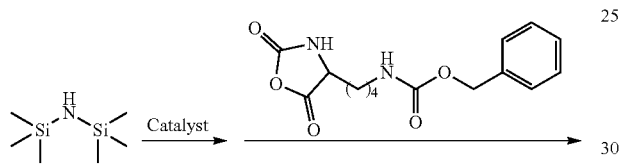

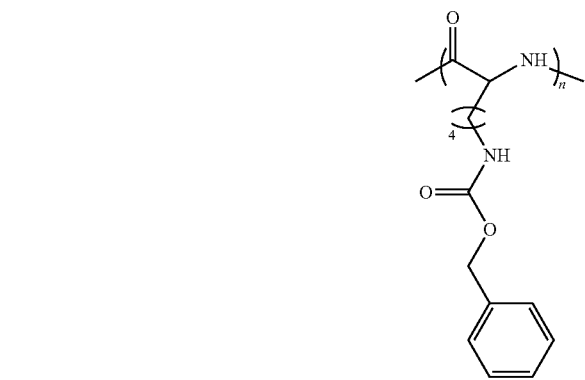

0.5 mL catalyst solution (0.1 mol/L in toluene, 0.05 mmol catalyst) was added to a 50 mL Schlenk flask in a nitrogen atmosphere. 0.5 mL HMDS solution (0.1 mol/L in DMF, 0.05 mmol HMDS) and 15.3 mL ZLL-NCA solution (100 mg/mL in DMF, 5.0 mmol ZLL-NCA) were added. The flask was placed in a low and constant temperature chamber at 0° C. After the reaction, the temperature of the flask was raised to the room temperature, diethyl ether was added for precipitation, the obtained mixture was centrifuged, and the solvent was removed by vacuum drying, thereby obtaining PZLL of 1.24 g with a yield of 95%, exhibiting $M_{n,GPC}$ of 16900 g mol$^{-1}$ and $M_w/M_n$ of 1.36.

Embodiment 80

Preparation of poly(ε-benzyloxycarbonyl)-lysine) with hexa(dimethylamino)-cyclotriphosphazene as a Catalyst

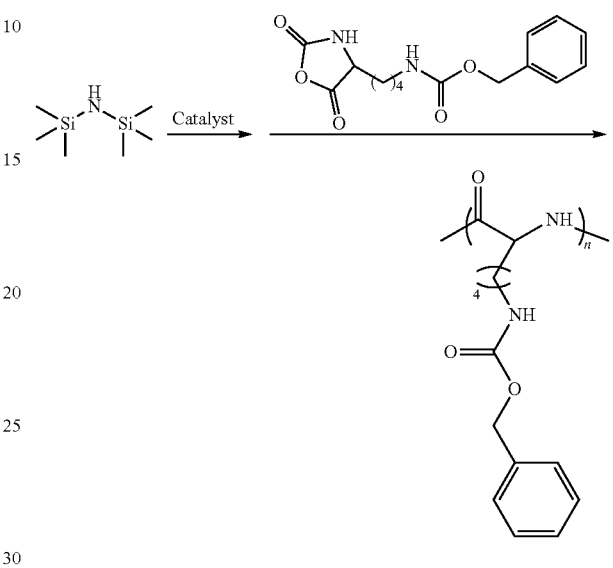

0.5 mL catalyst solution (0.1 mol/L in toluene, 0.05 mmol catalyst) was added to a 50 mL Schlenk flask in a nitrogen atmosphere. 0.5 mL HMDS solution (0.1 mol/L in DMF, 0.05 mmol HMDS) and 15.3 mL ZLL-NCA solution (100 mg/mL in DMF, 5.0 mmol ZLL-NCA) were added. The flask was placed in a low and constant temperature chamber at 0° C. After the reaction, the temperature of the flask was raised to the room temperature, diethyl ether was added for precipitation, the obtained mixture was centrifuged, and the solvent was removed by vacuum drying, thereby obtaining PZLL of 1.17 g with a yield of 89%, exhibiting $M_{n,GPC}$ of 16900 g mol$^{-1}$ and $M_w/M_n$ of 1.28.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A compound of formula (I),

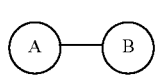

(I)

wherein A is a six- or eight-membered ring consisting of repeated $-\!(\!P\!\!=\!\!N\!)\!-$, and B group is attached to A at phosphorus in $-\!(\!P\!\!=\!\!N\!)\!-$, each phosphorus is connected to two B groups, at least two B groups of a total six or eight B groups are

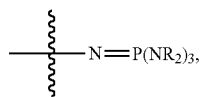

and the remaining B groups are independently selected from the group consisting of $-NR_2$,

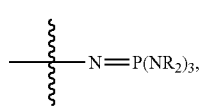

and chlorine, wherein

R is unsubstituted or substituted $C_{1-6}$ alkyl, unsubstituted or substituted $C_{3-6}$ cycloalkyl, unsubstituted or substituted aryl, or unsubstituted or substituted benzyl, or R forms $C_{2-6}$ heterocycloalkyl together with N attached thereto;

or a solvate thereof.

2. The compound according to claim 1, wherein the remaining B groups are independently selected from the group consisting of

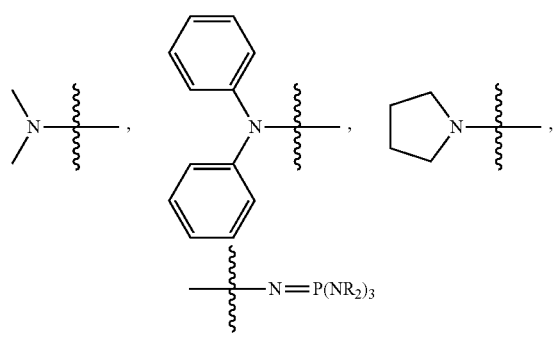

and Cl, wherein R is methyl, ethyl, isopropyl, n-butyl, cyclohexyl, phenyl or benzyl, or R forms

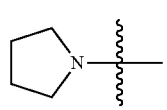

together with nitrogen attached thereto.

3. The compound according to claim 1, wherein the compound is a compound of any one of formulas:

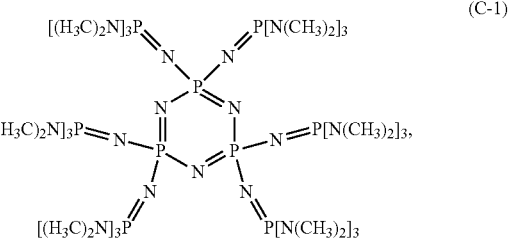
(C-1)

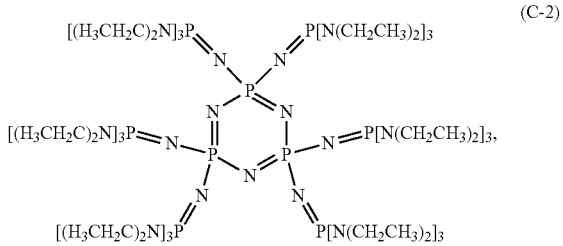
(C-2)

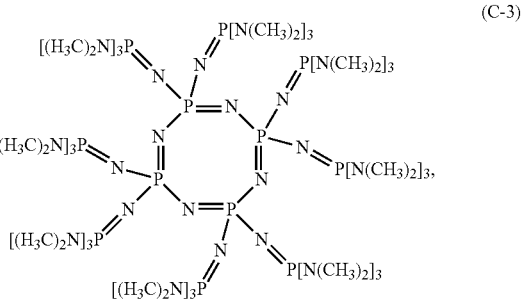
(C-3)

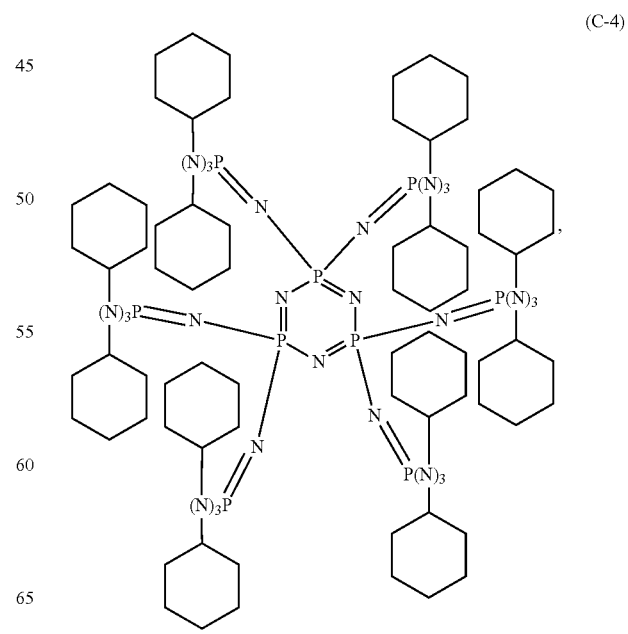
(C-4)

-continued

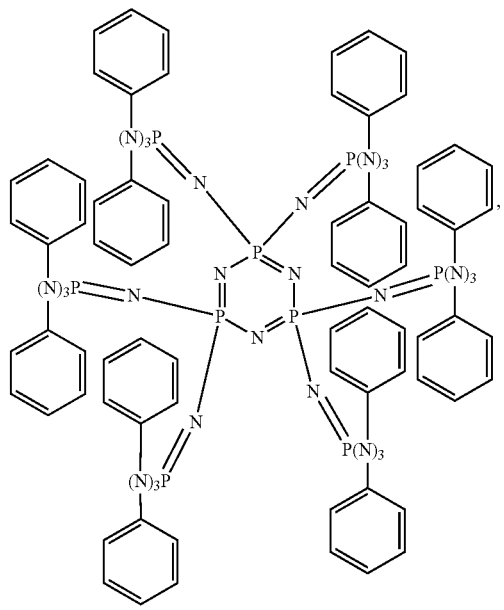
(C-5)

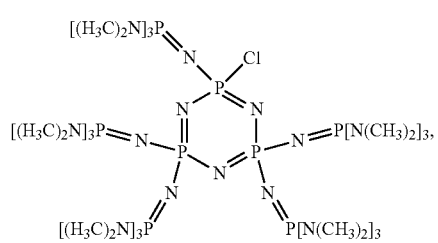
(C-7)

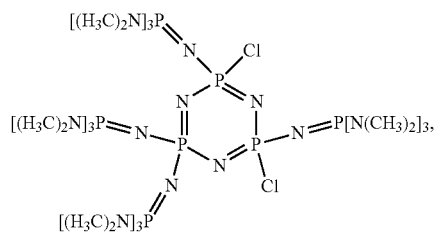
(C-8)

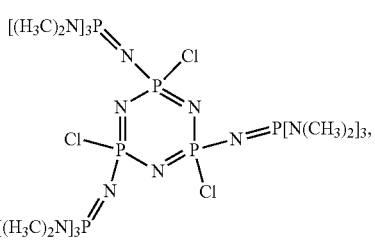
(C-9)

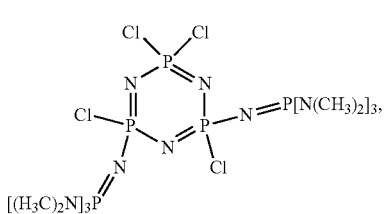
(C-10)

or a solvate thereof.

4. A method for preparing a compound of claim 1, wherein the method comprises:
(a) allowing phosphorus pentachloride to be in contact with a compound of formula X and ammonia gas, thereby obtaining a compound of formula 1;
(b) allowing the compound of formula 1 to be in contact with a base, thereby obtaining a compound of formula 2; and
(c) allowing the compound of formula X or the compound of formula 2 to be in contact with hexachloro-cyclotriphosphazene or octachloro-cyclotetraphosphazene, thereby obtaining the compound of formula (I),
wherein the formula X is $NHR_2$, the formula 1 is

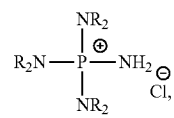

and the formula 2 is

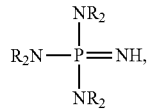

wherein
R is unsubstituted or substituted $C_{1-6}$ alkyl, unsubstituted or substituted $C_{3-6}$ cycloalkyl, unsubstituted or substituted aryl, or unsubstituted or substituted benzyl, or
R forms or $C_{2-6}$ heterocycloalkyl together with N attached thereto.

5. The method according to claim 4, wherein in step (a), the contact is performed in a first anhydrous solvent.

6. The method according to claim 5, wherein the step (a) comprises:
allowing phosphorus pentachloride in the first anhydrous solvent to be in contact with the compound of formula X in a nitrogen atmosphere for 1-6 hours thereby obtaining an intermediate, and
allowing the intermediate to be in contact with ammonia gas for another 1 to 6 hours, thereby obtaining the compound of formula 1 after filtration and solvent distillation.

7. The method according to claim 5, wherein the first anhydrous solvent comprises at least one selected from the group consisting of benzene, toluene, xylene, dichloromethane and tetrahydrofuran.

8. The method according to claim 4, wherein in step (a), a molar ratio of the phosphorus pentachloride to the compound of the formula X is 1:(3 to 10).

9. The method according to claim 4, wherein the base is sodium hydroxide or an aqueous solution thereof.

10. The method according to claim 4, wherein the step (c) comprises:
allowing hexachloro-cyclotriphosphazene or octachloro-cyclotetraphosphazene to be in contact with the compound of formula X or the compound of formula 2, in a second anhydrous solvent in the presence of an acid scavenger.

11. The method according to claim 10, wherein the second anhydrous solvent comprises at least one selected from the group consisting of benzene, toluene, xylene, chlorobenzene and tetrahydrofuran.

12. The method according to claim 10, wherein hexachloro-cyclotriphosphazene or octachloro-cyclotetraphosphazene, the compound of formula 2 and the acid scavenger are provided at a molar ratio ranging from 1:(1 to 8):(1 to 8).

13. The method according to claim 10, wherein the acid scavenger comprises at least one selected from the group consisting of triethylamine, sodium carbonate, sodium hydrogen carbonate, sodium hydroxide and potassium hydroxide.

14. The method according to claim 4, wherein in step (c), the contact is performed at 40 to 150° C. for 3 to 18 hours.

15. The method according to claim 4, comprising:
placing phosphorus pentachloride in anhydrous dichloromethane and adding the compound of formula X in anhydrous dichloromethane at a temperature of −80 to 0° C. in a nitrogen atmosphere for 1 to 6 hours, thereby obtaining an intermediate,
continuously introducing an ammonia gas into the intermediate at a temperature of −80 to 0° C. for another 1 to 6 hours, performing a filtration treatment to obtain a first filtrate, and removing solvent remained in the first filtrate by distillation, thereby obtaining a compound of formula 1,
mixing the compound of formula 1 with a 50 wt % aqueous sodium hydroxide solution for 1 to 5 hours, performing a filtration treatment to obtain a second filtrate, and removing solvent remained in the second filtrate by distillation, thereby obtaining the compound of formula 2,
mixing hexachloro-cyclotriphosphazene or octachloro-cyclotetraphosphazene, the compound of formula X or the compound of formula 2, and triethylamine in a nitrogen atmosphere in anhydrous toluene to obtain a mixture, refluxing the mixture for 3 to 18 hours, performing a filtration treatment to obtain a third filtrate, and removing solvent remained in the third filtrate by distillation, thereby obtaining the compound.

16. A method for producing a polymer with a compound of claim 1 as a catalyst,
the method comprising:
allowing the catalyst to be in contact with at least one monomer, thereby obtaining the polymer.

17. The method according to claim 16, wherein the monomer comprises at least one selected from the group consisting of epoxy ethane, epoxy propane, epoxy chloropropane, 1,2-epoxy butane, glycolide, lactide, γ-butyrolactone, δ-valerolactone, ε-caprolactone, β-lactam, methyl-substituted β-lactam, butyrolactam, caprolactam, trimethylene carbonate, 2,2-dimethyltrimethylene carbonate, 1,3-dioxan-2-one, trioxane, five-membered cyclic phosphate, six-membered cyclic phosphate, octamethyl-cyclotetrasiloxane, hexamethyl-cyclotrisiloxane, acrylamide, methyl-substituted acrylamide, methyl acrylate, methyl methacrylate and N-carboxy-α-amino-anhydride.

18. The method according to claim 16, wherein the contact is performed in an anhydrous solvent in the presence of an initiator.

19. The method according to claim 18, wherein the initiator comprises at least one selected from methanol, ethanol, isopropanol, n-butanol, tert-butanol, glycol, glycerol, cholesterol, phenol, benzyl alcohol, n-butyric acid, n-pentanoic acid, n-hexanoic acid, n-heptanoic acid, n-octanoic acid, n-decanoic acid, dodecanoic acid, tetradecanoic acid, palmitic acid, triethylamine, tri-n-butylamine, trihexylamine, benzamide, polyethylene glycol, polyoxypropylene glycol and polytetramethylene ether glycol.

20. The method according to claim 18, wherein the catalyst, the initiator and the monomer are provided at a molar ratio of 1:(0 to 200):(50 to 100000).

* * * * *